(12) United States Patent
Bailey et al.

(10) Patent No.: US 7,836,946 B2
(45) Date of Patent: Nov. 23, 2010

(54) ROTATING CONTROL HEAD RADIAL SEAL PROTECTION AND LEAK DETECTION SYSTEMS

(75) Inventors: Thomas F. Bailey, Houston, TX (US); James W. Chambers, Hackett, AR (US); Don M. Hannegan, Fort Smith, AR (US); Mark F. Gravouia, Broussard, LA (US)

(73) Assignee: Weatherford/Lamb, Inc., Houston, TX (US)

( * ) Notice: Subject to any disclaimer, the term of this patent is extended or adjusted under 35 U.S.C. 154(b) by 711 days.

(21) Appl. No.: 11/366,078

(22) Filed: Mar. 2, 2006

(65) Prior Publication Data

US 2006/0144622 A1 Jul. 6, 2006

Related U.S. Application Data

(63) Continuation-in-part of application No. 10/285,336, filed on Oct. 31, 2002, now Pat. No. 7,040,394, and a continuation-in-part of application No. 10/995,980, filed on Nov. 23, 2004, now Pat. No. 7,487,837.

(51) Int. Cl.
  *E21B 19/24* (2006.01)
(52) U.S. Cl. .................... 166/84.2; 277/333
(58) Field of Classification Search ............... 166/84.3, 166/84.2, 84.4, 84.1; 175/195; 277/332, 277/333
See application file for complete search history.

(56) References Cited

U.S. PATENT DOCUMENTS

| | | | |
|---|---|---|---|
| 517,509 A | 4/1894 | Williams | |
| 1,157,644 A | 10/1915 | London | |
| 1,472,952 A | 11/1923 | Anderson | |
| 1,503,476 A | 8/1924 | Childs et al. | |
| 1,528,560 A | 3/1925 | Myers et al. | |
| 1,546,467 A | 7/1925 | Bennett | |
| 1,560,763 A | 11/1925 | Collins | |
| 1,700,894 A | 2/1929 | Joyce et al. | |
| 1,708,316 A | 4/1929 | MacClatchie | |
| 1,769,921 A | 7/1930 | Hansen | |
| 1,776,797 A | 9/1930 | Sheldon | |
| 1,813,402 A | 7/1931 | Hewitt | |
| 1,831,956 A | 11/1931 | Harrington | |
| 1,836,470 A | 12/1931 | Humason et al. | |

(Continued)

FOREIGN PATENT DOCUMENTS

AU 199927822 B2 9/1999

(Continued)

OTHER PUBLICATIONS

Extended European search report R.44 EPC dated Oct. 9, 2007 for European Patent Application 07103416.9-2315 corresponding to above U.S. Appl. No. 11/366,078 (8 pages).

(Continued)

*Primary Examiner*—Daniel P Stephenson
(74) *Attorney, Agent, or Firm*—Strasburger & Price, LLP

(57) ABSTRACT

A system and method for reducing wear to radial seals in a rotating control device. The seals may be cooled by a thermal transfer fluid circulating through a passageway making more than one pass. Also, the differential pressure between multiple seals may be regulated and lowered, thereby increasing seal life.

59 Claims, 28 Drawing Sheets

U.S. PATENT DOCUMENTS

| | | |
|---|---|---|
| 1,902,906 A | 3/1933 | Seamark |
| 1,942,366 A | 1/1934 | Seamark |
| 2,036,537 A | 4/1936 | Otis |
| 2,038,140 A | 4/1936 | Stone |
| 2,071,197 A | 2/1937 | Burns et al. |
| 2,124,015 A | 7/1938 | Stone et al. |
| 2,126,007 A | 8/1938 | Gulberson et al. |
| 2,144,682 A | 1/1939 | MacClatchie |
| 2,148,844 A | 2/1939 | Stone, et al. |
| 2,163,813 A | 6/1939 | Stone et al. |
| 2,165,410 A | 7/1939 | Penick et al. |
| 2,170,915 A | 8/1939 | Schweitzer |
| 2,170,916 A | 8/1939 | Schweitzer et al. |
| 2,175,648 A | 10/1939 | Roach |
| 2,176,355 A | 10/1939 | Otis |
| 2,185,822 A | 1/1940 | Young |
| 2,199,735 A | 5/1940 | Beckman |
| 2,211,122 A | 8/1940 | Howard |
| 2,222,082 A | 11/1940 | Leman et al. |
| 2,233,041 A | 2/1941 | Alley |
| 2,243,340 A | 5/1941 | Hild |
| 2,243,439 A | 5/1941 | Pranger et al. |
| 2,287,205 A | 6/1942 | Stone |
| 2,303,090 A | 11/1942 | Pranger et al. |
| 2,313,169 A | 3/1943 | Penick et al. |
| 2,325,556 A | 7/1943 | Taylor, Jr. et al. |
| 2,338,093 A | 1/1944 | Caldwell |
| 2,480,955 A | 9/1949 | Penick |
| 2,506,538 A | 5/1950 | Bennett |
| 2,529,744 A | 11/1950 | Schweitzer |
| 2,609,836 A | 9/1952 | Knox |
| 2,628,852 A | 2/1953 | Voytech |
| 2,646,999 A | 7/1953 | Barske |
| 2,649,318 A | 8/1953 | Skillman |
| 2,731,281 A | 1/1956 | Knox |
| 2,746,781 A | 5/1956 | Jones |
| 2,760,750 A | 8/1956 | Schweitzer, Jr. et al. |
| 2,760,795 A | 8/1956 | Vertson |
| 2,764,999 A | 10/1956 | Stanbury |
| 2,808,229 A | 10/1957 | Bauer et al. |
| 2,808,230 A | 10/1957 | McNeil et al. |
| 2,846,178 A | 8/1958 | Minor |
| 2,846,247 A | 8/1958 | Davis |
| 2,853,274 A | 9/1958 | Collins |
| 2,862,735 A | 12/1958 | Knox |
| 2,886,350 A | 5/1959 | Horne |
| 2,904,357 A | 9/1959 | Knox |
| 2,927,774 A | 3/1960 | Ormsby |
| 2,929,610 A | 3/1960 | Stratton |
| 2,962,096 A | 11/1960 | Knox |
| 2,995,196 A | 8/1961 | Gibson et al. |
| 3,023,012 A | 2/1962 | Wilde |
| 3,029,083 A | 4/1962 | Wilde |
| 3,032,125 A | 5/1962 | Hiser et al. |
| 3,033,011 A | 5/1962 | Garrett |
| 3,052,300 A | 9/1962 | Hampton |
| 3,096,999 A | 7/1963 | Ahlstone et al. |
| 3,100,015 A | 8/1963 | Regan |
| 3,128,614 A | 4/1964 | Auer |
| 3,134,613 A | 5/1964 | Regan |
| 3,176,996 A | 4/1965 | Barnett |
| 3,203,358 A | 8/1965 | Regan et al. |
| 3,209,829 A | 10/1965 | Haeber |
| 3,216,731 A | 11/1965 | Dollison |
| 3,225,831 A | 12/1965 | Knox |
| 3,259,198 A | 7/1966 | Montgomery et al. |
| 3,268,233 A | 8/1966 | Brown |
| 3,285,352 A | 11/1966 | Hunter |
| 3,288,472 A | 11/1966 | Watkins |
| 3,289,761 A | 12/1966 | Smith et al. |
| 3,294,112 A | 12/1966 | Watkins |
| 3,302,048 A * | 1/1967 | Gray .......................... 310/90 |
| 3,313,345 A | 4/1967 | Fischer |
| 3,313,358 A | 4/1967 | Postlewaite et al. |
| 3,323,773 A | 6/1967 | Walker |
| 3,333,870 A | 8/1967 | Watkins |
| 3,347,567 A | 10/1967 | Watkins |
| 3,360,048 A | 12/1967 | Watkins |
| 3,372,761 A | 3/1968 | van Gils |
| 3,387,851 A | 6/1968 | Cugini |
| 3,397,928 A | 8/1968 | Galle |
| 3,400,938 A | 9/1968 | Williams |
| 3,401,600 A | 9/1968 | Wood |
| 3,405,763 A | 10/1968 | Pitts et al. |
| 3,421,580 A | 1/1969 | Fowler et al. |
| 3,443,643 A | 5/1969 | Jones |
| 3,445,126 A | 5/1969 | Watkins |
| 3,452,815 A | 7/1969 | Watkins |
| 3,472,518 A | 10/1969 | Harlan |
| 3,476,195 A | 11/1969 | Galle |
| 3,481,610 A | 12/1969 | Slator et al. |
| 3,485,051 A | 12/1969 | Watkins |
| 3,492,007 A | 1/1970 | Jones |
| 3,493,043 A | 2/1970 | Watkins |
| 3,503,460 A | 3/1970 | Gadbois |
| 3,522,709 A | 8/1970 | Vilain |
| 3,529,835 A | 9/1970 | Lewis |
| 3,561,723 A | 2/1971 | Cugini |
| 3,583,480 A | 6/1971 | Regan |
| 3,587,734 A | 6/1971 | Shaffer |
| 3,603,409 A | 9/1971 | Watkins |
| 3,621,912 A | 11/1971 | Wooddy, Jr. |
| 3,631,834 A | 1/1972 | Gardner et al. |
| 3,638,721 A | 2/1972 | Harrison |
| 3,638,742 A | 2/1972 | Wallace |
| 3,653,350 A | 4/1972 | Koons et al. |
| 3,661,409 A | 5/1972 | Brown et al. |
| 3,664,376 A | 5/1972 | Watkins |
| 3,667,721 A | 6/1972 | Vujasinovic |
| 3,677,353 A | 7/1972 | Baker |
| 3,724,862 A | 4/1973 | Biffle |
| 3,741,296 A | 6/1973 | Murman et al. |
| 3,779,313 A | 12/1973 | Regan |
| 3,815,673 A | 6/1974 | Bruce et al. |
| 3,827,511 A | 8/1974 | Jones |
| 3,847,215 A | 11/1974 | Herd |
| 3,868,832 A | 3/1975 | Biffle |
| 3,872,717 A | 3/1975 | Fox |
| 3,924,678 A | 12/1975 | Ahlstone |
| 3,934,887 A | 1/1976 | Biffle |
| 3,952,526 A | 4/1976 | Watkins et al. |
| 3,955,622 A | 5/1976 | Jones |
| 3,965,987 A | 6/1976 | Biffle |
| 3,976,148 A | 8/1976 | Maus et al. |
| 3,984,990 A | 10/1976 | Jones |
| 3,992,889 A | 11/1976 | Watkins et al. |
| 3,999,766 A | 12/1976 | Barton |
| 4,037,890 A | 7/1977 | Kurita et al. |
| 4,046,191 A | 9/1977 | Neath |
| 4,052,703 A | 10/1977 | Collins, Sr. et al. |
| 4,053,023 A | 10/1977 | Herd et al. |
| 4,063,602 A | 12/1977 | Howell et al. |
| 4,087,097 A | 5/1978 | Bossens et al. |
| 4,091,881 A | 5/1978 | Maus |
| 4,098,341 A | 7/1978 | Lewis |
| 4,099,583 A | 7/1978 | Maus |
| 4,109,712 A | 8/1978 | Regan |
| 4,143,880 A | 3/1979 | Bunting et al. |
| 4,143,881 A | 3/1979 | Bunting |
| 4,149,603 A | 4/1979 | Arnold |
| 4,154,448 A | 5/1979 | Biffle |
| 4,157,186 A | 6/1979 | Murray et al. |
| 4,183,562 A | 1/1980 | Watkins et al. |
| 4,200,312 A | 4/1980 | Watkins |

| | | | | | | |
|---|---|---|---|---|---|---|
| 4,208,056 A | 6/1980 | Biffle | | 4,611,661 A | 9/1986 | Hed et al. |
| 4,216,835 A | 8/1980 | Nelson | | 4,615,544 A | 10/1986 | Baugh |
| 4,222,590 A | 9/1980 | Regan | | 4,618,314 A | 10/1986 | Hailey |
| 4,249,600 A | 2/1981 | Bailey | | 4,621,655 A | 11/1986 | Roche |
| 4,281,724 A | 8/1981 | Garrett | | 4,623,020 A | 11/1986 | Nichols |
| 4,282,939 A | 8/1981 | Maus et al. | | 4,626,135 A | 12/1986 | Roche |
| 4,285,406 A | 8/1981 | Garrett et al. | | 4,630,680 A | 12/1986 | Elkins |
| 4,291,772 A | 9/1981 | Beynet | | 4,632,188 A | 12/1986 | Schuh et al. |
| 4,293,047 A | 10/1981 | Young | | 4,646,826 A | 3/1987 | Bailey et al. |
| 4,304,310 A | 12/1981 | Garrett | | 4,646,844 A | 3/1987 | Roche et al. |
| 4,310,058 A | 1/1982 | Bourgoyne, Jr. | | 4,651,830 A | 3/1987 | Crotwell |
| 4,312,404 A | 1/1982 | Morrow | | 4,660,863 A | 4/1987 | Bailey |
| 4,313,054 A | 1/1982 | Martini | | 4,688,633 A | 8/1987 | Barkley |
| 4,326,584 A | 4/1982 | Watkins | | 4,690,220 A | 9/1987 | Braddick |
| 4,335,791 A | 6/1982 | Evans | | 4,697,484 A | 10/1987 | Klee et al. |
| 4,336,840 A | 6/1982 | Bailey | | 4,709,900 A | 12/1987 | Dyer |
| 4,337,653 A | 7/1982 | Chauffe | | 4,712,620 A | 12/1987 | Lim et al. |
| 4,345,769 A | 8/1982 | Johnston | | 4,719,937 A | 1/1988 | Roche et al. |
| 4,349,204 A | 9/1982 | Malone | | 4,722,615 A | 2/1988 | Bailey et al. |
| 4,353,420 A | 10/1982 | Miller | | 4,727,942 A | 3/1988 | Galle et al. |
| 4,355,784 A | 10/1982 | Cain | | 4,736,799 A | 4/1988 | Ahlstone |
| 4,361,185 A | 11/1982 | Biffle | | 4,745,970 A | 5/1988 | Bearden et al. |
| 4,363,357 A | 12/1982 | Hunter | | 4,749,035 A | 6/1988 | Cassity |
| 4,367,795 A | 1/1983 | Biffle | | 4,754,820 A | 7/1988 | Watts et al. |
| 4,378,849 A | 4/1983 | Wilks | | 4,757,584 A | 7/1988 | Pav et al. |
| 4,383,577 A | 5/1983 | Pruitt | | 4,759,413 A | 7/1988 | Bailey et al. |
| 4,384,724 A | 5/1983 | Derman | | 4,765,404 A | 8/1988 | Bailey et al. |
| 4,386,667 A | 6/1983 | Millsapps, Jr. | | 4,783,084 A | 11/1988 | Biffle |
| 4,387,771 A | 6/1983 | Jones | | 4,807,705 A | 2/1989 | Henderson et al. |
| 4,398,599 A | 8/1983 | Murray | | 4,813,495 A | 3/1989 | Leach |
| 4,406,333 A | 9/1983 | Adams | | 4,817,724 A | 4/1989 | Funderburg, Jr. et al. |
| 4,407,375 A | 10/1983 | Nakamura | | 4,822,212 A | 4/1989 | Hall et al. |
| 4,413,653 A | 11/1983 | Carter, Jr. | | 4,825,938 A | 5/1989 | Davis |
| 4,416,340 A | 11/1983 | Bailey | | 4,828,024 A | 5/1989 | Roche |
| 4,423,776 A | 1/1984 | Wagoner et al. | | 4,832,126 A | 5/1989 | Roche |
| 4,424,861 A | 1/1984 | Carter, Jr. et al. | | 4,836,289 A | 6/1989 | Young |
| 4,427,072 A | 1/1984 | Lawson | | 4,865,137 A | 9/1989 | Bailey |
| 4,439,068 A | 3/1984 | Pokladnik | | 4,882,830 A | 11/1989 | Carstensen |
| 4,440,232 A | 4/1984 | LeMoine | | 4,909,327 A | 3/1990 | Roche |
| 4,441,551 A | 4/1984 | Biffle | | 4,949,796 A | 8/1990 | Williams |
| 4,444,250 A | 4/1984 | Keithahn et al. | | 4,955,436 A | 9/1990 | Johnston |
| 4,444,401 A | 4/1984 | Roche et al. | | 4,955,949 A | 9/1990 | Bailey et al. |
| 4,448,255 A | 5/1984 | Shaffer et al. | | 4,962,819 A | 10/1990 | Bailey et al. |
| 4,456,062 A | 6/1984 | Roche et al. | | 4,971,148 A | 11/1990 | Roche et al. |
| 4,456,063 A | 6/1984 | Roche | | 4,984,636 A | 1/1991 | Bailey et al. |
| 4,457,489 A | 7/1984 | Gilmore | | 4,995,464 A | 2/1991 | Watkins et al. |
| 4,478,287 A | 10/1984 | Hynes et al. | | 5,009,265 A | 4/1991 | Bailey et al. |
| 4,480,703 A | 11/1984 | Garrett | | 5,022,472 A | 6/1991 | Bailey et al. |
| 4,484,753 A | 11/1984 | Kalsi | | 5,028,056 A | 7/1991 | Bemis et al. |
| 4,486,025 A | 12/1984 | Johnston | | 5,035,292 A | 7/1991 | Bailey |
| 4,497,592 A | 2/1985 | Lawson | | 5,040,600 A | 8/1991 | Bailey et al. |
| 4,500,094 A | 2/1985 | Biffle | | 5,048,621 A | 9/1991 | Bailey |
| 4,502,534 A | 3/1985 | Roche et al. | | 5,062,450 A | 11/1991 | Bailey |
| 4,509,405 A | 4/1985 | Bates | | 5,062,479 A | 11/1991 | Bailey et al. |
| 4,524,832 A | 6/1985 | Roche et al. | | 5,072,795 A | 12/1991 | Delgado et al. |
| 4,526,243 A | 7/1985 | Young | | 5,076,364 A | 12/1991 | Hale et al. |
| 4,527,632 A | 7/1985 | Chaudot | | 5,082,020 A | 1/1992 | Bailey |
| 4,529,210 A | 7/1985 | Biffle | | 5,085,277 A | 2/1992 | Hopper |
| 4,531,580 A | 7/1985 | Jones | | 5,101,897 A | 4/1992 | Leismer et al. |
| 4,531,591 A * | 7/1985 | Johnston ...................... 175/57 | | 5,137,084 A | 8/1992 | Gonzales et al. |
| 4,531,593 A | 7/1985 | Elliott et al. | | 5,147,559 A | 9/1992 | Brophey et al. |
| 4,531,951 A | 7/1985 | Burt | | 5,154,231 A | 10/1992 | Bailey et al. |
| 4,533,003 A | 8/1985 | Bailey | | 5,163,514 A | 11/1992 | Jennings |
| 4,540,053 A | 9/1985 | Baugh et al. | | 5,165,480 A | 11/1992 | Wagoner et al. |
| 4,546,828 A | 10/1985 | Roche | | 5,178,215 A | 1/1993 | Yenulis et al. |
| 4,553,591 A | 11/1985 | Mitchell | | 5,182,979 A | 2/1993 | Morgan |
| D282,073 S | 1/1986 | Bearden et al. | | 5,184,686 A | 2/1993 | Gonzalez |
| 4,566,494 A | 1/1986 | Roche | | 5,195,754 A | 3/1993 | Dietle |
| 4,575,426 A | 3/1986 | Bailey | | 5,213,158 A | 5/1993 | Bailey et al. |
| 4,595,343 A | 6/1986 | Thompson et al. | | 5,215,151 A | 6/1993 | Smith et al. |
| 4,597,447 A | 7/1986 | Roche et al. | | 5,224,557 A | 7/1993 | Yenulis et al. |
| 4,597,448 A | 7/1986 | Baugh | | 5,230,520 A | 7/1993 | Dietle et al. |
| 4,610,319 A | 9/1986 | Kalsi | | 5,243,187 A | 9/1993 | Hettlage |

| | | | | | | |
|---|---|---|---|---|---|---|
| 5,251,869 | A | 10/1993 | Mason | 6,520,253 B2 | 2/2003 | Calder |
| 5,255,745 | A | 10/1993 | Czyrek | 6,536,520 B1 | 3/2003 | Snider et al. |
| 5,277,249 | A | 1/1994 | Yenulis et al. | 6,536,525 B1 | 3/2003 | Haugen et al. |
| 5,279,365 | A | 1/1994 | Yenulis et al. | 6,547,002 B1 | 4/2003 | Bailey et al. |
| 5,305,839 | A | 4/1994 | Kalsi et al. | 6,554,016 B2 | 4/2003 | Kinder |
| 5,320,325 | A | 6/1994 | Young et al. | 6,561,520 B2 | 5/2003 | Kalsi et al. |
| 5,322,137 | A | 6/1994 | Gonzales | 6,581,681 B1 | 6/2003 | Zimmerman et al. |
| 5,325,925 | A | 7/1994 | Smith et al. | 6,607,042 B2 | 8/2003 | Hoyer et al. |
| 5,348,107 | A | 9/1994 | Bailey et al. | RE38,249 E | 9/2003 | Tasson et al. |
| 5,375,476 | A | 12/1994 | Gray | 6,655,460 B2 | 12/2003 | Bailey et al. |
| 5,427,179 | A | 6/1995 | Bailey | 6,685,194 B2 | 2/2004 | Dietle et al. |
| 5,431,220 | A | 7/1995 | Bailey | 6,702,012 B2 | 3/2004 | Bailey et al. |
| 5,443,129 | A | 8/1995 | Bailey et al. | 6,708,762 B2 | 3/2004 | Haugen et al. |
| 5,495,872 | A | 3/1996 | Gallagher et al. | 6,720,764 B2 | 4/2004 | Relton et al. |
| 5,529,093 | A | 6/1996 | Gallagher et al. | 6,725,951 B2 | 4/2004 | Looper |
| 5,588,491 | A | 12/1996 | Tasson et al. | 6,732,804 B2 | 5/2004 | Hosie et al. |
| 5,607,019 | A | 3/1997 | Kent | 6,749,172 B2 | 6/2004 | Kinder |
| 5,647,444 | A | 7/1997 | Williams | 6,767,016 B2 | 7/2004 | Gobeli et al. |
| 5,657,820 | A | 8/1997 | Bailey | 7,448,454 B2 | 9/2004 | Bourgoyne et al. |
| 5,662,171 | A | 9/1997 | Brugman et al. | 7,178,600 B2 | 12/2004 | Luke et al. |
| 5,662,181 | A * | 9/1997 | Williams et al. ............ 175/195 | 6,843,313 B2 | 1/2005 | Hult |
| 5,671,812 | A | 9/1997 | Bridges | 6,851,476 B2 | 2/2005 | Gray et al. |
| 5,678,829 | A | 10/1997 | Kalsi et al. | 7,413,018 B2 | 3/2005 | Hosie et al. |
| 5,735,502 | A | 4/1998 | Levett et al. | 6,877,565 B2 | 4/2005 | Edvardsen |
| 5,738,358 | A | 4/1998 | Kalsi et al. | 6,886,631 B2 | 5/2005 | Wilson et al. |
| 5,755,372 | A | 5/1998 | Cimbura | 6,896,048 B2 | 5/2005 | Mason et al. |
| 5,823,541 | A | 10/1998 | Dietle et al. | 6,896,076 B2 | 5/2005 | Nelson et al. |
| 5,829,531 | A | 11/1998 | Hebert et al. | 6,904,981 B2 | 6/2005 | van Riet |
| 5,848,643 | A | 12/1998 | Carbaugh et al. | 6,913,092 B2 | 7/2005 | Bourgoyne |
| 5,873,576 | A | 2/1999 | Dietle et al. | 7,174,956 B2 | 8/2005 | Williams et al. |
| 5,878,818 | A | 3/1999 | Hebert et al. | 6,945,330 B2 | 9/2005 | Wilson et al. |
| 5,901,964 | A | 5/1999 | Williams et al. | 7,451,809 B2 | 10/2005 | Noske et al. |
| 5,944,111 | A | 8/1999 | Bridges | 7,004,444 B2 | 2/2006 | Kinder |
| 6,007,105 | A | 12/1999 | Dietle et al. | 7,007,913 B2 | 3/2006 | Kinder |
| 6,016,880 | A | 1/2000 | Hall et al. | 7,011,167 B2 | 3/2006 | Ebner |
| 6,017,168 | A | 1/2000 | Fraser, Jr. | 7,025,130 B2 | 4/2006 | Bailey et al. |
| 6,036,192 | A | 3/2000 | Dietle et al. | 7,028,777 B2 | 4/2006 | Wade et al. |
| 6,076,606 | A | 6/2000 | Bailey | 7,032,691 B2 | 4/2006 | Humphreys |
| 6,102,123 | A | 8/2000 | Bailey et al. | 7,040,394 B2 | 5/2006 | Bailey et al. |
| 6,102,673 | A | 8/2000 | Mott | 7,044,237 B2 | 5/2006 | Leuchtenberg |
| 6,109,348 | A | 8/2000 | Caraway | 7,278,496 B2 | 6/2006 | Leuchtenberg |
| 6,109,618 | A | 8/2000 | Dietle | 7,073,580 B2 | 7/2006 | Wilson et al. |
| 6,112,810 | A | 9/2000 | Bailey | 7,077,212 B2 | 7/2006 | Roesner et al. |
| 6,120,036 | A | 9/2000 | Kalsi et al. | 7,080,685 B2 | 7/2006 | Bailey et al. |
| 6,129,152 | A | 10/2000 | Hosie et al. | 7,086,481 B2 | 8/2006 | Hosie et al. |
| 6,138,774 | A | 10/2000 | Bourgoyne, Jr. et al. | 7,152,680 B2 | 12/2006 | Wilson et al. |
| 6,170,576 | B1 | 1/2001 | Bailey | 7,159,669 B2 | 1/2007 | Bailey |
| 6,202,745 | B1 | 3/2001 | Reimert et al. | 7,165,610 B2 | 1/2007 | Hopper |
| 6,209,663 | B1 | 4/2001 | Hosie | 7,191,840 B2 | 3/2007 | Bailey |
| 6,213,228 | B1 | 4/2001 | Saxman | 7,198,098 B2 | 4/2007 | Williams |
| 6,227,547 | B1 | 5/2001 | Dietle et al. | 7,204,315 B2 | 4/2007 | Pia |
| 6,230,824 | B1 | 5/2001 | Peterman et al. | 7,219,729 B2 | 5/2007 | Bostick et al. |
| 6,244,359 | B1 | 6/2001 | Bridges et al. | 7,278,494 B2 | 6/2007 | Williams |
| 6,263,982 | B1 | 7/2001 | Hannegan et al. | 7,237,618 B2 | 7/2007 | Williams |
| 6,273,193 | B1 | 8/2001 | Hermann | 7,237,623 B2 | 7/2007 | Hannegan |
| 6,315,302 | B1 | 11/2001 | Conroy et al. | 7,240,727 B2 | 7/2007 | Williams |
| 6,315,813 | B1 | 11/2001 | Morgan et al. | 7,243,958 B2 | 7/2007 | Williams |
| 6,325,159 | B1 | 12/2001 | Peterman et al. | 7,255,173 B2 | 8/2007 | Hosie et al. |
| 6,334,619 | B1 | 1/2002 | Dietle et al. | 7,258,171 B2 | 8/2007 | Bailey |
| 6,352,129 | B1 | 3/2002 | Best | 7,513,300 B2 | 8/2007 | Pietras et al. |
| 6,354,385 | B1 | 3/2002 | Ford et al. | 7,475,732 B2 | 9/2007 | Hosie et al. |
| 6,375,895 | B1 | 4/2002 | Daemen | 7,296,628 B2 | 11/2007 | Robichaux |
| 6,382,634 | B1 | 5/2002 | Dietle et al. | 7,308,954 B2 | 12/2007 | Martin-Marshall |
| 6,386,291 | B1 | 5/2002 | Short | 7,325,610 B2 | 2/2008 | Giroux et al. |
| 6,413,297 | B1 | 7/2002 | Morgan et al. | 7,334,633 B2 | 2/2008 | Williams et al. |
| 6,450,262 | B1 | 9/2002 | Regan | 7,347,261 B2 | 3/2008 | Markel et al. |
| 6,454,007 | B1 | 9/2002 | Bailey | 7,350,590 B2 | 4/2008 | Hosie et al. |
| 6,457,529 | B2 | 10/2002 | Calder et al. | 7,363,860 B2 | 4/2008 | Wilson et al. |
| 6,470,975 | B1 | 10/2002 | Bourgoyne et al. | 7,367,411 B2 | 5/2008 | Leuchtenberg |
| 6,478,303 | B1 | 11/2002 | Radcliffe | 7,380,590 B2 | 6/2008 | Hughes |
| 6,494,462 | B2 | 12/2002 | Dietle | 7,380,591 B2 | 6/2008 | Williams |
| 6,504,982 | B1 | 1/2003 | Greer, IV | 7,380,610 B2 | 6/2008 | Williams |
| 6,505,691 | B2 | 1/2003 | Judge | 7,383,876 B2 | 6/2008 | Gray et al. |

| | | | |
|---|---|---|---|
| 7,389,183 B2 | 6/2008 | Gray | |
| 7,392,860 B2 | 7/2008 | Johnston | |
| 7,416,021 B2 | 8/2008 | Williams | |
| 7,416,226 B2 | 8/2008 | Williams | |
| 7,487,837 B2 | 2/2009 | Bailey et al. | |
| 7,559,359 B2 | 7/2009 | Williams | |
| 7,635,034 B2 | 12/2009 | Williams | |
| 7,654,325 B2 | 2/2010 | Giroux et al. | |
| 7,669,649 B2 | 3/2010 | Williams | |
| 2003/0106712 A1 | 6/2003 | Bourgoyne et al. | |
| 2003/0164276 A1 | 9/2003 | Snider et al. | |
| 2003/0173073 A1 | 9/2003 | Snider et al. | |
| 2004/0017190 A1 | 1/2004 | McDearmon et al. | |
| 2004/0178001 A1 | 9/2004 | Hannegan | |
| 2005/0028972 A1 | 2/2005 | Wilson et al. | |
| 2005/0151107 A1 | 7/2005 | Shu | |
| 2005/0211429 A1 | 9/2005 | Gray et al. | |
| 2005/0241833 A1 | 11/2005 | Bailey et al. | |
| 2006/0037782 A1 | 2/2006 | Martin-Marshall | |
| 2006/0102387 A1 | 5/2006 | Bourgoyne et al. | |
| 2006/0108119 A1 | 5/2006 | Bailey | |
| 2006/0144622 A1 | 7/2006 | Bailey | |
| 2006/0157282 A1 | 7/2006 | Bailey | |
| 2006/0191716 A1 | 8/2006 | Humphreys | |
| 2007/0051512 A1 | 3/2007 | Markel et al. | |
| 2007/0095540 A1 | 5/2007 | Kozicz | |
| 2007/0163784 A1 | 7/2007 | Bailey | |
| 2007/0193751 A1 | 8/2007 | Bailey | |
| 2008/0035377 A1 | 2/2008 | Bailey | |
| 2008/0041149 A1 | 2/2008 | Leuchtenberg | |
| 2008/0047449 A1 | 2/2008 | Wilson et al. | |
| 2008/0059073 A1 | 3/2008 | Giroux et al. | |
| 2008/0060846 A1 | 3/2008 | Belcher et al. | |
| 2008/0105462 A1 | 5/2008 | May | |
| 2008/0110637 A1 | 5/2008 | Snider et al. | |
| 2008/0169107 A1 | 7/2008 | Bailey | |
| 2008/0210471 A1 | 9/2008 | Bailey et al. | |
| 2008/0236819 A1 | 10/2008 | Foster et al. | |
| 2008/0245531 A1 | 10/2008 | Noske et al. | |
| 2008/0296016 A1 | 12/2008 | Hughes et al. | |
| 2009/0025930 A1 | 1/2009 | Iblings et al. | |
| 2009/0057012 A1 | 3/2009 | Williams | |
| 2009/0057020 A1 | 3/2009 | Williams | |
| 2009/0057021 A1 | 3/2009 | Williams | |
| 2009/0057022 A1 | 3/2009 | Williams | |
| 2009/0057024 A1 | 3/2009 | Williams | |
| 2009/0057025 A1 | 3/2009 | Williams | |
| 2009/0057027 A1 | 3/2009 | Williams | |
| 2009/0057029 A1 | 3/2009 | Williams | |
| 2009/0101351 A1 | 4/2009 | Hannegan et al. | |
| 2009/0101411 A1 | 4/2009 | Hannegan et al. | |
| 2009/0139724 A1 | 6/2009 | Gray et al. | |
| 2009/0152006 A1 | 6/2009 | Leduc et al. | |
| 2009/0166046 A1 | 7/2009 | Edvardson et al. | |
| 2009/0200747 A1 | 8/2009 | Williams | |
| 2009/0211239 A1 | 8/2009 | Askeland | |
| 2009/0236144 A1 | 9/2009 | Todd et al. | |
| 2009/0301723 A1 | 12/2009 | Gray | |
| 2010/0008190 A1 | 1/2010 | Gray et al. | |

FOREIGN PATENT DOCUMENTS

| | | | |
|---|---|---|---|
| AU | 200028183 A1 | 9/2000 | |
| AU | 200028183 B2 | 9/2000 | |
| CA | 2363132 A1 | 9/2000 | |
| CA | 2447196 A1 | 4/2004 | |
| EP | 0290250 A2 | 9/1988 | |
| EP | 0290250 A3 | 9/1988 | |
| EP | 267140 B1 | 3/1993 | |
| EP | 1375817 A1 | 1/2004 | |
| EP | 1519003 A1 | 3/2005 | |
| EP | 1659260 A2 | 5/2006 | |
| GB | 2019921 A | 11/1979 | |
| GB | 2067235 A | 7/1981 | |
| GB | 2394741 A | 5/2004 | |
| GB | 2449010 A | 8/2007 | |
| WO | WO 99/45228 A1 | 9/1999 | |
| WO | WO 99/50524 A2 | 10/1999 | |
| WO | WO 99/51852 A1 | 10/1999 | |
| WO | WO 99/50524 A3 | 12/1999 | |
| WO | WO00/52299 A | 9/2000 | |
| WO | WO 00/52299 A1 | 9/2000 | |
| WO | WO 00/52300 A1 | 9/2000 | |
| WO | WO 02/50398 A1 | 6/2002 | |
| WO | WO 03/071091 A1 | 8/2003 | |
| WO | WO2006/088379 | 8/2006 | |
| WO | WO 2006/088379 A1 | 8/2006 | |
| WO | WO 2007/092956 A2 | 8/2007 | |
| WO | WO 2008/133523 A1 | 11/2008 | |
| WO | WO 2008/156376 A1 | 12/2008 | |
| WO | WO 2009/017418 A1 | 2/2009 | |

OTHER PUBLICATIONS

U.S. Appl. No. 11/975,554, Hannegan, Don M., et al.; filed Oct. 19, 2007 (44 pages).
U.S. Appl. No. 11/975,946, Hannegan, Don M., et al.; filed Oct. 23, 2007 (66 pages).
U.S. Appl. No. 12/080,170, Bailey, Thomas F.; filed Mar. 31, 2008 (71 pages).
U.S. Appl. No. 60/079,641, filed Mar. 27, 1998, Abandoned, but Priority Claimed in above U.S. Patent Nos. 6,230,824B1 and 6,102,673 and PCT WO 99/50524.
U.S. Appl. No. 60/122,530, filed Mar. 2, 1999, Priority Claimed in U.S. Patent No. 6,470,975B1.
The Modular T BOP Stack System, Cameron Iron Works© 1985 (5 pages).
Cameron HC Collet Connector, © 1996 Cooper Cameron Corporation, Cameron Division (12 pages).
Riserless drilling: circumventing the size/cost cycle in deepwater—Conoco, Hydril project seek enabling technologies to drill in deepest water depths economically, May 1986 Offshore Drilling Technology (pp. 49, 50, 52, 53, 54, and 55).
Williams Tool Company—Home Page—Under Construction Williams Rotating Control Heads (2 pages); Seal-Ability for the pressures of drilling (2 pages); Williams Model 7000 Series Rotating Control Heads (1 page); Williams Model 7000 & 7100 Series Rotating Control Heads (2 pages); Williams Model IP1000 Rotating Control Heads (2 pages); Williams Conventional Models 8000 & 9000 (2 pages); Applications Where using a Williams rotating control heas while drilling is a plus (1 page); Williams higher pressure rotating control head systems are Ideally Suited for New Technology Flow Drilling and Closed Loop Underbalanced Drilling (UBD) Vertical and Horizontal (2 pages); and How to Contact Us (2 pages).
Offshore—World Trends and Technology for Offshore Oil and Gas Operations, Mar. 1998, Seismic: Article entitled, "Shallow Flow Diverter JIP Spurred by Deepwater Washouts" (3 pages including cover page, table of contents and p. 90).
Williams Tool Co., Inc. Rotating Control Heads and Strippers for Air, Gas, Mud, and Geothermal Drilling Worldwide—Sales Rental Service, © 1988 (19 pages).
Williams Tool Co., Inc. 19 page brochure © 1991 Williams Tool Co., Inc. (19 pages).
Fig. 19 Floating Piston Drilling Choke Design: May of 1997.
Blowout Preventer Testing for Underbalanced Drilling by Charles R. "Rick" Stone and Larry A. Cress, Signa Engineering Corp., Houston, Texas (24 pages) Sep. 1997.
Williams Tool Co., Inc. Instructions, Assemble & Disassemble Model 9000 Bearing Assembly (cover page and 27 numbered pages).
Williams Tool Co., Inc. Rotating Control Heads Making Drilling Safer While Reducing Costs Since 1968, ©1989 (4 pages).
Williams Tool Company, Inc. International Model 7000 Rotating Control Head, 1991 (4 pages).
Williams Rotating Control Heads, Reduce Costs Increase Safety Reduce Environmental Impact, 4 pages, (© 1995).

Williams Rotating Control Heads, Reduce Costs Increase Safety Reduce Environmental Impact (4 pages).

Williams Tool Co., Inc. Sales-Rental-Service, Williams Rotating Control Heads and Strippers for Air, Gas, Mud, and Geothermal Drilling, © 1982 (7 pages).

Williams Tool Co., Inc., Rotating Control Heads and Strippers for Air, Gas, Mud, Geothermal and Pressure Drilling, © 1991 (19 pages).

An article—The Brief January '96, The Brief's Guest Columnists, Williams Tool Co., Inc., Communicating Dec. 13, 1995 (Fort Smith, Arkansas), The When? and Why? of Rotating Control Head Usage, Copyright © Murphy Publishing, Inc. 1996 (2 pages).

A reprint from the Oct. 9, 1995 edition of Oil & Gas Journal, "Rotating control head applications increasing," by Adam T. Bourgoyne, Jr., Copyright 1995 by PennWell Publishing Company (6 pages).

1966-1967 Composite Catalog-Grant Rotating Drilling Head for Air, Gas or Mud Drilling (1 page).

1976-1977 Composite Catalog Grant Oil Tool Company Rotating Drilling Head Models 7068, 7368, 8068 (Patented), Equally Effective with Air, Gas, or Mud Circulation Media (3 pages).

A Subsea Rotating Control Head for Riserless Drilling Applications; Daryl A. Bourgoyne, Adam T. Bourgoyne, and Don Hannegan—1998 (International Association of Drilling Contractors International Deep Water Well Control Conference held in Houston, Texas, Aug. 26-27, 1998) (14 pages).

Hannegan, "Applications Widening for Rotating Control Heads," Drilling Contractor, cover page, table of contents and pp. 17 and 19, Drilling Contractor Publications Inc., Houston, Texas, Jul. 1996.

Composite Catalog, Hughes Offshore 1986-87 Subsea Systems and Equipment, Hughes Drilling Equipment Composite Catalog (pp. 2986-3004).

Williams Tool Co., Inc. Technical Specifications Model for The Model 7100, (3 pages).

Williams Tool Co., Inc. Website, Underbalanced Drilling (UBD), The Attraction of UBD (2 pages).

Williams Tool Co., Inc. Website,. "Applications, Where Using a Williams Rotating Control Head While Drilling is a Plus" (2 pages).

Williams Tool Co., Inc. Website, "Model 7100," (3 pages).

Composite Catalog, Hughes Offshore 1982/1983, Regan Products, © Copyright 1982 (Two cover sheets and 4308-27 thru 4308-43, and end sheet). See p. 4308-36 Type KFD Diverter.

Coflexip Brochure; 1-Coflexip Sales Offices, 2-the Flexible Steel Pipe for Drilling and Service Applications, 3-New 5" I.D. General Drilling Flexible, 4-Applications, and 5-Illustration (5 unnumbered pages).

Baker, Ron, "A Primer of Oilwell Drilling," Fourth Edition, Published Petroleum Extension Service, The University of Texas at Austin, Austin, Texas, in cooperation with International Association of Drilling Contractors Houston, Texas © 1979 (3 cover pages and pp. 42-49 re Circulation System).

Brochure, Lock down Lubricator System, Dutch Enterprises, Inc., "Safety with Savings" (cover sheet and 16 unnumbered pages) see above U.S. Patent No. 4,836,289 referred to therein.

Hydril GL series Annual Blowout Preventers (Patented—see Roche patents above), (cover sheet and 2 pages).

Other Hydril Product Information (The GH Gas Handler Series Product is Listed), © 1996, Hydril Company (Cover sheet and 19 pages).

Brochure, Shaffer Type 79 Rotating Blowout Preventer, NL Rig Equipment/NL Industries, Inc., (6 unnumbered pages).

Shaffer, A Varco Company, (Cover page and pp. 1562-1568).

Avoiding Explosive Unloading of Gas in a Deep Water Riser When SOBM in Use; Colin P. Leach & Joseph R. Roche—1998 (The Paper Describes an Application for the Hydril Gas Handler, The Hydril GH 211-2000 Gas Handler is Depicted in Figure 1 of the Paper) (9 unnumbered pages).

Feasibility Study of Dual Density Mud System for Deepwater Drilling Operations; Clovis A. Lopes & A.T. Bourgoyne, Jr.—1997 (Offshore Technology Conference Paper No. 8465); (pp. 257-266).

April 1998 Offshore Drilling with Light Weight Fluids Joint Industry Project Presentation (9 unnumbered pages).

Nakagawa, Edson Y., Santos, Helio and Cunha, J.C., "Application of Aerated-Fluid Drilling in Deepwater," SPE/IACDC 52787 Presented by Don Hannegan, P.E., SPE © 1999 SPE/IADC Drilling Conference, Amsterdam, Holland, Mar. 9-11, 1999 (5 unnumbered pages).

Brochure: "Inter-Tech Drilling Solutions, Ltd.'s RBOP™ Means Safety and Experience for Underbalanced Drilling," Inter-Tech Drilling Solutions Ltd./Big D Rentals & Sales (1981) Ltd. and Color Copy of "Rotating BOP" (2 unnumbered pages).

"Pressure Control While Drilling," Shaffer® A Varco Company, Rev. A (2 unnumbered pages).

Field Exposure (As of Aug. 1998), Shaffer® A Varco Company (1 unnumbered page).

Graphic: "Rotating Spherical BOP" (1 unnumbered page).

"JIP's Wort Brightens Outlook for UBD in Deep Waters" by Edson Yoshihito Nakagawa Helio Santos and Jose Carlos Cunha American Oil & Gas Reporter, Apr. 1999, pp. 53, 56, 58-60 and 63.

"Seal-Tech 1500 PSI Rotating Blowout Preventer," Undated, 3 pages.

"RPM System 3000™ Rotating Blowout Preventer, Setting a new standard in Well Control," by Techcorp Industries, Undated, 4 pages.

"RiserCap™ Materials Presented at the 1999 LSU/MMS/IADC Well Control Workshop", by Williams Tool Company, Inc., Mar. 24-25, pp. 1-14.

"The 1999 LSU/MMS Well Control Workshop: An overview," by John Rogers Smith. World Oil, Jun. 1999. Cover page and pp. 4, 41-42, and 44-45.

Dag Oluf Nessa, "Offshore underbalanced drilling system could revive field developments," World Oil, vol. 218, No. 10, Oct. 1997, 1 unnumbered page and pp. 83-84, 86, and 88.

D.O. Nessa, "Offshore underbalanced drilling system could revive field developments," World Oil Exploration Drilling Production, vol. 218, No. 7, Color pages of Cover Page and pp. 3, 61-64, and 66, Jul. 1997.

PCT Search Report, International Application No. PCT/US99/06695, 4 pages (Date of Completion May 27, 1999).

PCT Search Report, International Application No. PCT/GB00/00731, 3 pages (Date of Completion Jun. 16, 2000).

National Academy of Sciences—National Research Council, "Design of a Deep Ocean Drilling Ship," Cover Page and pp. 114-121. Undated but cited in above U.S. Patent No. 6,230,824B1.

"History and Development of a Rotating Preventer," by A. Cress, Rick Stone, and Mike Tangedahl, IADC/SPE 23931, 1992 IADC/SPE Drilling Conference, Feb. 1992, pp. 757-773.

Helio Santos, Email message to Don Hannegan, et al., 1 page (Aug. 20, 2001).

Rehm, Bill, "Practical Underbalanced Drilling and Workover," Petroleum Extension Service, The University of Texas At Austin Continuing & Extended Education, Cover page, title page, copyright page, and pp. 6-6, 11-2, 11-3, G-9, and G-10 (2002).

Williams Tool Company Inc., "RISERCAP™: Rotating Control Head System For Floating Drilling Rig Applications," 4 unnumbered pages, (© 1999 Williams Tool Company, Inc.).

Antonio C.V.M. Lage, Helio, Santos and Paulo R.C. Silva, Drilling With Aerated Drilling Fluid From a Floating Unit Part 2: Drilling the Well, SPE 71361, 11 pages (©2001, Society of Petroleum Engineers, Inc.).

Helio Santos, Fabio Rosa, and Christian Leuchtenberg, Drilling and Aerated Fluid from a Floating Unit, Part 1: Planning, Equipment, Tests, and Rig Modifications, SPE/IADC 67748, 8 pages (©2001 SPE/IADC Drilling Conference).

E.Y. Nakagawa, H. Santos, J.C. Cunha and S. Shayegi, Planning of Deepwater Drilling Operations with Aerated Fluids, SPE 54283, 7 pages, (©1999, Society of Petroleum Engineers).

E.Y. Nakagawa, H.M.R. Santos and J.C. Cunha, Implementing the Light-Weight Fluids Drilling Technology in Deepwater Scenarios, 1999 LSU/MMS Well Control Workshop Mar. 24-25, 1999, 12 pages (1999).

Press Release, "Stewart & Stevenson Introduces First Dual Gradient Riser," Stewart & Stevenson, http:/www.ssss/com/ssss/20000831.asp, 2 pages (Aug. 31, 2000).

Press Release: "Stewart & Stevenson introduces First Dual Gradient Riser," Stewart & Stevenson, http:www/ssss/com/ssss/20000831.asp, 2 pages (Aug. 31, 2000).

Williams Tool Company Inc., "Williams Tool Company Introduces the . . . Virtual Riser™," 4 unnumbered pages, (©1998 Williams Tool Company, Inc.).

"PETEX Publications," Petroleum Extension Service, University of Texas at Austin, 12 pages, (last modified Dec. 6, 2002).

"BG in the Caspian region," SPE Review, Issue 164, 3 unnumbered pages (May 2003).

"Field Cases as of Mar. 3, 2003," Impact Fluid Solutions, 6 pages.

"Determine in the Safe Application of Underbalanced Drilling Technologies in Marine Environments—Technical Proposal," Maurer Technology, Inc., Cover Page and pp. 2-13 (Jun. 17, 2002).

Colbert, John W., "John W. Colbert, P.E. Vice President Engineering Biographical Data," Signa Engineering Corp., 2 unnumbered pages (undated).

"Technical Training Courses," Parker Drilling Co., http:/www.parkerdrilling.com/news/tech.html, 5 pages (last visited, Sep. 5, 2003).

"Drilling equipment: Improvements from data recording to slim hole," Drilling Contractor, pp. 30-32, (Mar./Apr. 2000).

"Drilling conference promises to be informative," Drilling Contractor, p. 10 (Jan./Feb. 2002).

"Underbalanced and Air Drilling," OGCI, Inc., http:/www.ogci.com/course_info.asp?counselD=410, 2 pages, (2003).

"2003 SPE Calendar," Society of Petroleum Engineers, Google cache of http:/www.spe.org/spe/cda/views/events/eventMaster/0,1470,1648_2194_632303.00.html; for "mud cap drilling", 2 pages (2001).

"Oilfield Glossary: reverse-circulating valve," Schlumberger Limited, 1 page (2003).

Murphy, Ross D. and Thompson, Paul B., "A drilling contractor's view of underbalanced drilling," World Oil Magazine, vol. 223, No. 5, 9 pages (May 2002).

"Weatherford UnderBalanced Services: General Underbalance Presentation to the DTI," 71 unnumbered pages, © 2002.

Rach, Nina M., "Underbalanced near-balanced drilling are possible offshore," Oil & Gas Journal, Color Copies, pp. 39-44, (Dec. 1, 2003).

Forrestt, Neil; Bailey, Tom; Hannegan, Don; "Subsea Equipment for Deep Water Drilling Using Dual Gradient Mud System," SPE/IADC 67707, pp. 1-8, (©2001, SPE/IADC Drilling Conference).

Hannegan, D.M.; Bourgoyne, Jr., A.T.: "Deepwater Drilling with Lightweight Fluids—Essential Equipment Required," SPE/IADC 67708, pp. 1-6 (©2001, SPE/IADC Drilling Conference).

Hannegan, Don M., "Underbalanced Operations Continue Offshore Movement," SPE 68491, pp. 1-3, (©2001, Society of Petroleum Engineers, Inc.).

Hannegan, D. and Divine, R., "Underbalanced Drilling—Perceptions and Realities of Today's Technology in Offshore Applications," IADC/SPE 74448, p. 1-9, (©2002, IADC/SPE Drilling Conference).

Hannegan, Don M. and Wanzer, Glen: "Well Control Considerations—Offshore Applications of Underbalanced Drilling Technology," SPE/IADC 79854, pp. 1-14, (©2003, SPE/IADC Drilling Conference).

Bybee, Karen, "Offshore Applications of Underbalanced—Drilling Technology," Journal of Petroleum Technology,Cover Page and pp. 51-52, (Jan. 2004).

Bourgoyne. Darryl A.; Bourgoyne, Adam T.; Hannegan, Don; "A Subsea Rotating Control Head for Riserless Drilling Applications," IADC International Deep Water Well Control Conference, pp. 1-14, (Aug. 26-27, 1998) (see document T).

Lage, Antonio C.V.M.; Santos, Helio; Silva, Paulo R.C.; "Drilling With Aerated Drilling Fluid From a Floating Unit Part 2: Drilling the Well," Society of Petroleum Engineers, SPE 71361, pp. 1-11 (Sep. 30-Oct. 3, 2001)(see document BBB).

Furlow, William; "Shell's seafloor pump, solids removal key to ultra-deep, dual-gradient drilling (Skid ready for commercialization),"Offshore World Trends and Technology for Offshore Oil and Gas Operations, Cover page, table of contents, pp. 54, 2 unnumbered pages, and 106 (Jun. 2001).

Rowden, Michael V.: "Advances in riserless drilling pushing the deepwater surface string envelope (Alternative to seawater, CaCl2 sweeps);"Offshore World Trends and Technology for Offshore Oil and Gas Operations, Cover page, table of contents, pp. 56, 58, and 106 (Jun. 2001).

Boye, John: "Multi Purpose Intervention Vessel Presentation," M.O.S.T. Multi Operational Service Tankers, Weatherford International, Jan. 2004, 43 pages (© 2003).

GB Search Report, International Application No. GB 0324939.8, 1 page (Jan. 21, 2004).

MicroPatent® list of patents citing U.S. Patent No. 3,476,195, printed on Jan. 24, 2003.

PCT Search Report, International Application No. PCT/EP2004/052167, 4 pages (Date of Completion Nov. 25, 2004).

PCT Written Opinion of the International Searching Authority, International Application No. PCT/EP2004/052167, 6 pages.

Supplementary European Search Report No. EP 99908371, 3 pages (Date of Completion Oct. 22, 2004).

*General Catalog,* 1970-1971, Vetco Offshore, Inc., Subsea Systems; cover page, company page and numbered pp. 4800, 4816-4818; 6 pages total, in particular see numbered p. 4816 for "patented" Vetco H-4 connectors.

*General Catalog,* 1972-73, Vetco Offshore, Inc., Subsea Systems; cover page, company page and numbered pp. 4498, 4509-4510; 5 pages total.

*General Catalog,* 1974-75, Vetco Offshore, Inc.; cover page, company page and numbered pp. 5160, 5178-5179; 5 pages total.

*General Catalog,* 1976-1977, Vetco Offshore, Inc., Subsea Drilling and Completion Systems; cover page and numbered pp. 5862-5863; 4 pages total.

*General Catalog,* 1982-1983, Vetco; cover page and numbered pp. 8454-8455, 8479; 4 pages total.

*Shaffer, A Varco Company: Pressure Control While Drilling System,* http:/www.tulsaequipm.com; printed Jun. 21, 2004; 2 pages.

*Performance Drilling by Precision Drilling. A Smart Equation,* Precision Drilling, ©2002 Precision Drilling Corporation; 12 pages, in particular see 9th page for "Northland's patented RBOP . . . ".

*RPM System, 3000™ Rotating Blowout Preventer: Setting a New Standard in Well Control,* Weatherford, Underbalanced Systems; ©2002-2005 Weatherford; Brochure #333.01, 4 pages.

*Managed Pressure Drilling in Marine Environments,* Don Hannegan, P.E.; Drilling Engineering Association Workshop, Moody Gardens, Galveston, Jun. 22-23, 2004; ©2004 Weatherford, 28 pages.

Hold™ 2500 RCD Rotating Control Device web page and brochure, http://www.smith.com/hold2500; printed Oct. 27, 2004, 5 pages.

Rehm, Bill, "Practical Underbalanced Drilling and Workover," Petroleum Extension Service, The University of Texas at Austin Continuing & Extended Education, cover page, title page, copyright page and pp. 6-1 to 6-9, 7-1 to 7-9 (2002).

"Pressurized Mud Cap Drilling from A Semi-Submersible Drilling Rig," J.H. Terwogt, SPE, L.B. Makiaho and N. van Beelen, SPE, Shell Malaysia Exploration and Production; B.J. Gedge, SPE, and J. Jenkins, Weatherford Drilling and Well Services (6 pages total); © 2005 (This paper was prepared for presentation at the SPE/IADC Drilling Conference held in Amsterdam, The Netherlands, Feb. 23-25, 2005).

Tangedahl, M.J., et al., "Rotating Preventers: Technology for Better Well Control," World Oil, Gulf Publishing Company, Houston, TX, US, vol. 213, No. 10, Oct. 1992, numbered pp. 63-64 and 66 (3 pages).

European Search Report for EP 05 27 0083, Application No. 05270083.8-2315, European Patent Office, Mar. 2, 2006 (5 pages).

Netherlands Search Report for NL No. 1026044, dated Dec. 14, 2005 (3 pages).

Int'l. Search Report for PCT/GB 00/00731 corresponding to U.S. Patent No. 6,470,975 (Jun. 15, 2000) (2 pages).

GB0324939.8 Examination Report corresponding to U.S. Patent No. 6,470,975 (Mar. 21, 2006) (6 pages).

GB0324939.8 Examination Report corresponding to U.S. Patent No. 6,470,975 Jan. 22, 2004) (3 pages).

2003/0106712 Family Lookup Report (Jun. 15, 2006) (5 pages).

6,470,975 Family Lookup Report (Jun. 15, 2006) (5 pages).

AU S/N 28183/00 Examination Report corresponding to U.S. Patent No. 6,470,975 (1 page) (Sep. 9, 2002).

NO S/N 20013953 Examination Report corresponding to U.S. Patent No. 6,470,975 w/one page of English translation (3 pages) (Apr. 29, 2003).

Nessa, D.O. & Tangedahl, M.L. & Saponia, J: PART 1: "Offshore underbalanced drilling system could revive field developments," World Oil, vol. 218, No. 7, Cover Page, 3, 61-64 and 66 (Jul. 1997); and PART 2: "Making this valuable reservoir drilling/completion technique work on a conventional offshore drilling platform." World Oil, vol. 218, No. 10, Cover Page, 3, 83, 84, 86 and 88 (Oct. 1997) (see 5A, 5G above and 5I below).
Int'l. Search Report for PCT/GB 00/00731 corresponding to U.S. Patent No. 6, 470,975 (4 pages) (Jun. 27, 2000).
Int'l. Preliminary Examination Report for PCT/GB 00/00731 corresponding to U.S. Patent No. 6,470,975 (7 pages) (Dec. 14, 2000).
NL Examination Report for WO 00/52299 corresponding to this U.S. Appl. No. 10/281,534 (3 pages) (Dec. 19, 2003).
AU S/N 28181/00 Examination Report corresponding to U.S. Patent No. 6,263,982 (1 page) (Sep. 6, 2002).
EU Examination Report for WO 00/906522.8-2315 corresponding to U.S. Patent No. 6,263,982 (4 pages) (Nov. 29, 2004).
NO S/N. 20013952 Examination Report w/two pages of English translation corresponding to U.S. Patent No. 6,263,982 (4 pages) (Jul. 2, 2005).
PCT/GB00/00726 Int'l. Preliminary Examination Report corresponding to U.S. Patent No. 6,263,982 (10 pages)(Jun. 26, 2001).
PCT/GB00/00726 Written Opinion corresponding to U.S. Patent No. 6,263,982 (7 pages) (Dec. 18, 2000).
PCT/GB00/00726 International Search Report corresponding to U.S. Patent No. 6,263,982 (3 pages (Mar. 2, 1999).
AU S/N 27822/99 Examination Report corresponding to U.S. Patent No. 6,138,774 (1 page) (Oct. 15, 2001).
EU 99908371.0/1266-US9903888 European Search Report corresponding to U.S. Patent No. 6,138,774 (3 pages) (Nov. 2, 2004).
NO S/N 20003950 Examination Report w/one page of English translation corresponding to U.S. Patent No. 6,138,774 (3 pages) (Nov. 1, 2004).
PCT/US990/03888 Notice of Transmittal of International Search Report corresponding to U.S. Patent No. 6,138,774 (6 pages) (Aug. 4, 1999).
PCT/US99/03888 Written Opinion corresponding to U.S. Patent No. 6,138,744 (5 pages) (Dec. 21, 1999).
PCT/US99/03888 Notice of Transmittal of International Preliminary Examination Report corresponding to U.S. Patent No. 6,138,774 (15 pages) (Jun. 12, 2000).
EU Examination Report for 05270083.8-2315 corresponding to US 2006/0108119 A1 published May 25, 2006 (11 pages) (May 10, 2006).
Tangedahl, M.J., et al. "Rotating Preventers: Technology for Better Well Control," World Oil, Gulf Publishing Company, Houston, TX, US, vol. 213, No. 10, Oct. 1, 1992, numbered pp. 63-64 and 66 (3 pages) XP 000288328 ISSN: 0043-8790 (see YYYY, 5X above).
UK Search Report for Application No. GB 0325423.2, searched Jan. 30, 2004 corresponding to above U.S. Patent No. 7,040,394 (one page).
UK Examination Report for Application No. GB 0325423.2 (corresponding to above 5Z) (4 pages).
Dietle, Lannie L. et al., Kalsi Seals Handbook, Document. 2137 Revision 1, © 1992-2005 Kalsi Engineering, Inc. of Sugar Land, Texas, USA; front and back covers and 164 total pages; in particular forward p. ii for "Patent Rights"; Appendix A-6 for Kalsi seal part No. 381-6- and A-10 for Kalsi seal part No. 432-32-. as discussed in U.S. Appl. No. 11/366,078 application at No. paragraph 70 and 71.
Fig. 10 and discussion in U.S. Appl. No. 11/366,078 application of Background of Invention.
Partial European search report R.46 EPC dated Jun. 27, 2007 for European Patent Application EP07103416.9-2315 corresponding to above U.S. Appl. No. 11/366,078 (5 pages).
Partial European search report R.46 EPC dated Jun. 27, 2007 for European Patent Application EP07103416.9-2315 corresponding to above U.S. Appl. No. 11/366,078, now US 2006/0144622 A1 (5 pages).
Extended European search report R.44 EPC dated Oct. 9, 2007 for European Patent Application 07103416.9-2315 corresponding to above U.S. Appl. No. 11/366,078, now US 2006/0144622 A1 (8 pages).
U.S. Appl. No. 60/079,641, Mudlift System for Deep Water Drilling, filed Mar. 27, 1998, abandoned, but priority claimed in above US 6,230,824 B1 and 6,102,673 and PCT W099/50524 (54 pages).

U.S. Appl. No. 60/122,530, Concepts for the Application of Rotating Control Head Technology to Deepwater Drilling Operations, filed Mar. 2, 1999, abandoned, but priority claimed in above US 6,470,975 B1 (54 pages).
PCT/GB2008/050239 (corresponding to US2008/0210471 A1) Annex to Form PCT/ISA/206 Communication Relating to the Results of the Partial International Search dated Aug. 26, 2008 (4 pages).
PCT/GB2008/050239 (corresponding to US2008/0210471 A1) International Search Report and Written Opinion of the International Searching Authority (16 pages).
Vetco Gray Product Information CDE-PI-0007 dated Mar. 1999 for 59.0" Standard Bore CSO Diverter (2 pages) ©1999 by Vetco Gray Inc.
Vetco Gray Capital Drilling Equipment KFDJ and KFDJ Model "J" Diverters (1 page) (no date).
Hydril Blowout Preventers Catalog M-9402 D (44 pages) ©2004 Hydrill Company LP; see annular and ram BOP seals on p. 41.
Hydril Compact GK® 7 1/16"-3000 & 5000 psi Annular Blowout Preventers, Catalog 9503B © 1999 Hydril Company (4 pages).
Weatherford Controlled Pressure Drilling Williams® Rotating Marine Diverter Insert (2 pages).
Weatherford Controlled Pressure Drilling Model 7800 Rotating Control Device © 2007 Weatherford(5 pages).
Weatherford Controlled Pressure Drilling® and Testing Services Williams® Model 8000/9000 Conventional Heads © 2002-2006 Weatherford(2 pages).
Weatherford "Real Results Rotating Control Device Resolves Mud Return Issues in Extended-Reach Well, Saves Equipment Costs and Rig Time" ©2007 Weatherford and "Rotating Control Device Ensures Safety of Crew Drilling Surface-Hole Section" © 2008 Weatherford (2 pages).
Washington Rotating Control Heads, Inc. Series 1400 Rotating Control Heads ("Shorty") printed Nov. 21, 2008 (2 pages).
Smith Services product details for Rotating Control Device—RDH 500® printed Nov. 24, 2008 (4 pages).
American Petroleum Institute Specification for Drill Through Equipment—Rotating Control Devices, API Specification 16RCD, First Edition, Feb. 2005 (84 pages).
Weatherford Drilling & Intervention Services Underbalanced Systems RPM System 3000™ Rotating Blowout Preventer, Setting a New Standard in Well Control, An Advanced Well Control System for Underbalanced Drilling Operations, Brochure #333.00, ©2002 Weatherford (4 pages).
Medley, George; Moore, Dennis; Nauduri, Sagar; Signa Engineering Corp.; SPE/IADC Managed Pressure Drilling & Underbalanced Operations (PowerPoint presentation; 22 pages).
Secure Drilling Well Controlled, Secure Drilling™ System using Micro-Flux Control Technology, ©2007 Secure Drilling (12 pages).
The LSU Petroleum Engineering Research & Technology Transfer Laboratory, 10-rate Step Pump Shut-down and Start-up Example Procedure for Constant Bottom Hole Pressure Manage Pressure Drilling Applications (8 pages).
United States Department of the Interior Minerals Management Service Gulf of Mexico OCS Region NTL No. 2008-G07; Notice to Lessees and Operators of Federal Oil, Gas, and Sulphur Leases in the Outer Continental Shelf, Gulf of Mexical OCS Region, Managed Pressure Drilling Projects; Issue Date: May 15, 2008; Effective Date: Jun. 15, 2008; Expiration Date: Jun. 15, 2013 (9 pages).
Gray, Kenneth; Dynamic Density Control Quantifies Well Bore C,onditions in Real Time During Drilling; American Oil & Gas Reporter, Jan. 2009 (4 pages).
Kotow, Kenneth J.; Pritchard, David M.; Riserless Drilling with Casing: A New Paradigm for Deepwater Well Design, OTC-19914-PP, ©2009 Offshore Technology Conference, Houston, TX May 4-7, 2009 (13 pages).
Hannegan, Don M.; Managed Pressure Drilling—A New Way of Looking at Drilling Hydraulics—Overcoming Conventional Drilling Challenges; SPE 2006-2007 Distinguished Lecturer Series presentation (29 pages).
Turck Works Industrial Automation; Factor 1 Sensing for Metal Detection (2 pages) (no date).

Balluff Sensors Worldwide; Object Dectection Catalog 2008/2009—Industive Proximity Sensors for Non-Contact Detection of Metallic Targets at Ranges Generally under 50mm (2 inches); Linear Position and Measurement; Linear Position Transducers; Inductive Distance Sensors; Photoelectric Distance Sensors; Magneto-Inductive Linear Position Sensors; Magnetic Linear/Rotary Encoder System; printed Dec. 23, 2008 (8 pages).

AC 2-Wire Tubular Sensors, Balluff product catalog pp. 1.109-1.120 (12 pages) (no date).

DC 2-Wire Tubular Sensors, Balluff product catalog pp. 1.125-1.136 (12 pages) (no date).

Analog Inductive Sensors, Balluff product catalog pp. 1.157-1.170 (14 pages) (no date).

DC 3-14-Wire Inductive Sensors, Balluff product catalog pp. 1.72-1.92 (21 pages).

Selecting Position Transducers: How to Choose Among Displacement Sensor Technologies; How to Choose Among Draw Wire, LVDT, RVDT, Potentiometer, Optical Encoder, Ultrasonic, Magnetostrictive, and Other Technologies; ©2009 M-I, LLC ©1996-2010 Space Age Control, Inc., printed Feb. 18, 2010 (6 pages).

Liquid Flowmeters, Omega.com website; printed Jan. 26, 2009 (13 pages).

Super Autochoke—Automatic Pressure Regulation Under All Conditions ©2009 M-I, LLC; MI Swaco website; printed Apr. 2, 2009 (1 page).

US 6,708,780, 03/2004, Bourgoyne et al. (withdrawn)

* cited by examiner

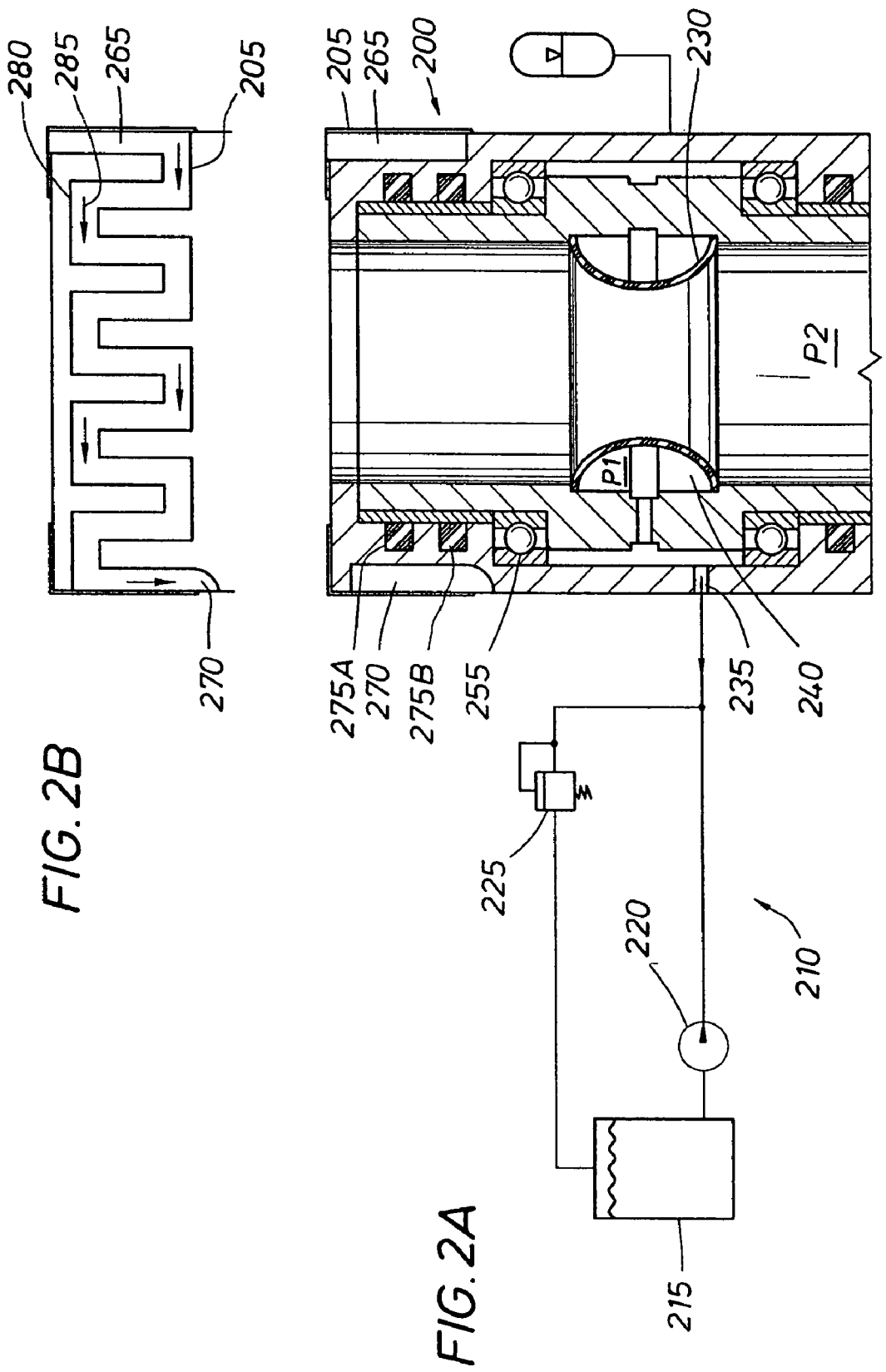

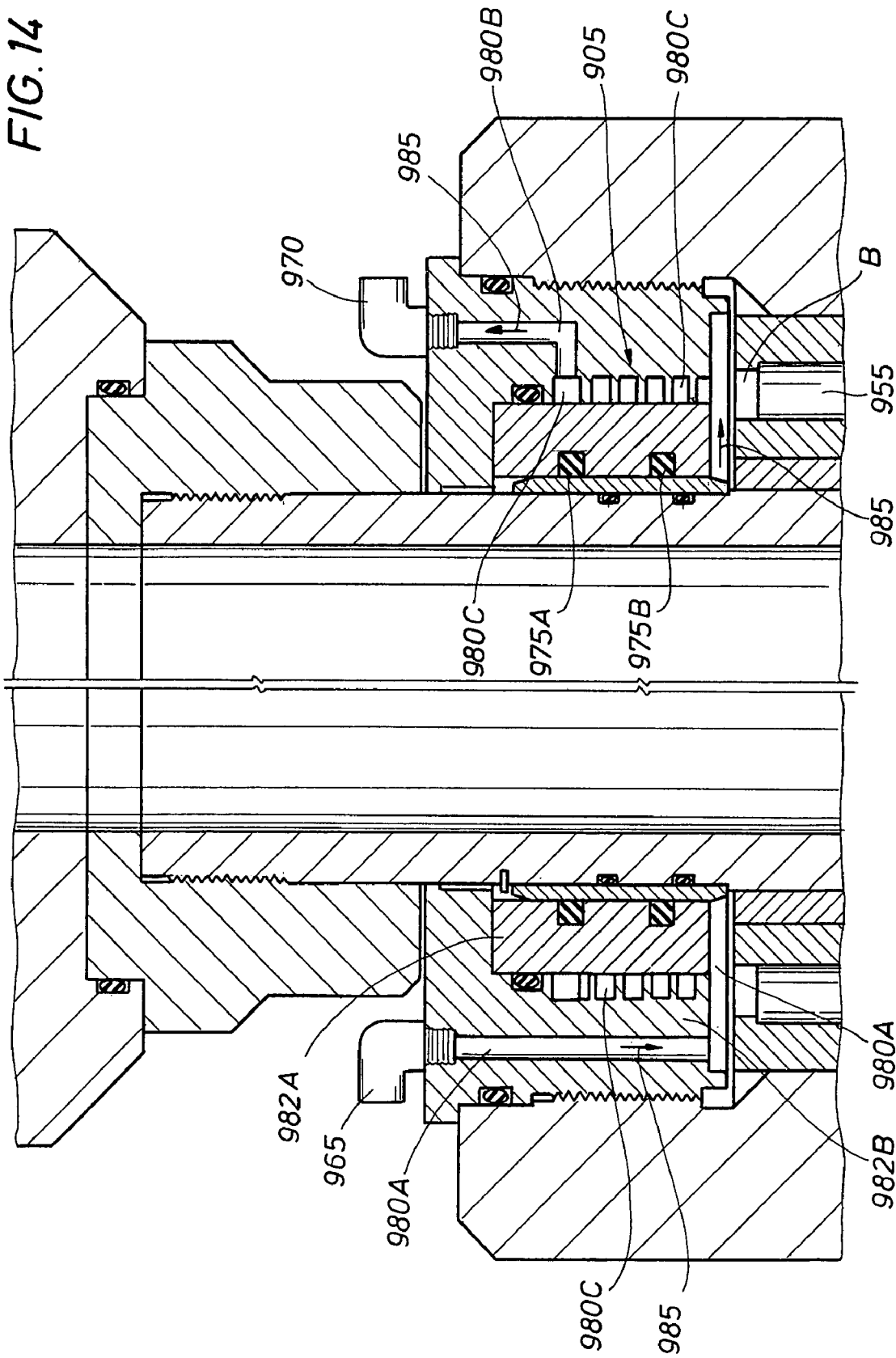

FIG. 26
FIG. 27
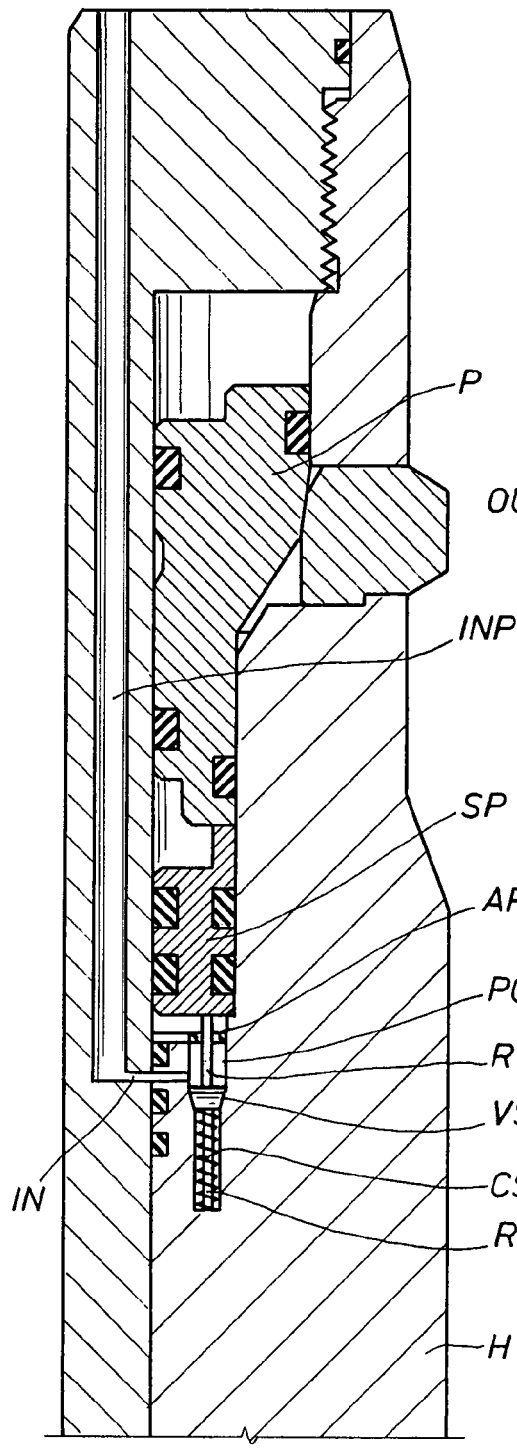
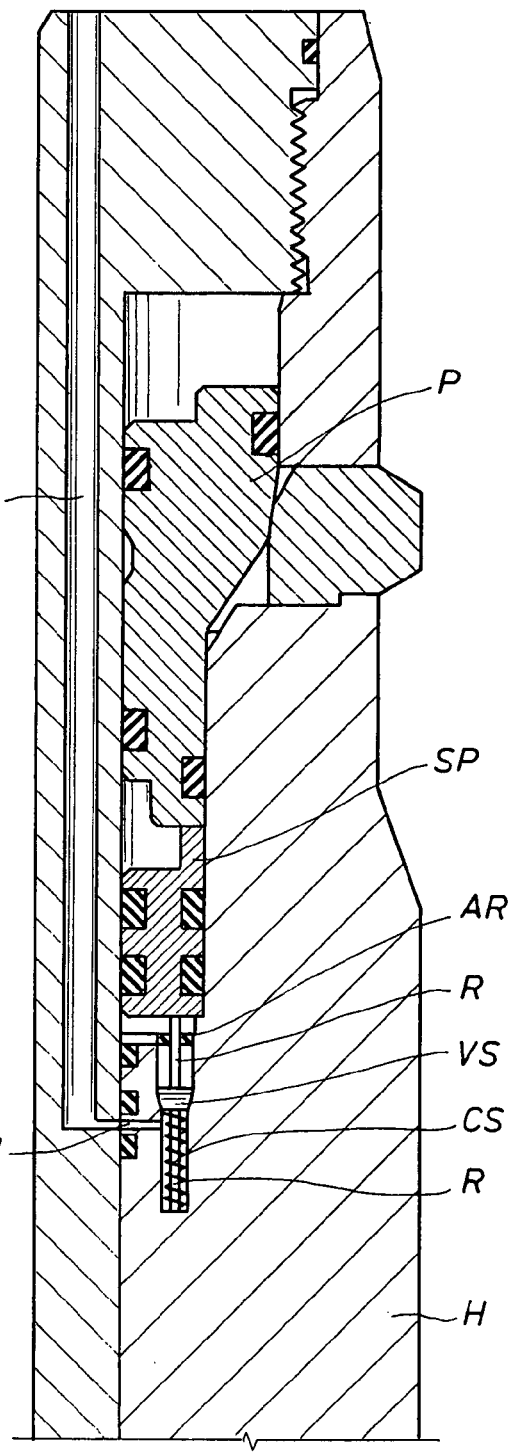

ROTATING CONTROL HEAD RADIAL SEAL PROTECTION AND LEAK DETECTION SYSTEMS

CROSS-REFERENCE TO RELATED APPLICATIONS

This application is a continuation-in-part of U.S. application Ser. No. 10/285,336 entitled "Active/Passive Seal Rotating Control Head" filed Oct. 31, 2002, and U.S. application Ser. No. 10/995,980 entitled "Riser Rotating Control Device" filed Nov. 23, 2004, both of which are incorporated by reference in their entirety for all purposes.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

Embodiments of the present invention relate generally to a method and a system for a rotating control head used in a drilling operation. More particularly, the invention relates to a remote leak detection system, radial seal protection system and an improved cooling system for a rotating control head and a method for using the systems. The present invention also includes a leak detection system for a latch system to latch the rotating control device to a housing.

2. Description of the Related Art

Drilling a wellbore for hydrocarbons requires significant expenditures of manpower and equipment. Thus, constant advances are being sought to reduce any downtime of equipment and expedite any repairs that become necessary. Rotating equipment requires maintenance as the drilling environment produces forces, elevated temperatures and abrasive cuttings detrimental to the longevity of seals, bearings, and packing elements.

In a typical drilling operation, a drill bit is attached to a drill pipe. Thereafter, a drive unit rotates the drill pipe through a drive member, referred to as a kelly as the drill pipe and drill bit are urged downward to form the wellbore. In some arrangements, a kelly is not used, thereby allowing the drive unit to attach directly to the drill pipe or tubular. The length of the wellbore is determined by the location of the hydrocarbon formations. In many instances, the formations produce fluid pressure that may be a hazard to the drilling crew and equipment unless properly controlled.

Several components are used to control the fluid pressure. Typically, one or more blowout preventers (BOP) are mounted with the well forming a BOP stack to seal the well. In particular, an annular BOP is used to selectively seal the lower portions of the well from a tubular that allows the discharge of mud. In many instances, a conventional rotating control head is mounted above the BOP stack. An inner portion or member of the conventional rotating control head is designed to seal and rotate with the drill pipe. The inner portion or member typically includes at least one internal sealing element mounted with a plurality of bearings in the rotating control head.

The internal sealing element may consist of either one, two or both of a passive seal assembly and/or an active seal assembly. The active seal assembly can be hydraulically or mechanically activated. Generally, a hydraulic circuit provides hydraulic fluid to the active seal in the rotating control head. The hydraulic circuit typically includes a reservoir containing a supply of hydraulic fluid and a pump to communicate the hydraulic fluid from the reservoir to the rotating control head. As the hydraulic fluid enters the rotating control head, a pressure is created to energize the active seal assembly. Preferably, the pressure in the active seal assembly is maintained at a greater pressure than the wellbore pressure. Typically, the hydraulic circuit receives input from the wellbore and supplies hydraulic fluid to the active seal assembly to maintain the desired pressure differential.

During the drilling operation, the drill pipe or tubular is axially and slidably moved through the rotating control head. The axial movement of the drill pipe along with other forces experienced in the drilling operation, some of which are discussed below, causes wear and tear on the bearing and seal assembly and the assembly subsequently requires repair. Typically, the drill pipe or a portion thereof is pulled from the well and the bearing and seal assembly in the rotating control head is then released. Thereafter, an air tugger or other lifting means in combination with a tool joint on the drill string can be used to lift the bearing and seal assembly from the rotating control head. The bearing and seal assembly is replaced or reworked, the bearing and seal assembly installed into the rotating control head, and the drilling operation is resumed.

The thrust generated by the wellbore fluid pressure, the radial forces on the bearing assembly and other forces cause a substantial amount of heat to build in the conventional rotating control head. The heat causes the seals and bearings to wear and subsequently require repair. The conventional rotating control head typically includes a cooling system that circulates fluid through the seals and bearings to remove the heat.

Cooling systems have been known in the past for rotating control heads and rotating blowout preventers. For example, U.S. Pat. Nos. 5,178,215, 5,224,557 and 5,277,249 propose a heat exchanger for cooling hydraulic fluid to reduce the internal temperature of a rotary blowout preventer to extend the operating life of various bearing and seal assemblies found therein.

FIG. 10 discloses a system where hydraulic fluid moves through the seal carrier C of a rotating control head, generally indicated at RCH, in a single pass to cool top radial seals S1 and S2 but with the fluid external to the bearing section B. Similarly, U.S. Pat. No. 5,662,181, assigned to the assignee of the present invention, discloses use of first inlet and outlet fittings for circulating a fluid, i.e. chilled water and/or antifreeze, to cool top radial seals in a rotating control head. A second lubricant inlet fitting is used for supplying fluid for lubricating not only the top radial seals but also top radial bearings, thrust bearings, bottom radial bearings and bottom radial seals all positioned beneath the top radial seals. (See '181 patent, col. 5, ln. 42 to col. 6, ln. 10 and col. 7, lns. 1-10.) These two separate fluids require their own fluid flow equipment, including hydraulic/pneumatic hoses.

Also, U.S. Pat. No. 5,348,107 proposes means for circulating lubricant around and through the interior of a drilling head. More particularly, FIGS. 3 to 6 of the '107 patent propose circulating lubricant to seals via a plurality of passageways in the packing gland. These packing gland passageways are proposed to be in fluid communication with the lubricant passageways such that lubricant will freely circulate to the seals. (See '107 patent, col. 3, lns. 27-65.)

U.S. Pat. Nos. 6,554,016 and 6,749,172, assigned to the assignee of the present invention, propose a rotary blowout preventer with a first and a second fluid lubricating, cooling and filtering circuit separated by a seal. Adjustable orifices are proposed connected to the outlet of the first and second fluid circuits to control pressures within the circuits. Such pressures are stated to affect the wear rates of the seals and to control the wear rate of one seal relative to another seal.

Therefore, an improved system for cooling radial seals and the bearing section of a rotating control head with one fluid is desired. If the radial seals are not sufficiently cooled, the localized temperature at the sealing surface will rise until the temperature limitations of the seal material is reached and degradation of the radial seal begins. The faster the rise in temperature means less life for the radial seals. In order to obtain sufficient life from radial seals, the rate of heat extraction should be fast enough to allow the temperature at the sealing surface to level off at a temperature lower than that of the seal material's upper limit.

Also, to protect the radial seals in a rotating control head, it would be desirable to regulate the differential pressure across the upper top radial seal that separates the fluid from the environment. Typically, fluid pressure is approximately 200 psi above the wellbore pressure. This pressure is the differential pressure across the upper top radial seal. Radial seals have a PV factor, which is differential pressure across the seal times the rotary velocity of the inner portion or member of the rotating control head in surface feet per minute. When this value is exceeded, the radial seal fails prematurely. Thus, the PV factor is the limitation to the amount of pressure and RPM that a rotating control head can be expected to perform. When the PV factor is exceeded, either excessive heat is generated by friction of the radial seals on the rotating inner member, which causes the seal material to break down, or the pressure forces the radial seal into the annular area between the rotating inner member and stationary outer member which damages the deformed seal.

In general, this PV seal problem has been addressed by limiting the RPM, pressure or both in a rotating control head. The highest dynamic, but rarely experienced, rating on a rotating control head is presently approximately 2500 psi. Some companies publish life expectancy charts which will provide the expected life of a radial seal for a particular pressure and RPM value. An annular labyrinth ring has also been used in the past between the lubricant and top radial seal to reduce the differential pressure across the top radial seal. Pressure staging and cooling of seals has been proposed in U.S. Pat. No. 6,227,547, assigned on its face to Kalsi Engineering, Inc. of Sugar Land, Tex.

Furthermore, U.S. Ser. No. 10/995,980 discloses in FIG. 14 a remote control display 1400 having a hydraulic fluid indicator 1488 to indicate a fluid leak condition. FIG. 18 of the '980 application further discloses that the alarm indicator 1480 and horn are activated based in part on the fluid leak indicator 1488 being activated for a predetermined time.

The above discussed U.S. Pat. Nos. 5,178,215; 5,224,557; 5,277,249; 5,348,107; 5,662,181; 6,227,547; 6,554,016; and 6,749,172 are incorporated herein by reference in their entirety for all purposes.

There is a need therefore, for an improved, cost-effective rotating control head that reduces repairs to the seals in the rotating control head and an improved leak detection system to indicate leaks pass these seals. There is a further need for a cooling system in a rotating control head for top radial seals that can be easily implemented and maintained. There is yet a further need for an improved rotating control head where the PV factor is reduced by regulating the differential pressure across the upper top radial seal. There is yet a further need for an improved leak detection system for the rotating control head and its latching system.

BRIEF SUMMARY OF THE INVENTION

The present invention generally relates to a system and method for reducing repairs to a rotating control head and a system and method to detect leaks in the rotating control head and its latching system.

In particular, the present invention relates to a system and method for cooling a rotating control head while regulating the pressure on the upper top radial seal in the rotating control head to reduce its PV factor. The improved rotating control head includes an improved cooling system using one fluid to cool the radial seals and bearings in combination with a reduced PV factor radial seal protection system.

A leak detection system and method of the present invention uses a comparator to compare fluid values in and from the latch assembly of the latch system and/or in and from the bearing section or system of the rotating control head.

In another aspect, a system and method for sealing a tubular in a rotating control head is provided. The method includes supplying fluid to the rotating control head and activating a seal arrangement to seal around the tubular. The system and method further includes passing a cooling medium through the rotating control head while maintaining a pressure differential between a fluid pressure in the rotating control head and a wellbore pressure.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings: It is to be noted, however, that the appended drawings illustrate only typical embodiments of this invention and are therefore not to be considered limiting of its scope, for the invention may be used in other equally effective embodiments.

FIG. 2A illustrates a rotating control head cooled by a heat exchanger.

FIG. 2B illustrates a schematic view of the heat exchanger.

FIG. 14 is an enlarged section view of a multi-pass heat exchanger for a rotating control head in accord with the present invention where a hydraulic fluid is both moved through the bearing section and makes multiple passes around the radial seals.

FIG. 26 is an enlarged elevational section view of a latch assembly in the latched position with a perpendicular port communicating above a piston indicator valve that is shown in a closed position.

FIG. 27 is a view similar to FIG. 26 but taken at a different section cut to show another perpendicular port communicating below the closed piston indicator valve.

DETAILED DESCRIPTION OF THE INVENTION

Generally, the present invention relates to a rotating control head for use with a drilling rig. Typically, an inner portion or member of the rotating control head is designed to seal around a rotating tubular and rotate with the tubular by use of an internal sealing element and bearings. Additionally, the inner portion of the rotating control head permits the tubular to move axially and slidably through the rotating control head on the drilling rig.

Figure 1:
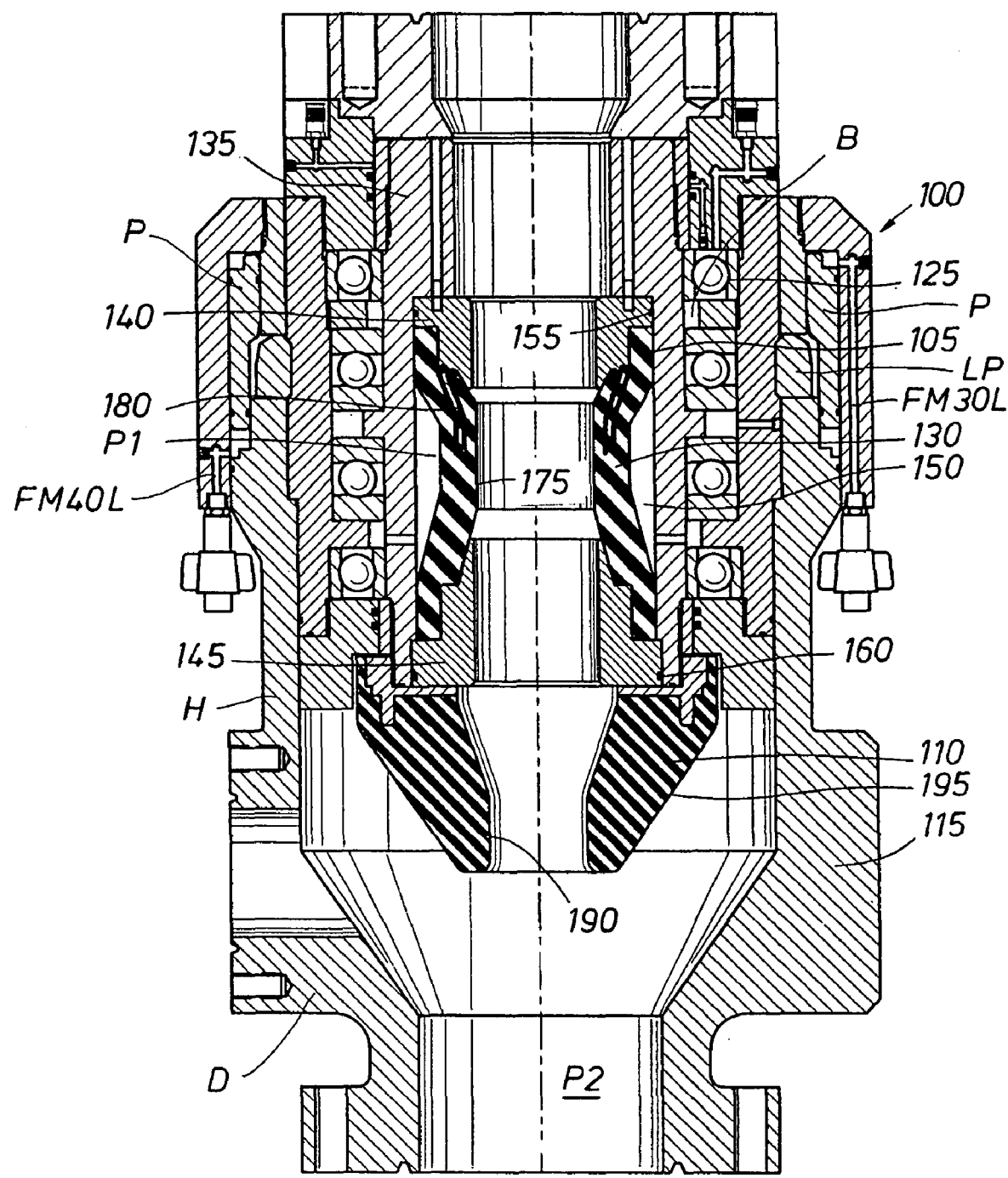
FIG. 1 is an elevational section view illustrating a rotating control head having an active seal assembly positioned above a passive seal assembly latched in a housing in accord with the present invention.

FIG. 1 is a cross-sectional view illustrating the rotating control head, generally indicated at 100, in accord with the present invention. The rotating control head 100 preferably includes an active seal assembly 105 and a passive seal assembly 110. Each seal assembly 105, 110 includes components that rotate with respect to a housing 115. The components that rotate in the rotating control head are mounted for rotation about a plurality of bearings 125.

As depicted, the active seal assembly 105 includes a bladder support housing 135 mounted within the plurality of bearings 125. The bladder support housing 135 is used to mount bladder 130. Under hydraulic pressure, as discussed below, bladder 130 moves radially inward to seal around a tubular, such as a drilling pipe or tubular (not shown). In this manner, bladder 130 can expand to seal off a borehole using the rotating control head 100.

As illustrated in FIG. 1, upper and lower caps 140, 145 fit over the respective upper and lower end of the bladder 130 to secure the bladder 130 within the bladder support housing 135. Typically, the upper and lower caps 140, 145 are secured in position by a setscrew (not shown). Upper and lower seals 155, 160 seal off chamber 150 that is preferably defined radially outwardly of bladder 130 and radially inwardly of bladder support housing 135.

Generally, fluid is supplied to the chamber 150 under a controlled pressure to energize the bladder 130. A hydraulic control will be illustrated and discussed in FIGS. 2-6. Essentially, the hydraulic control maintains and monitors hydraulic pressure within pressure chamber 150. Hydraulic pressure P1 is preferably maintained by the hydraulic control between 0 to 200 psi above a wellbore pressure P2. The bladder 130 is constructed from flexible material allowing bladder surface 175 to press against the tubular at approximately the same pressure as the hydraulic pressure P1. Due to the flexibility of the bladder, it also may conveniently seal around irregular shaped tubular string, such as a hexagonal kelly. In this respect, the hydraulic control maintains the differential pressure between the pressure chamber 150 at pressure P1 and wellbore pressure P2. Additionally, the active seal assembly 105 includes support fingers 180 to support the bladder 130 at the most stressful area of the seal between the fluid pressure P1 and the ambient pressure.

The hydraulic control may be used to de-energize the bladder 130 and allow the active seal assembly 105 to release the seal around the tubular. Generally, fluid in the chamber 150 is drained into a hydraulic reservoir (not shown), thereby reducing the pressure P1. Subsequently, the bladder surface 175 loses contact with the tubular as the bladder 130 becomes de-energized and moves radially outward. In this manner, the seal around the tubular is released allowing the tubular to be removed from the rotating control head 100.

In the embodiment shown in FIG. 1, the passive seal assembly 110 is operatively attached to the bladder support housing 135, thereby allowing the passive seal assembly 110 to rotate with the active seal assembly 105. Fluid is not required to operate the passive seal assembly 110 but rather it utilizes pressure P2 to create a seal around the tubular. The passive seal assembly 110 is constructed and arranged in an axially downward conical shape, thereby allowing the pressure P2 to act against a tapered surface 195 to close the passive seal assembly 110 around the tubular. Additionally, the passive seal assembly 110 includes an inner diameter 190 smaller than the outer diameter of the tubular to provide an interference fit between the tubular and the passive seal assembly 110.

FIG. 2A illustrates a rotating control head 200 cooled by heat exchanger 205. As shown, the rotating control head 200 is depicted generally to illustrate this embodiment of the invention, thereby applying this embodiment to a variety of different types of rotating control heads. A hydraulic control 210 provides fluid to the rotating control head 200. The hydraulic control 210 typically includes a reservoir 215 to contain a supply of fluid, a pump 220 to communicate the fluid from the reservoir 215 to the rotating control head 200 and a valve 225 to remove excess pressure in the rotating control head 200.

Generally, the hydraulic control 210 provides fluid to energize a bladder 230 and lubricate a plurality of bearings 255. As the fluid enters a port 235, the fluid is communicated to the plurality of bearings 255 and a chamber 240. As the chamber 240 fills with a fluid, pressure P1 is created. The pressure P1 acts against the bladder 230 causing the bladder 230 to expand radially inward to seal around a tubular string (not shown). Typically, the pressure P1 is maintained between 0-200 psi above a wellbore pressure P2.

The rotating control head 200 is cooled by the heat exchanger 205. The heat exchanger 205 is constructed and arranged to remove heat from the rotating control head 200 by introducing a gas, such as air, at a low temperature into an inlet 265 and thereafter transferring heat energy from a plurality of radial seals 275A and 275B and the plurality of bearings 255 to the gas as the gas passes through the heat exchanger 205. Subsequently, the gas at a higher temperature exits the heat exchanger 205 through an outlet 270. Typically, gas is pumped into the inlet 265 by a blowing apparatus (not shown). However, other means of communicating gas to the inlet 265 may be employed, so long as they are capable of supplying a sufficient amount of gas to the heat exchanger 205.

FIG. 2B illustrates a schematic view of the heat exchanger 205. As illustrated, the heat exchanger 205 comprises a passageway 280 with a plurality of substantially square curves. The passageway 280 is arranged to maximize the surface area covered by the heat exchanger 205. The low temperature gas entering the inlet 265 flows through the passageway 280 in the direction illustrated by arrow 285. As the gas circulates through the passageway 280, the gas increases in temperature as the heat from the rotating control head 200 is transferred to the gas. The high temperature gas exits the outlet 270 as indicated by the direction of arrow 285. In this manner, the heat generated by the rotating control head 200 is transferred to the gas passing through the heat exchanger 205.

Figure 3B:
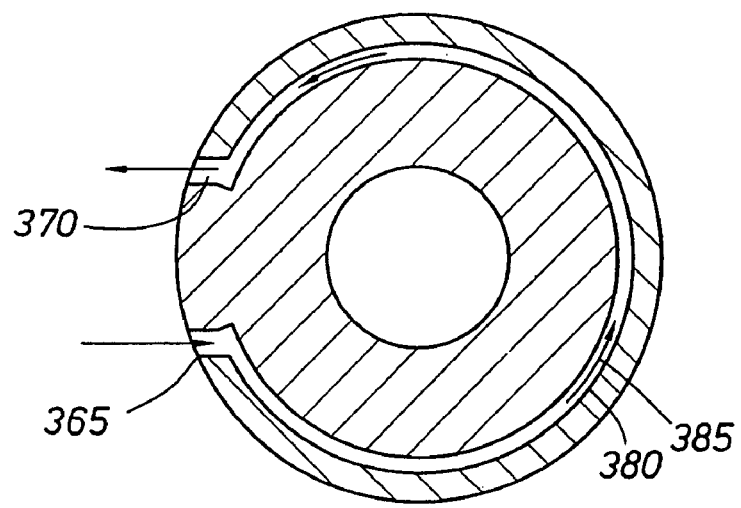
FIG. 3B illustrates a schematic view of the gas in a substantially circular passageway.
Figure 3A:
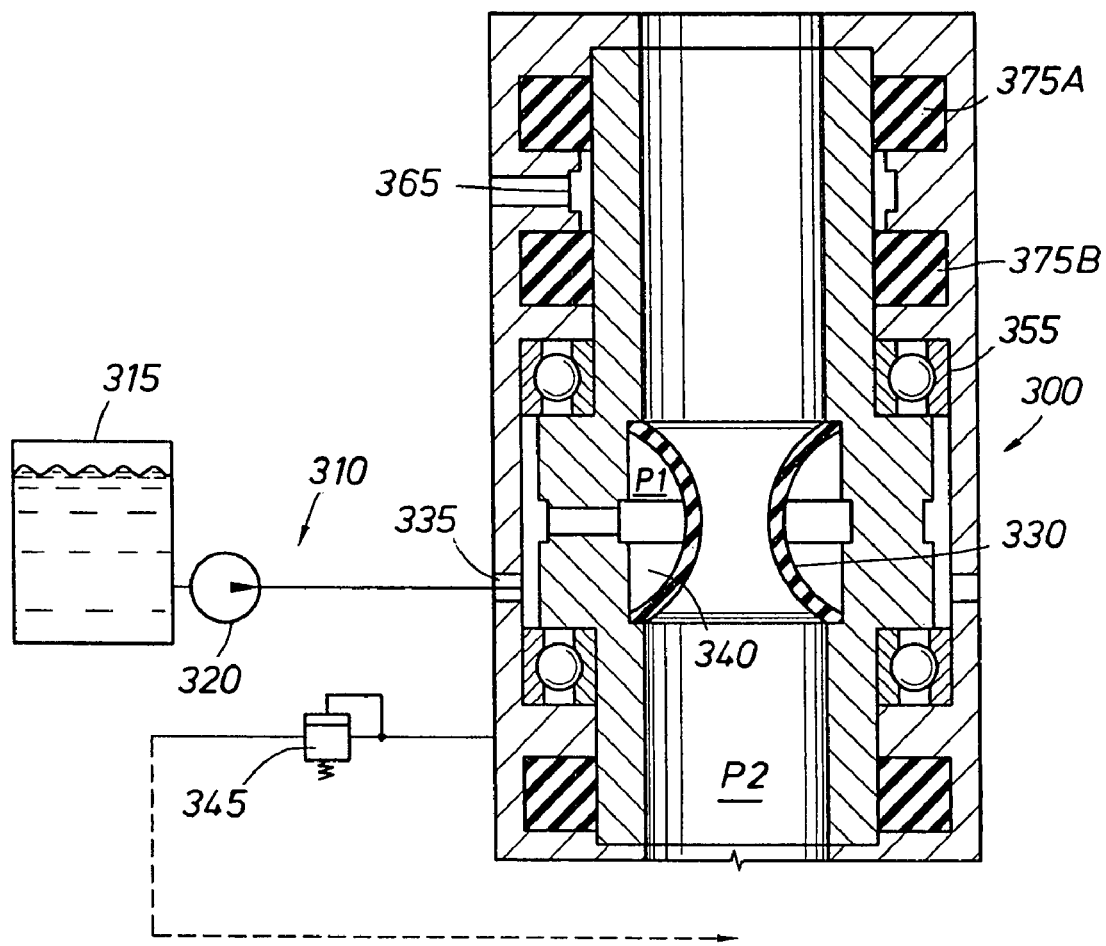
FIG. 3A illustrates a rotating control head cooled by flow a gas.

FIG. 3A illustrates a rotating control head 300 cooled by a gas. As shown, the rotating control head 300 is depicted generally to illustrate this embodiment of the invention, thereby applying this embodiment to a variety of different types of rotating control heads. A hydraulic control 310 supplies fluid to the rotating control head 300. The hydraulic control 310 typically includes a reservoir 315 to contain a supply of fluid and a pump 320 to communicate the fluid from the reservoir 315 to the rotating control head 300. Additionally, the hydraulic control 310 includes a valve 345 to relieve excess pressure in the rotating control head 300.

Generally, the hydraulic control 310 supplies fluid to energize a bladder 330 and lubricate a plurality of bearings 355. As the fluid enters a port 335, a portion is communicated to the plurality of bearings 355 and another portion is used to fill a chamber 340. As the chamber 340 fills with a fluid, a pressure P1 is created. Pressure P1 acts against the bladder 330 causing the bladder 330 to move radially inward to seal around a tubular (not shown). Typically, the pressure P1 is maintained between 0 to 200 psi above a wellbore pressure P2. If the wellbore pressure P2 drops, the pressure P1 may be relieved through valve 345 by removing a portion of the fluid from the chamber 340.

The rotating control head 300 is cooled by a flow of gas through a substantially circular passageway 380 through an upper portion of the rotating control head 300. The circular passageway 380 is constructed and arranged to remove heat from the rotating control head 300 by introducing a gas, such as air, at a low temperature into an inlet 365, transferring heat energy to the gas and subsequently allowing the gas at a high temperature to exit through an outlet 370. The heat energy is transferred from a plurality of radial seals 375A and 375B and the plurality of bearings 355 as the gas passes through the circular passageway 380. Typically, gas is pumped into the inlet 365 by a blowing apparatus (not shown). However, other means of communicating gas to the inlet 365 may be employed, so long as they are capable of supplying a sufficient amount of gas to the substantially circular passageway 380.

FIG. 3B illustrates a schematic view of the gas passing through the substantially circular passageway 380. The circular passageway 380 is arranged to maximize the surface area covered by the circular passageway 380. The low temperature gas entering the inlet 365 flows through the circular passageway 380 in the direction illustrated by arrow 385. As the gas circulates through the circular passageway 380, the gas increases in temperature as the heat from the rotating control head 300 is transferred to the gas. The high temperature gas exits the outlet 370 as indicated by the direction of arrow 385. In this manner, the heat generated by the rotating control head 300 is removed allowing the rotating control head 300 to function properly.

In an alternative embodiment, the rotating control head 300 may operate without the use of the circular passageway 380. In other words, the rotating control head 300 would function properly without removing heat from the plurality of radial seals 375A and 375B and the plurality of bearings 355. This alternative embodiment typically applies when the wellbore pressure P2 is relatively low.

Figure 4B:
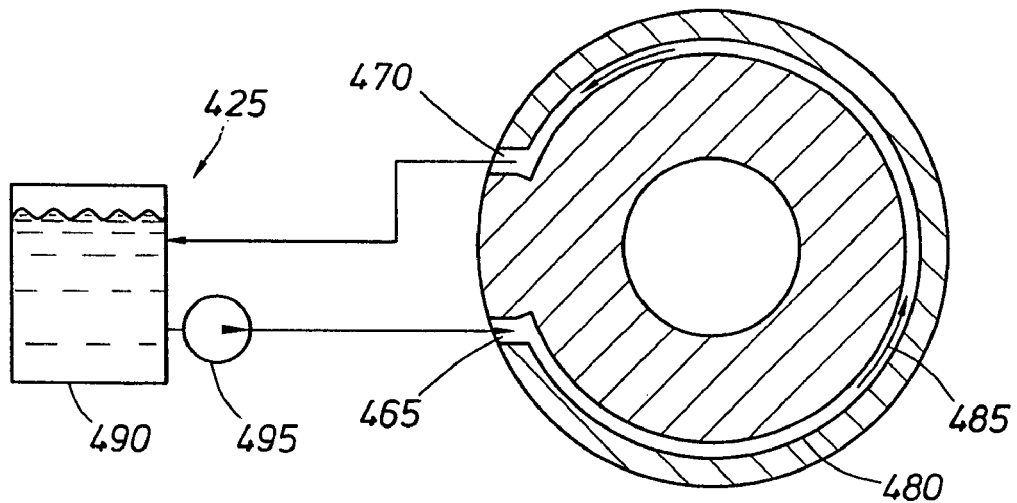
FIG. 4B illustrates a schematic view of the fluid mixture circulating in a substantially circular passageway.
Figure 4A:
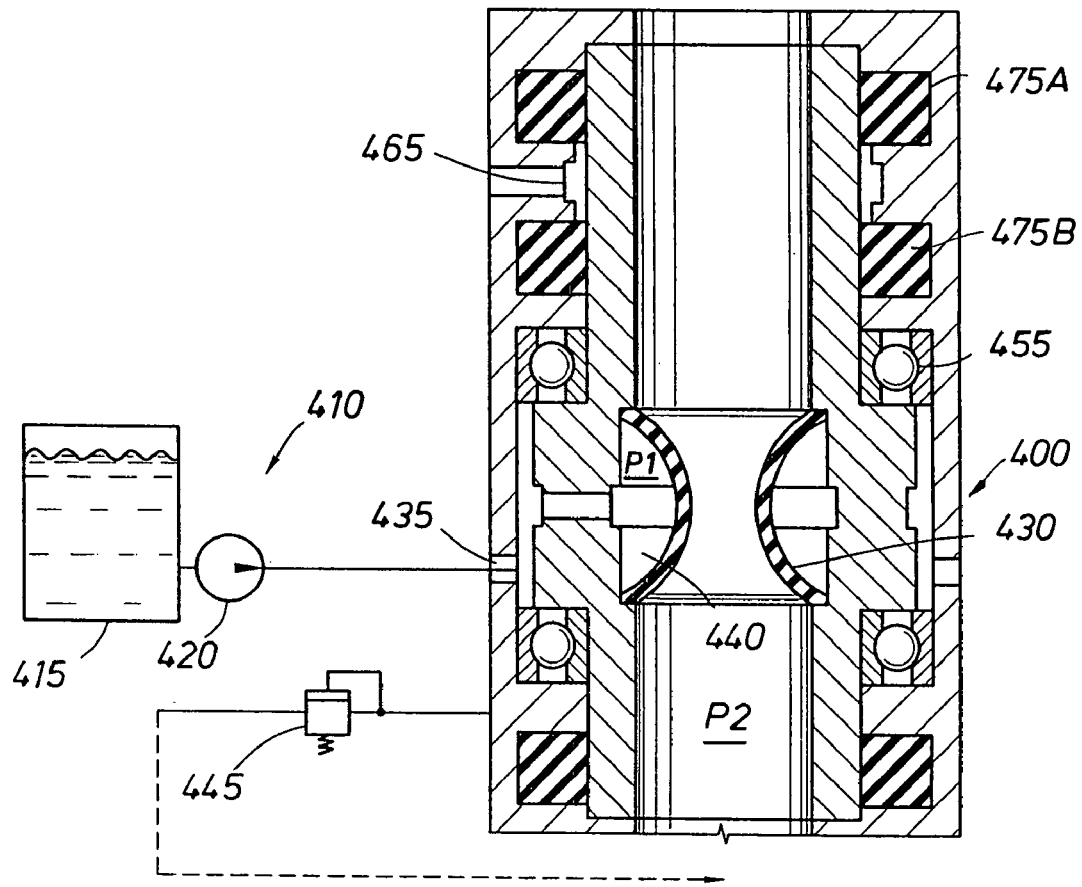
FIG. 4A illustrates a rotating control head cooled by a fluid mixture.

FIGS. 4A and 4B illustrate a rotating control head 400 cooled by a fluid mixture. As shown, the rotating control head 400 is depicted generally to illustrate this embodiment of the invention, thereby applying this embodiment to a variety of different types of rotating control heads. A hydraulic control 410 supplies fluid to the rotating control head 400. The hydraulic control 410 typically includes a reservoir 415 to contain a supply of fluid and a pump 420 to communicate the fluid from the reservoir 415 to the rotating control head 400. Additionally, the hydraulic control 410 includes a valve 445 to relieve excess pressure in the rotating control head 400. In the same manner as the hydraulic control 310, the hydraulic control 410 supplies fluid to energize a bladder 430 and lubricate a plurality of bearings 455.

The rotating control head 400 is cooled by a fluid mixture circulated through a substantially circular passageway 480 on an upper portion of the rotating control head 400. In the embodiment shown, the fluid mixture preferably consists of water or a water-glycol mixture. However, other mixtures of fluid may be employed, so long as, the fluid mixture has the capability to circulate through the circular passageway 480 and reduce the heat in the rotating control head 400.

The circular passageway 480 is constructed and arranged to remove heat from the rotating control head 400 by introducing the fluid mixture at a low temperature into an inlet 465, transferring heat energy to the fluid mixture and subsequently allowing the fluid mixture at a high temperature to exit through an outlet 470. The heat energy is transferred from a plurality of radial seals 475A and 475B and the plurality of bearings 455 as the fluid mixture circulates through the circular passageway 480. The fluid mixture is preferably pumped into the inlet 465 through a fluid circuit 425. The fluid circuit 425 is comprised of a reservoir 490 to contain a supply of the fluid mixture and a pump 495 to circulate the fluid mixture through the rotating control head 400.

FIG. 4B illustrates a schematic view of the fluid mixture circulating in the substantially circular passageway 480. The circular passageway 480 is arranged to maximize the surface area covered by the circular passageway 480. The low temperature fluid entering the inlet 465 flows through the circular passageway 480 in the direction illustrated by arrow 485. As the fluid circulates through the circular passageway 480, the fluid increases in temperature as the heat from the rotating control head 400 is transferred to the fluid. The high temperature fluid exits out the outlet 470 as indicated by the direction of arrow 485. In this manner, the heat generated by the rotating control head 400 is removed allowing the rotating control head 400 to function properly.

Figure 5B:
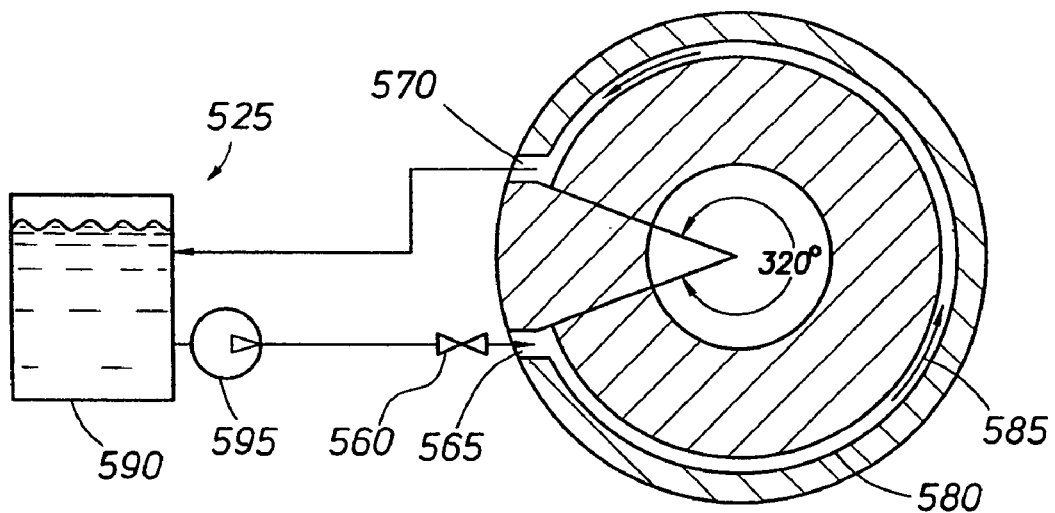
FIG. 5B illustrates a schematic view of the refrigerant circulating in a substantially circular passageway.
Figure 5A:
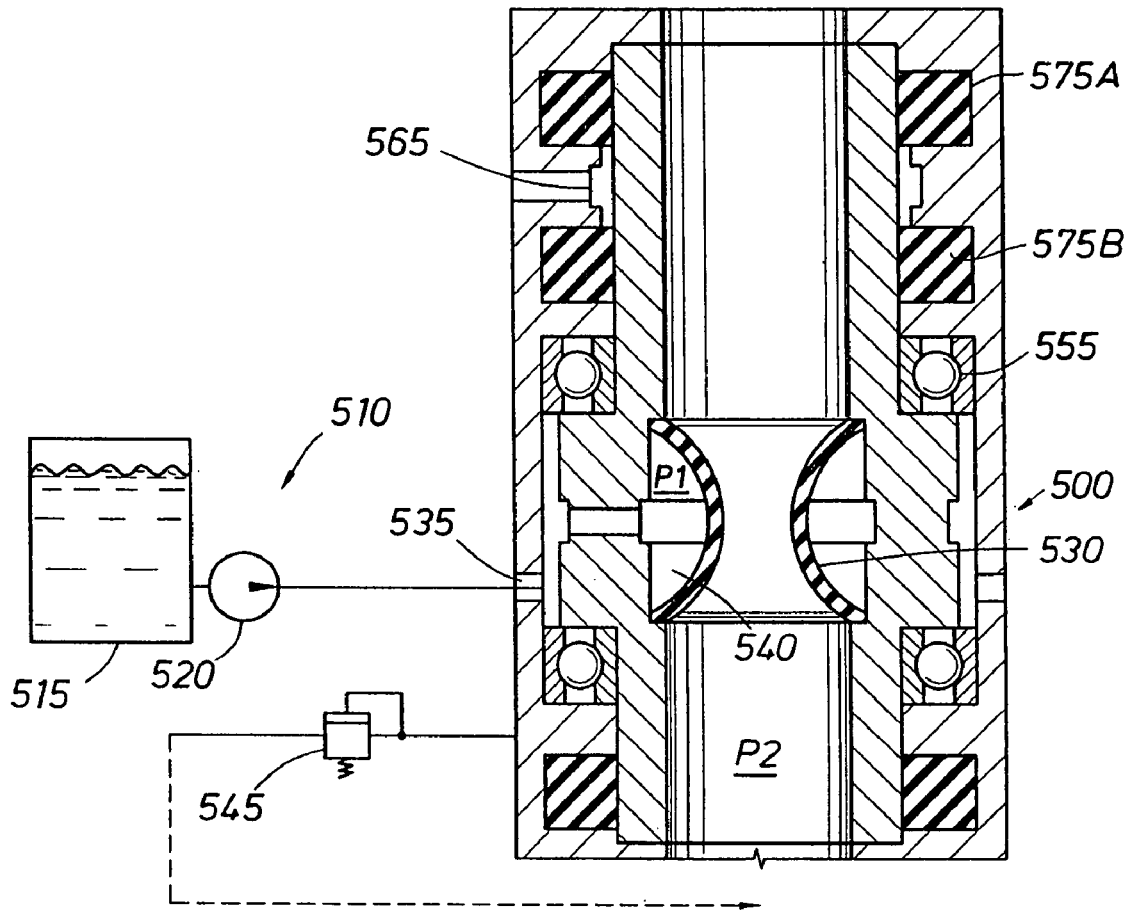
FIG. 5A illustrates the rotating control head cooled by a refrigerant.

FIGS. 5A and 5B illustrate a rotating control head 500 cooled by a refrigerant. As shown, the rotating control head 500 is depicted generally to illustrate this embodiment of the invention, thereby applying this embodiment to a variety of different types of rotating control heads. A hydraulic control 510 supplies fluid to the rotating control head 500. The hydraulic control 510 typically includes a reservoir 515 to contain a supply of fluid and a pump 520 to communicate the fluid from the reservoir 515 to the rotating control head 500. Additionally, the hydraulic control 510 includes a valve 545 to relieve excess pressure in the rotating control head 500. In the same manner as the hydraulic control 310, the hydraulic control 510 supplies fluid to energize a bladder 530 and lubricate a plurality of bearings 555.

The rotating control head 500 is cooled by a refrigerant circulated through a substantially circular passageway 580 in an upper portion of the rotating control head 500. The circular passageway 580 is constructed and arranged to remove heat from the rotating control head 500 by introducing the refrigerant at a low temperature into an inlet 565, transferring heat energy to the refrigerant and subsequently allowing the refrigerant at a high temperature to exit through an outlet 570. The heat energy is transferred from a plurality of radial seals 575A and 575B and the plurality of bearings 555 as the refrigerant circulates through the circular passageway 580. The refrigerant is preferably communicated into the inlet 565 through a refrigerant circuit 525. The refrigerant circuit 525 includes a reservoir 590 containing a supply of vapor refrigerant. A compressor 595 draws the vapor refrigerant from the reservoir 590 and compresses the vapor refrigerant into a liquid refrigerant. Thereafter, the liquid refrigerant is communicated to an expansion valve 560. At this point, the expansion valve 560 changes the low temperature liquid refrigerant into a low temperature vapor refrigerant as the refrigerant enters inlet 565.

FIG. 5B illustrates a schematic view of the vapor refrigerant circulating in the substantially circular passageway 580. The circular passageway 580 is arranged in an approximately 320-degree arc to maximize the surface area covered by the circular passageway 580. The low temperature vapor refrigerant entering the inlet 565 flows through the circular passageway 580 in the direction illustrated by arrow 585. As the vapor refrigerant circulates through the circular passageway 580, the vapor refrigerant increases in temperature as the heat from the rotating control head 500 is transferred to the vapor refrigerant. The high temperature vapor refrigerant exits out the outlet 570 as indicated by the direction of arrow 585. Thereafter, the high temperature vapor refrigerant rejects the heat to the environment through a heat exchanger (not shown) and returns to the reservoir 590. In this manner, the heat generated by the rotating control head 500 is removed allowing the rotating control head 500 to function properly.

Figure 6:
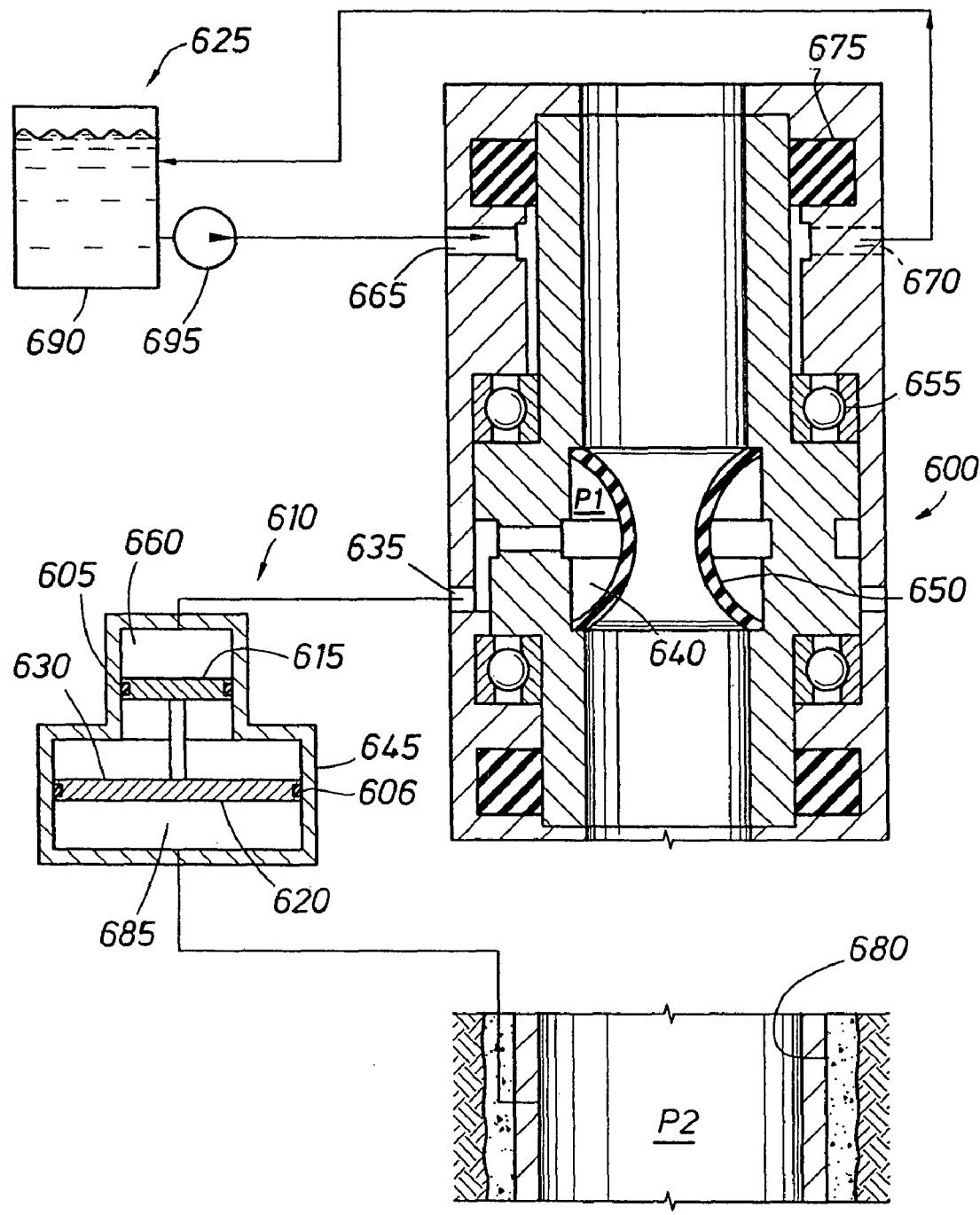
FIG. 6 illustrates a rotating control head actuated by a piston intensifier in communication with the wellbore pressure.

FIG. 6 illustrates a rotating control head 600 actuated by a piston intensifier circuit 610 in communication with a wellbore 680. As shown, the rotating control head 600 is depicted generally to illustrate this embodiment of the invention, thereby applying this embodiment to a variety of different types of rotating control heads. The piston intensifier circuit 610 supplies fluid to the rotating control head 600. The piston intensifier circuit 610 typically includes a housing 645 and a piston arrangement 630. The piston arrangement, generally indicated at 630, is formed from a larger piston 620 and a smaller piston 615. The pistons 615, 620 are constructed and arranged to maintain a pressure differential between a hydraulic pressure P1 and a wellbore pressure P2. In other words, the pistons 615, 620 are designed with a specific surface area ratio to maintain about a 200 psi pressure differential between the hydraulic pressure P1 and the wellbore pressure P2, thereby allowing the P1 to be 200 psi higher than P2. The piston arrangement 630 is disposed in the housing 645 to form an upper chamber 660 and lower chamber 685. Additionally, a plurality of seal members 605, 606 are disposed around the pistons 615, 620, respectively, to form a fluid tight seal between the chambers 660, 685.

The piston intensifier circuit 610 mechanically provides hydraulic pressure P1 to energize a bladder 650. Initially, fluid is filled into upper chamber 660 and is thereafter sealed. The wellbore fluid from the wellbore 680 is in fluid communication with lower chamber 685. Therefore, as the wellbore pressure P2 increases more wellbore fluid is communicated to the lower chamber 685 creating a pressure in the lower chamber 685. The pressure in the lower chamber 685 causes the piston arrangement 630 to move axially upward forcing fluid in the upper chamber 660 to enter port 635 and pressurize a chamber 640. As the chamber 640 fills with a fluid, the pressure P1 increases causing the bladder 650 to move radially inward to seal around a tubular (not shown). In this manner, the bladder 650 is energized allowing the rotating control head 600 to seal around a tubular.

A fluid, such as water-glycol, is circulated through the rotating control head 600 by a fluid circuit 625. Typically, heat on the rotating control head 600 is removed by introducing the fluid at a low temperature into an inlet 665, transferring heat energy to the fluid and subsequently allowing the fluid at a high temperature to exit through an outlet 670. The heat energy is transferred from a plurality of radial seals 675A and 675B and the plurality of bearings 655 as the fluid circulates through the rotating control head 600. The fluid is preferably pumped into the inlet 665 through the fluid circuit 625. Generally, the circuit 625 comprises a reservoir 690 to contain a supply of the fluid and a pump 695 to circulate the fluid through the rotating control head 600.

In another embodiment, the piston intensifier circuit 610 is in fluid communication with a nitrogen gas source (not shown). In this embodiment, a pressure transducer (not shown) measures the wellbore pressure P2 and subsequently injects nitrogen into the lower chamber 685 at the same pressure as pressure P2. The nitrogen pressure in the lower chamber 685 may be adjusted as the wellbore pressure P2 changes, thereby maintaining the desired pressure differential between hydraulic pressure P1 and wellbore pressure P2.

Figure 7B:
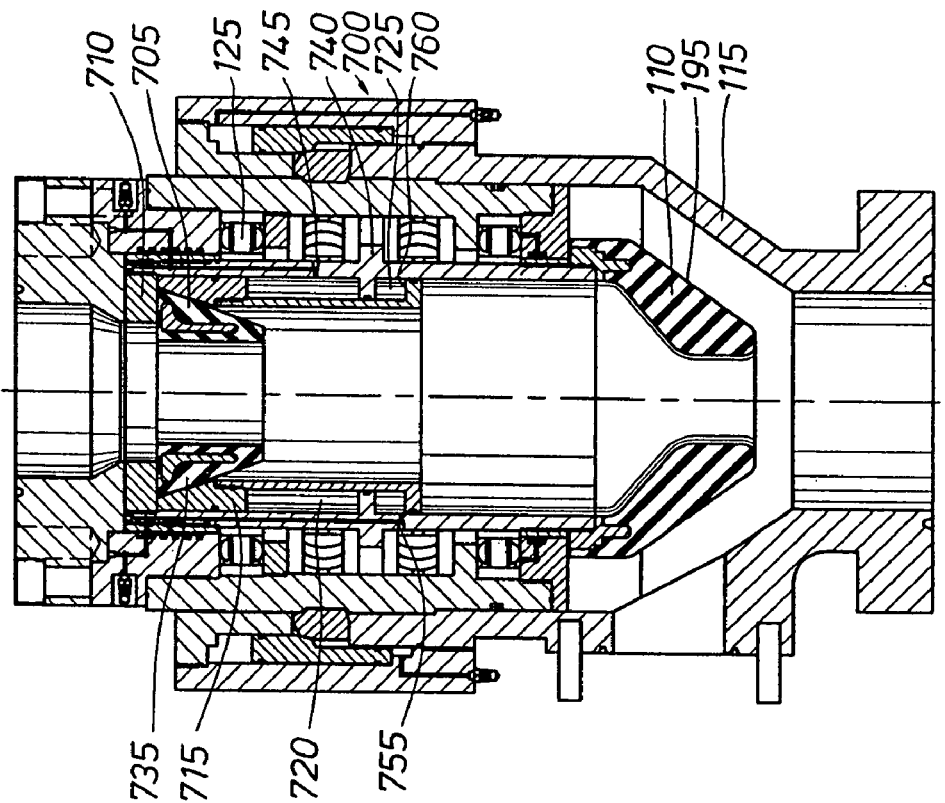
FIG. 7B illustrates the rotating control head of FIG. 7A with the annular BOP in a locked position.
Figure 7A:
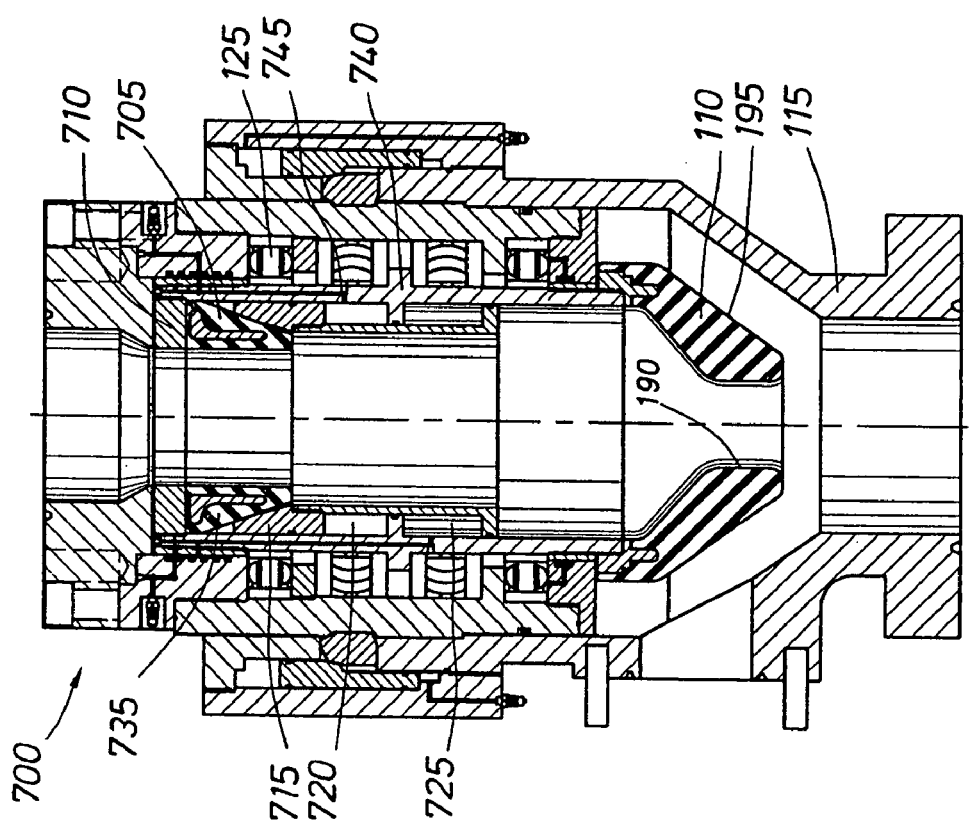
FIG. 7A illustrates an alternative embodiment of a rotating control head with a passive seal assembly and an active seal assembly mechanical annular blowout preventer (BOP) in an unlocked position.

FIG. 7A illustrates an alternative embodiment of a rotating control head 700 in an unlocked position. The rotating control head 700 is arranged and constructed in a similar manner as the rotating control head 100 shown on FIG. 1. Therefore, for convenience, similar components that function in the same manner will be labeled with the same numbers as the rotating control head 100. The primary difference between the rotating control head 700 and rotating control head 100 is the active seal assembly.

As shown in FIG. 7A, the rotating control head 700 includes an active seal assembly, generally indicated at 705. The active seal assembly 705 includes a primary seal 735 that moves radially inward as a piston 715 wedges against a tapered surface of the seal 735. The primary seal 735 is constructed from flexible material to permit sealing around irregularly shaped tubular string such as a hexagonal kelly. The upper end of the seal 735 is connected to a top ring 710.

The active sealing assembly 705 includes an upper chamber 720 and a lower chamber 725. The upper chamber 720 is formed between the piston 715 and a piston housing 740. To move the rotating control head 700 from an unlocked or relaxed position to a locked or sealed position, fluid is pumped through port 745 into an upper chamber 720. As fluid fills the upper chamber 720, the pressure created acts against the lower end of the piston 715 and urges the piston 715 axially upward towards the top ring 710. At the same time, the piston 715 wedges against the tapered portion of the primary seal 735 causing the seal 735 to move radially inward to seal against the tubular (not shown). In this manner, the active seal assembly 705 is in the locked or sealed position as illustrated in FIG. 7B.

As shown on FIG. 7B, the piston 715 has moved axially upward contacting the top ring 710 and the primary seal 735 has moved radially inward. To move the active seal assembly 705 from the locked position to the unlocked position, fluid is pumped through port 755 into the lower chamber 725. As the chamber fills up, the fluid creates a pressure that acts against surface 760 to urge the piston 715 axially downward, thereby allowing the primary seal 735 to move radially outward, as shown on FIG. 7A.

Figure 8:
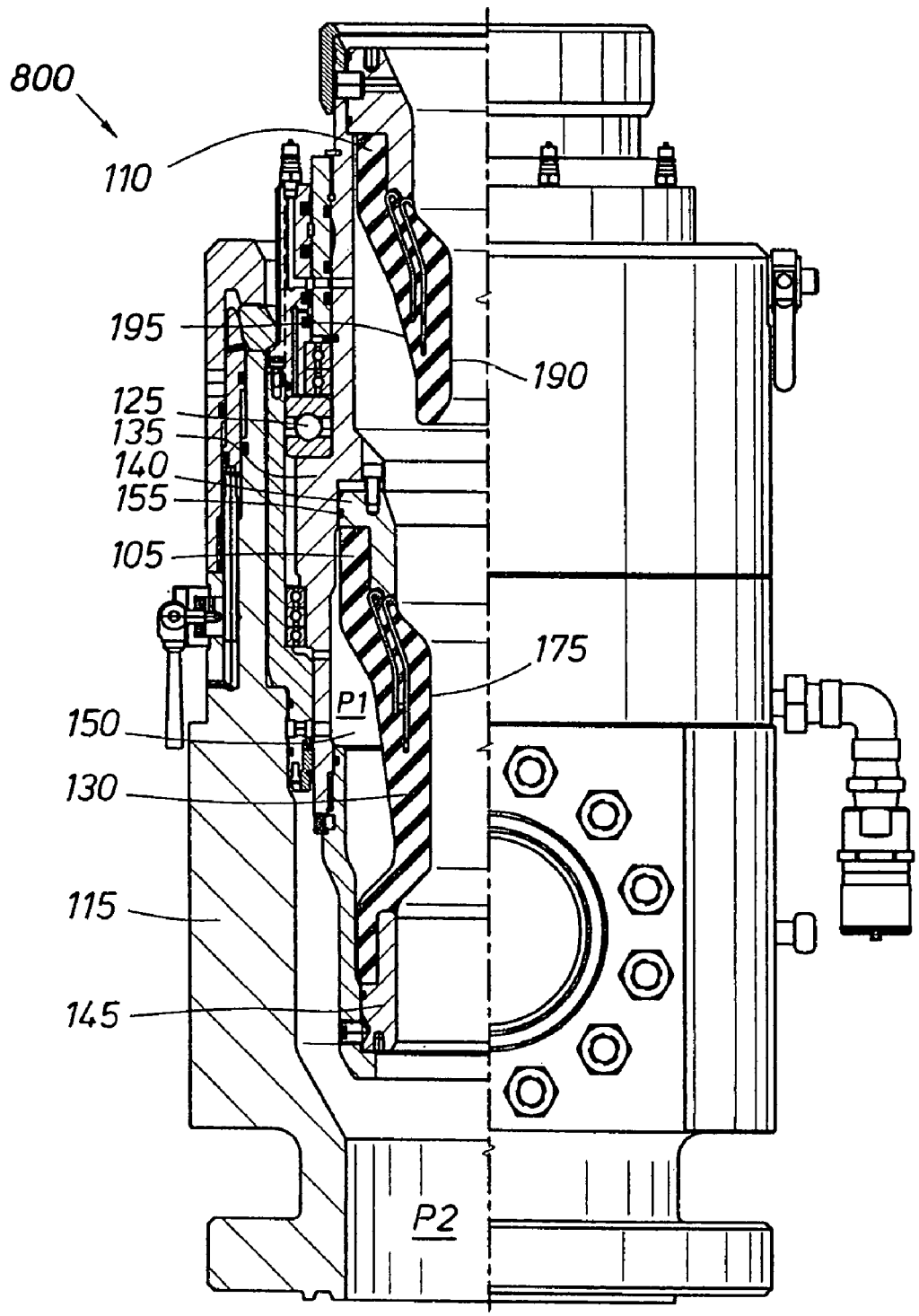
FIG. 8 illustrates an alternative embodiment of a rotating control head with a passive seal assembly positioned above an active seal assembly in accord with the present invention.

FIG. 8 illustrates an alternative embodiment of a rotating control head 800 in accord with the present invention. The rotating control head 800 is constructed from similar components as the rotating control head 100, as shown on FIG. 1. Therefore, for convenience, similar components that function in the same manner will be labeled with the same numbers as the rotating control head 100. The primary difference between the rotating control head 800 and rotating control head 100 is the location of the active seal assembly 105 and the passive seal assembly 110.

As shown in FIG. 8, the passive seal assembly 110 is disposed above the active seal assembly 105. The passive seal assembly 110 is operatively attached to the bladder support housing 135, thereby allowing the passive seal assembly 110 to rotate with the active seal assembly 105. The passive seal assembly 110 is constructed and arranged in an axially downward conical shape, thereby allowing the pressure in the rotating control head 800 to act against the tapered surface 195 and close the passive seal assembly 110 around the tubular (not shown). Additionally, the passive seal assembly 110 includes the inner diameter 190, which is smaller than the outer diameter of the tubular to allow an interference fit between the tubular and the passive seal assembly 110.

As depicted, the active seal assembly 105 includes the bladder support housing 135 mounted on the plurality of bearings 125. The bladder support housing 135 is used to mount bladder 130. Under hydraulic pressure, bladder 130 moves radially inward to seal around a tubular such as a drilling tubular (not shown). Generally, fluid is supplied to the chamber 150 under a controlled pressure to energize the bladder 130. Essentially, a hydraulic control (not shown) maintains and monitors hydraulic pressure within pressure chamber 150. Hydraulic pressure P1 is preferably maintained by the hydraulic control between 0 to 200 psi above a wellbore pressure P2. The bladder 130 is constructed from flexible material allowing bladder surface 175 to press against the tubular at approximately the same pressure as the hydraulic pressure P1.

The hydraulic control may be used to de-energize the bladder 130 and allow the active seal assembly 105 to release the seal around the tubular. Generally, the fluid in the chamber 150 is drained into a hydraulic reservoir (not shown), thereby reducing the pressure P1. Subsequently, the bladder surface 175 loses contact with the tubular as the bladder 130 becomes de-energized and moves radially outward. In this manner, the seal around the tubular is released allowing the tubular to be removed from the rotating control head 800.

Figure 9:
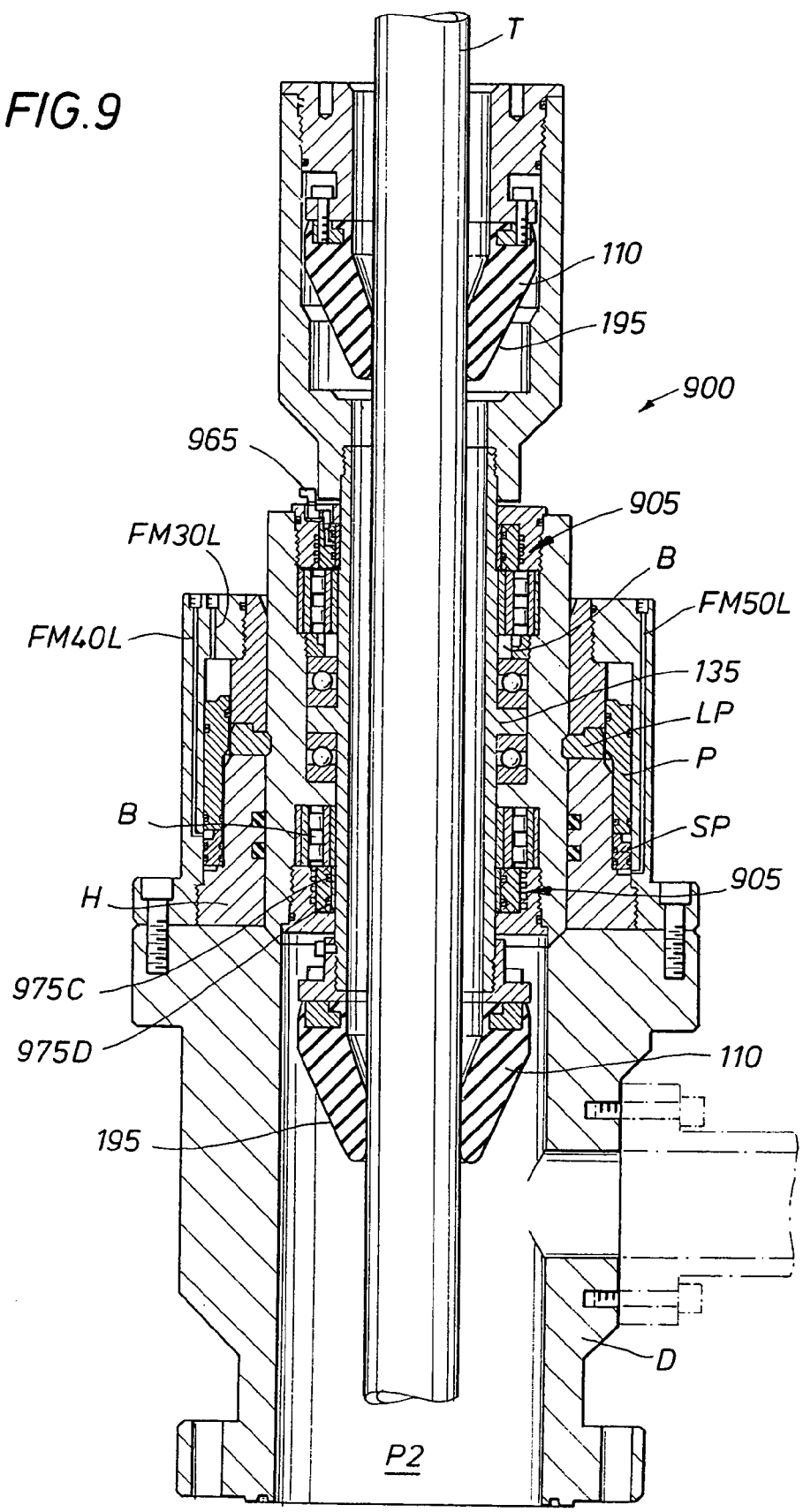
FIG. 9 is an elevational section view showing a rotating control head with two passive seal assemblies latched in a housing in accord with the present invention.
Figure 10:
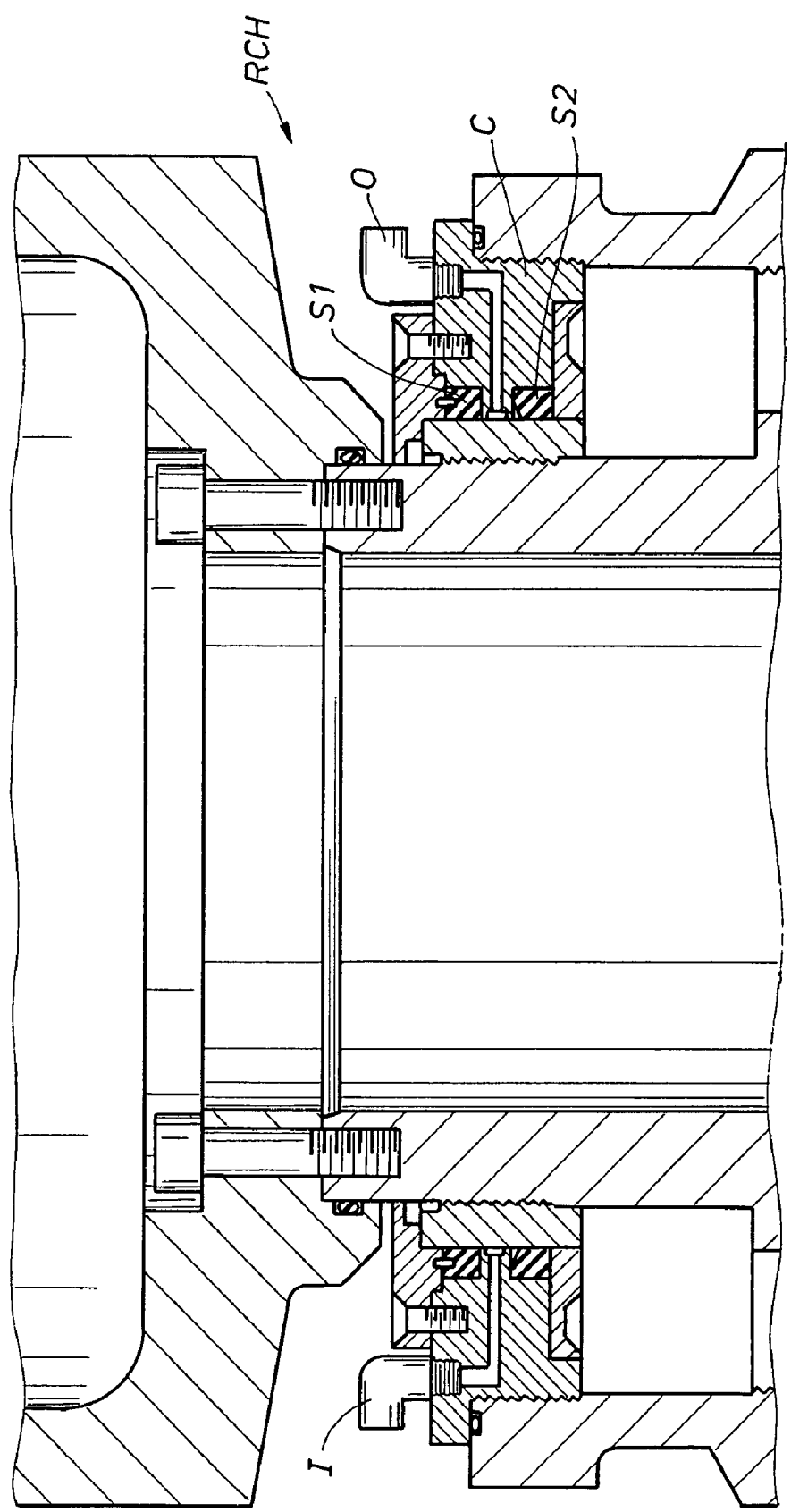
FIG. 10 is an enlarged section view of a prior art rotating control head system where cooling fluid moves through the seal carrier in a single pass but with the fluid external to the bearing section.

FIG. 9 illustrates another alternative embodiment of a rotating control head, generally indicated at 900. The rotating control head 900 is generally constructed from similar components as the rotating control head 100, as shown in FIG. 1. Therefore, for convenience, similar components that function in the same manner will be labeled with the same numbers as the rotating control head 100. The primary difference between rotating control head 900 and rotating control head 100 is the use of two passive seal assemblies 110, an alternative cooling system using one fluid to cool the radial seals and bearings in combination with a radial seal pressure protection system, and a secondary piston SP in addition to a primary piston P for urging the piston P to the unlatched position. These differences will be discussed below in detail.

While FIG. 9 shows the rotating control head 900 latched in a housing H above a diverter D, it is contemplated that the rotating control heads as shown in the figures could be positioned with any housing or riser as disclosed in U.S. Pat. Nos. 6,138,774, 6,263,982, 6,470,975, U.S. patent application Ser. No. 10/281,534, filed Oct. 28, 2002 and published Jun. 12, 2003 under U.S. Patent Application No. 2003-0106712-A1, or U.S. patent application Ser. No. 10/995,980, filed Nov. 23, 2004, all of which are assigned to the assignee of the present invention and incorporated herein by reference for all purposes.

As shown in FIG. 9, both passive seal assemblies 110 are operably attached to the inner member support housing 135, thereby allowing the passive seal assemblies to rotate together. The passive seal assemblies are constructed and arranged in an axially-downward conical shape, thereby allowing the wellbore pressure P2 in the rotating control head 900 to act against the tapered surfaces 195 to close the passive seal assemblies around the tubular T. Additionally, the passive seal assemblies include inner diameters which are smaller than the outer diameter of the tubular T to allow an interference fit between the tubular and the passive seal assemblies.

Figure 11:
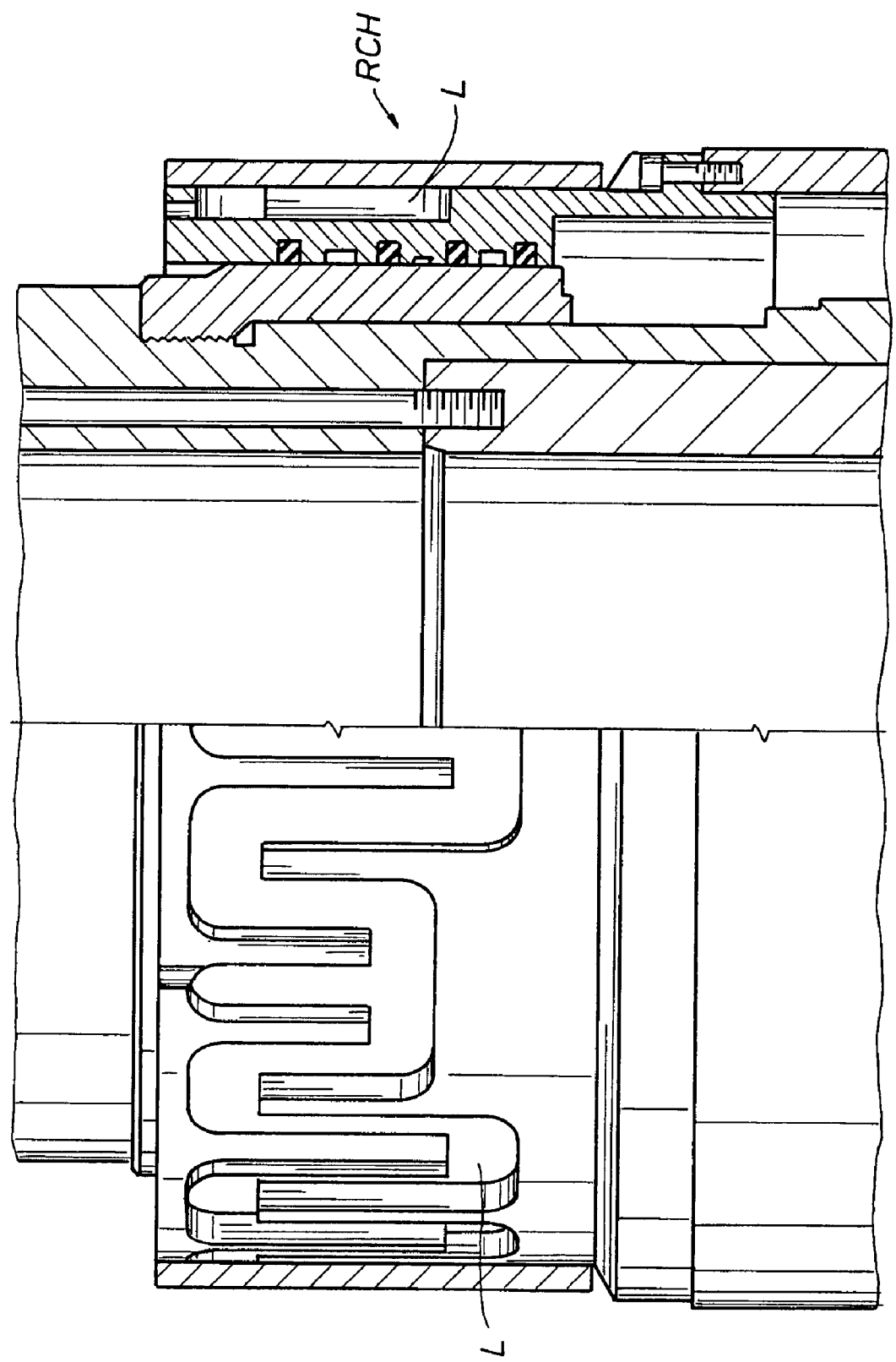
FIG. 11 is an enlarged section view of a rotating control head cooling system where air moves through a passageway similar to the passageway shown in above FIGS. 2A and 2B.

FIG. 11 discloses a cooling system where air enters a passageway, formed as a labyrinth L, in a rotating control head RCH similar to the passageway shown in FIGS. 2A and 2B of the present invention.

Figure 12:
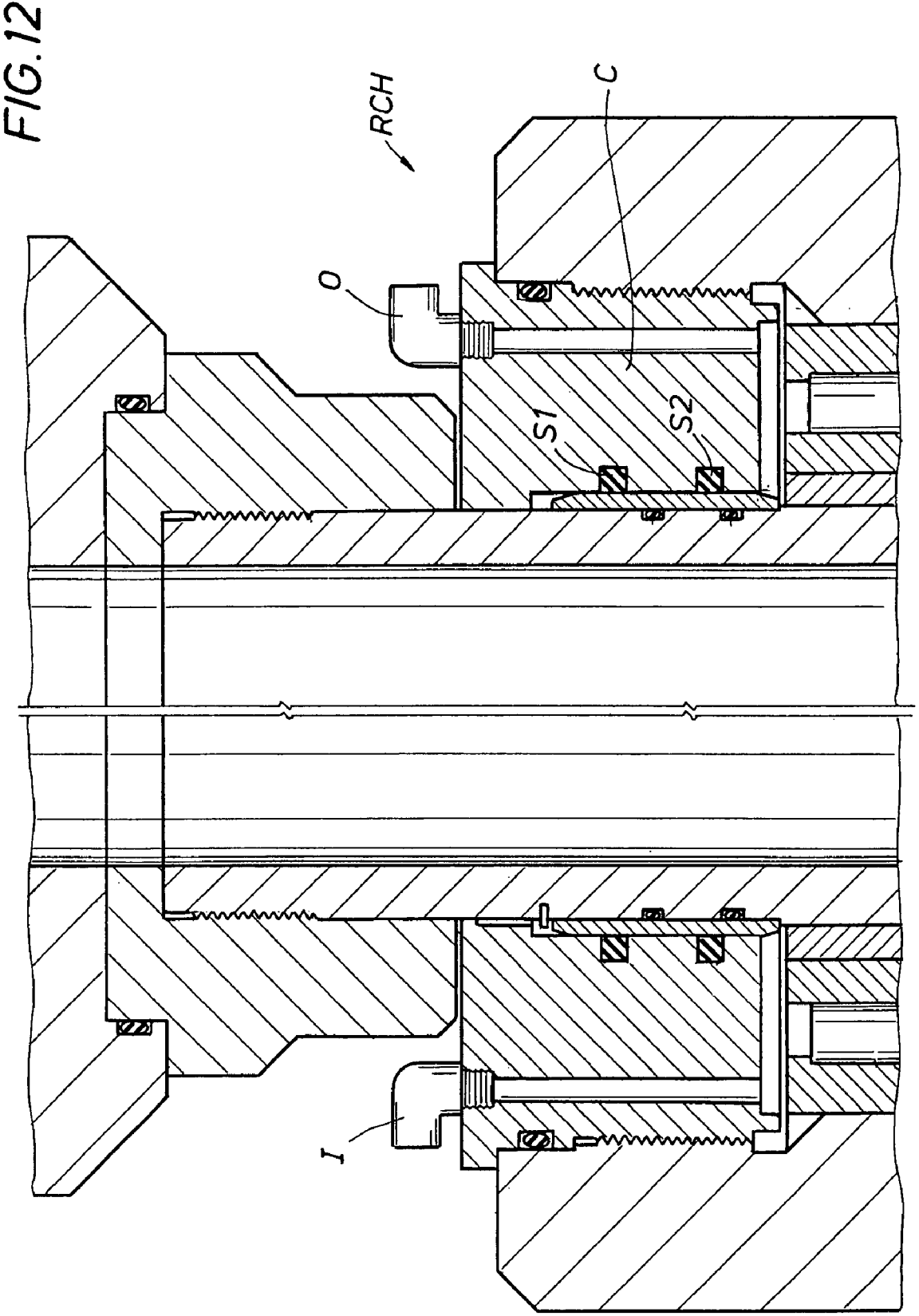
FIG. 12 is an enlarged section view of a rotating control head where hydraulic fluid moves through the seal carrier to cool the top radial seals in a single pass.

FIG. 12 discloses a cooling system where hydraulic fluid moving through inlet I to outlet O is used to cool the top radial seals S1 and S2 with a seal carrier in a rotating control head RCH.

Figure 13:
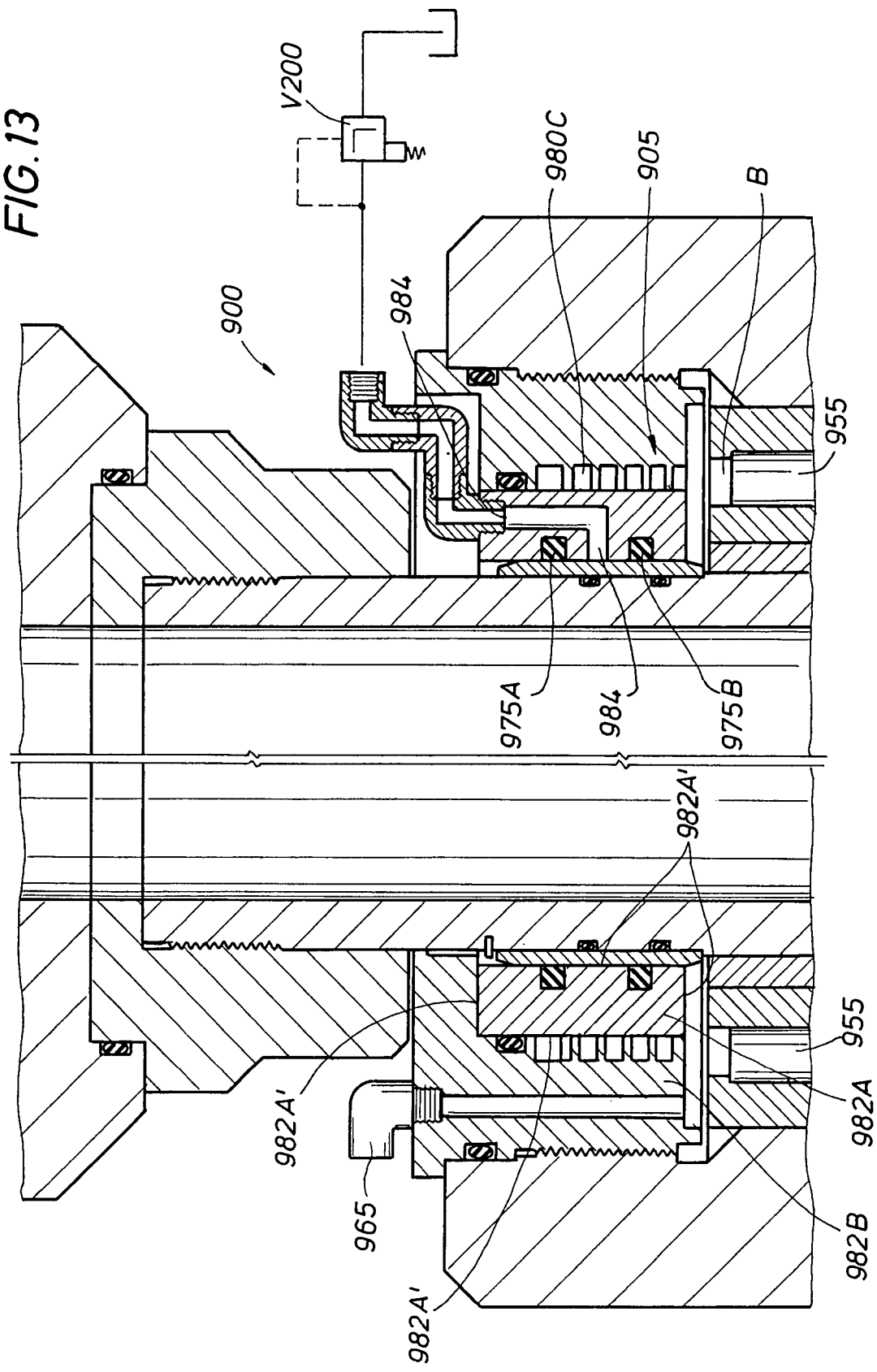
FIG. 13 is an enlarged section view showing staging pressure on radial seals for a rotating control head in accord with the present invention, including regulating pressure between an upper top radial seal and a high flow lower top radial seal.

Turning now to FIGS. 9, 13 and 14, the rotating control head 900 is cooled by a heat exchanger, generally indicated at 905. As best shown in FIGS. 13 and 14, heat exchanger 905 is constructed and arranged to remove heat from the rotating control head 900 using a fluid, such as an unctuous combustible substance. One such unctuous combustible substance is a hydraulic oil, such as Mobil 630 ISO 90 weight oil. This fluid is introduced at a low temperature into inlet 965, thereafter transferring heat from upper top radial seal 975A and lower top radial seal 975B, via seal carrier 982A and its thermal transfer surfaces 982A' and a plurality of bearings, including bearings 955, to the fluid as the fluid passes through the heat exchanger 905 and, as best shown in FIG. 14, to outlet 970.

In particular, the top radial seals 975A and 975B are cooled by circulating the hydraulic fluid, preferably oil, in and out of the bearing section B and making multiple passes around the seals 975A and 975B through a continuous spiral slot 980C in the seal housing 982B, as best shown in FIGS. 9, 13 and 14. Since the hydraulic fluid that passes through slot passageway or slot 980C is the same fluid used to pressure the bearing section B, the fluid can be circulated close to and with the radial seals 975A and 975B to improve the heat transfer properties. Although the illustrated embodiment uses a continuous spiral slot, other embodiments are contemplated for different methods for making multiple passes with one fluid adjacent to and in fluid contact with the radial seals.

As best shown in FIG. 14, the passageway of the heat exchanger 905 includes inlet passageway 980A, outlet passageway 980B, and slot passageway 980C that spirals between the lower portion of inlet passageway 980A to upper outlet passageway 980B. These multiple passes adjacent the radial seals 975A and 975B maximize the surface area covered by the heat exchanger 905. The temperature hydraulic oil entering the inlet 965 flows through the passageway in the direction illustrated by arrows 985. As the oil circulates through the passageway, the oil increases in temperature as the heat from the rotating control head 900 is transferred to the oil. The higher temperature oil exits the outlet 970. In this manner, the heat generated about the top radial seals in the rotating control head 900 is transferred to the oil passing through the multiple pass heat exchanger 905. Moreover, separate fluids are not used to cool and to lubricate the rotating control head 900. Instead, only one fluid, such as a Mobil 630 ISO fluid 90 weight oil, is used to both cool and lubricate the rotating control head 900.

Returning to FIG. 9, it is contemplated that a similar cooling system using the multiple pass heat exchanger of the present invention could be used to cool the bottom radial seals 975C and 975D of the rotating control head 900.

Returning now to FIG. 13, the top radial seals 975A and 975B are staged in tandem or series. The lower top radial seal 975B, which would be closer to the bearings 955, is a high flow seal that would allow approximately two gallons of oil per minute to pass by seal 975B. The upper top radial seal 975A, which would be the seal closer to the atmosphere or environment, would be a low flow seal that would allow approximately 1 cc of oil per hour to pass by the seal 975A. A port 984, accessible from the atmosphere, is formed between the radial seals 975A and 975B. As illustrated in both FIGS. 13 and 15B, an electronically-controlled valve, generally indicated at V200, would regulate the pressure between the radial seals 975A and 975B. Preferably, as discussed below in detail, the pressure on upper top radial seal 975A is approximately half the pressure on lower top radial seal 975B so that the differential pressure on each radial seal is lower, which in turn reduces the PV factor by approximately half. Testing of a Weatherford model 7800 rotating control head has shown that when using a Kalsi seal, with part number 381-6-11, for the upper top radial seal 975A, and a modified (as discussed below) Kalsi seal, with part number 432-32-10CCW (cutting and gluing), for the lower top radial seal 975B, has shown increased seal life of the top radial seals.

The Kalsi seals referred to herein can be obtained from Kalsi Engineering, Inc. of Sugar Land, Tex. The preferred Kalsi 381-6-11 seal is stated by Kalsi Engineering, Inc. to have a nominal inside diameter of 10½", a seal radial depth of 0.415"±0.008", a seal axial width of 0.300", a gland depth of 0.380", a gland width of 0.342" and an approximate as-molded seal inside diameter of 10.500" (266.7 mm). This seal is further stated by Kalsi to be fabricated from HSN (peroxide cured, high ACN) with a material hardness of Shore A durometer of 85 to 90. While the preferred Kalsi 432-32-10CCW seal is stated by Kalsi Engineering, Inc. to have a nominal inside diameter of 42.375", a seal radial depth of 0.460"±0.007", a seal axial width of 0.300", a gland width of 0.342" and an approximate as-molded seal inside diameter of 42.375" (1,076 mm), this high flow seal was reduced to an inside diameter the same as the preferred Kalsi 381-6-11 seal, i.e. 10½". This high flow seal 975B is further stated by Kalsi to be fabricated from HSN (fully saturated peroxide cured, medium-high ACN) with a material hardness of Shore A durometer of 85±5. It is contemplated that other similar sizes and types of manufacturers' seals, such as seals provided by Parker Hannifin of Cleveland, Ohio, could be used.

Startup Operation

Figure 25:
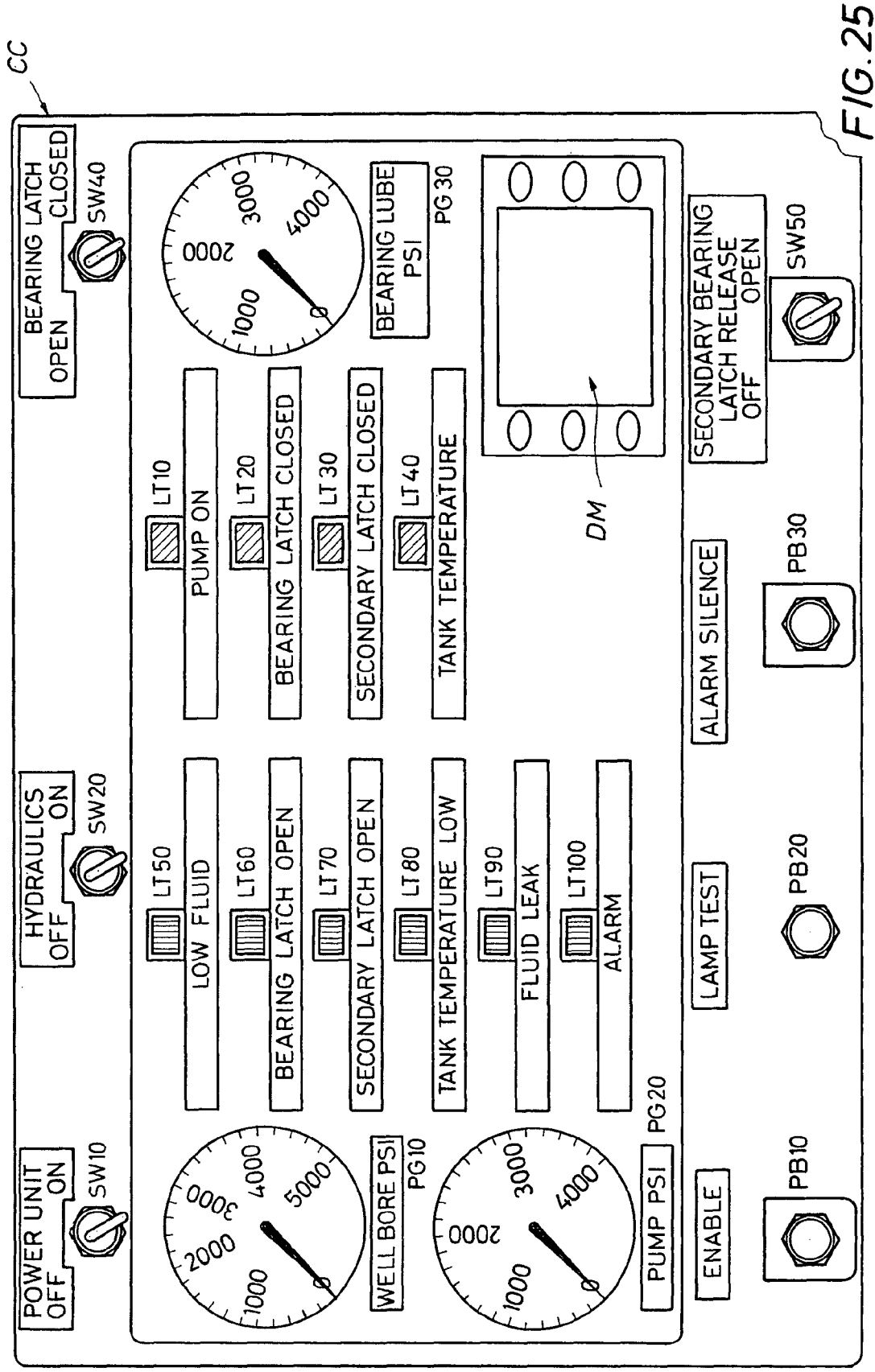
FIG. 25 is a plan view of a control console in accord with the present invention.

Turning now to FIGS. 15A to 25 along with below Tables 1 and 2, the startup operation of the hydraulic or fluid control of the rotating control head 900 is described. Referring particularly to FIG. 25, to start the power unit, button PB10 on the control console, generally indicated at CC, is pressed and switch SW10 is moved to the ON position. As discussed in the flowcharts of FIGS. 16-17, the program of the programmable logic controller PLC checks to make sure that button PB10 and switch SW10 were operated less than 3 seconds of each other. If the elapsed time is equal to or over 3 seconds, the change in position of SW10 is not recognized. Continuing on the flowchart of FIG. 16, the two temperature switches TS10 and TS20, also shown in FIG. 15B, are then checked. These temperature switches indicate oil tank temperature. When the oil temperature is below a designated temperature, e.g. 80° F., the heater HT10 (FIG. 15B) is turned on and the power unit will not be allowed to start until the oil temperature reaches the designated temperature. When the oil temperature is above a designated temperature, e.g. 130° F., the heater is turned off and cooler motor M2 is turned on. As described in the flowchart of FIG. 17, the last start up sequence is to check to see if the cooler motor M2 needs to be turned on.

Figure 15A:
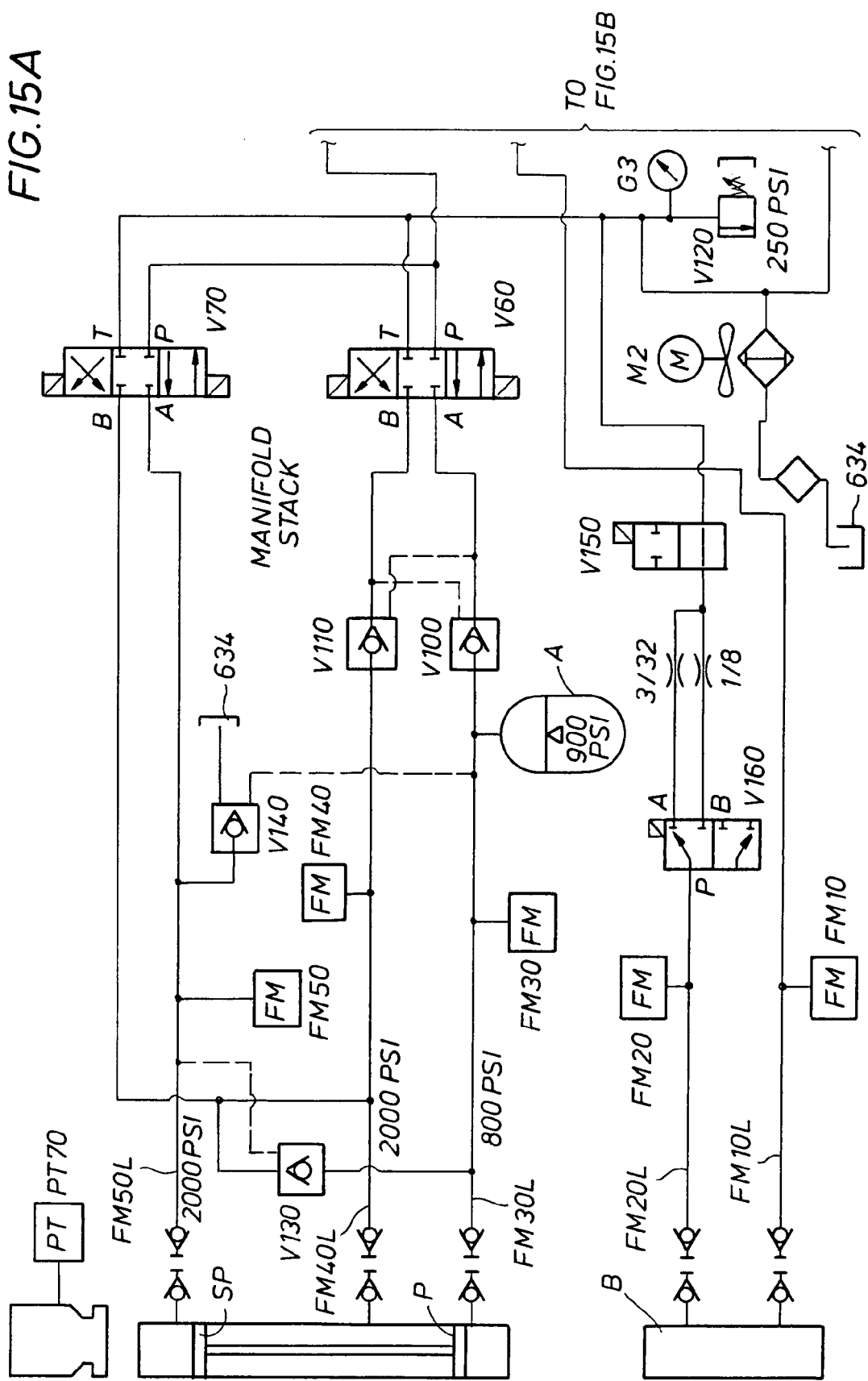
FIGS. 15A and 15B are schematics of the preferred hydraulic system for the present invention.

Continuing on the flowchart of FIG. 16, the wellbore pressure P2 is checked to see if below 50 psi. As shown in below Table 2, associated alarms 10, 20, 30 and 40, light LT100 on control console CC, horn HN10 in FIG. 15B, and corresponding text messages on display monitor DM on console CC will be activated as appropriate. Wellbore pressure P2 is measured by pressure transducer PT70 (FIG. 15A). Further, reviewing FIGS. 15B to 17, when the power unit for the rotating control head, such as a Weatherford model 7800, is started, the three oil tank level switches LS10, LS20 and LS30 are checked. The level switches are positioned to indicate when the tank 634 is overfull (no room for heat expansion of the oil), when the tank is low (oil heater coil is close to being exposed), or when the tank is empty (oil heater coil is exposed). As long as the tank 634 is not overfull or empty, the power unit will pass this check by the PLC program.

Figure 15B:
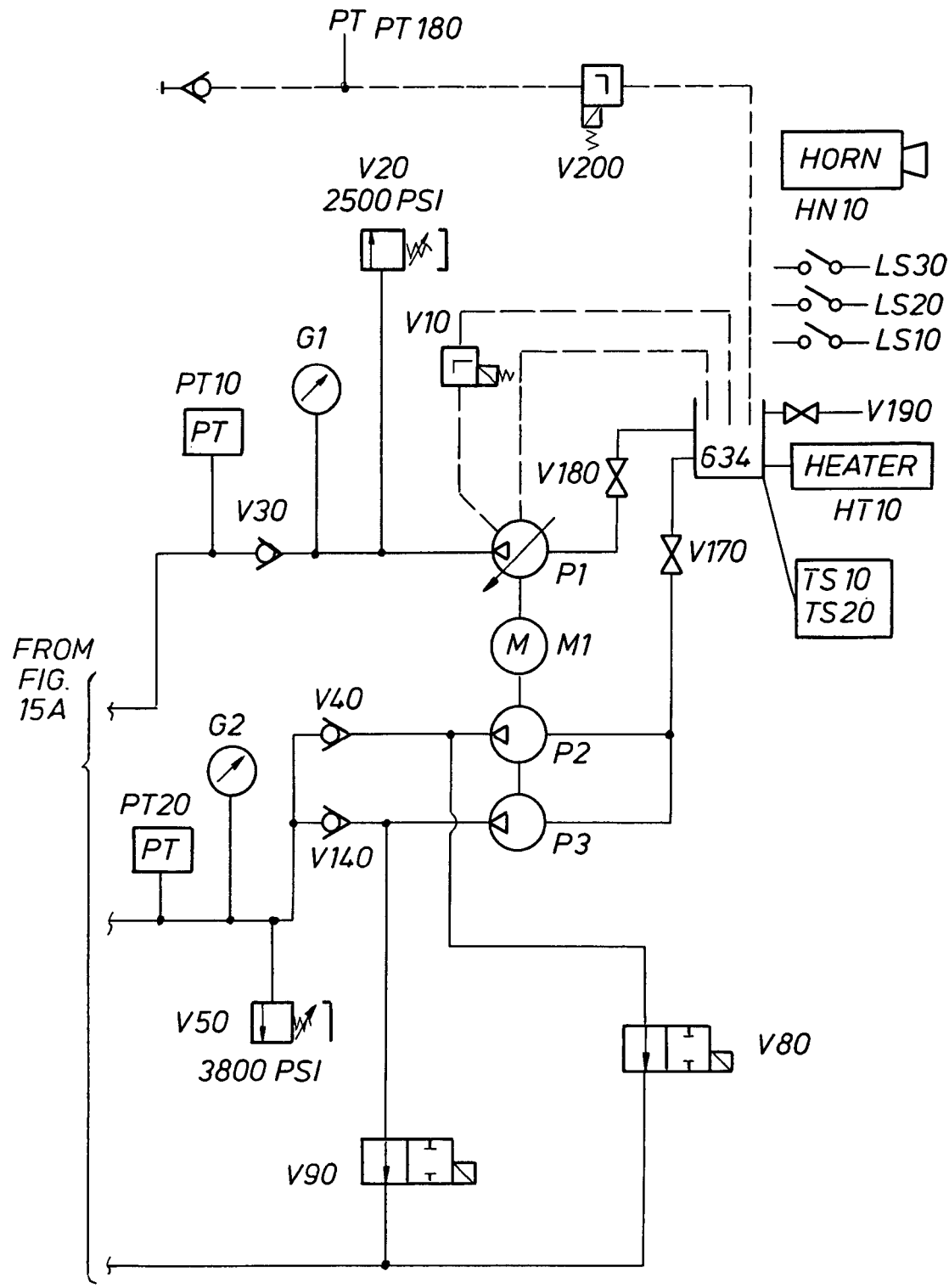
Figure 16:
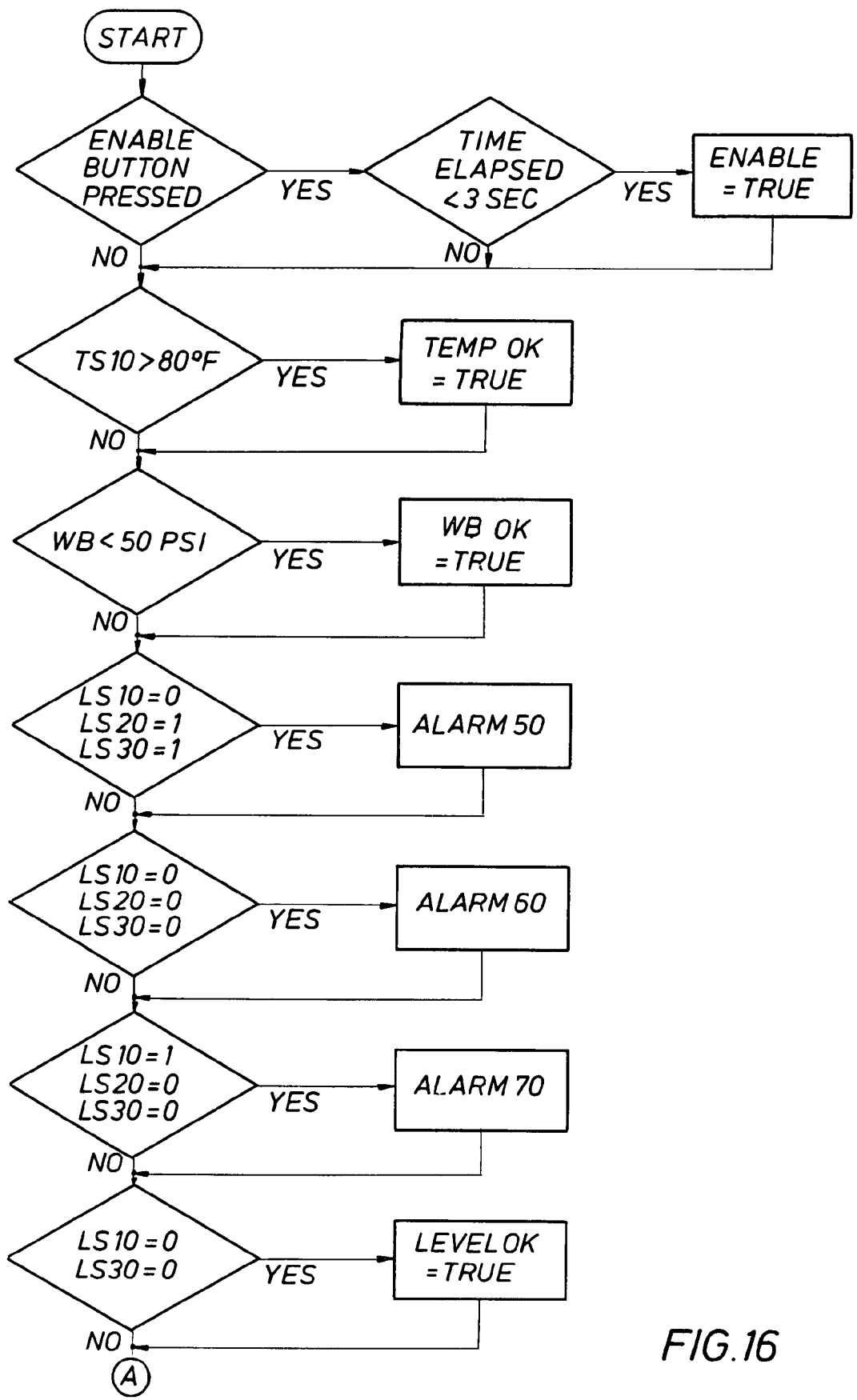
FIG. 16 is a flowchart for operation of the hydraulic system of FIG. 15 of the present invention.
Figure 17:
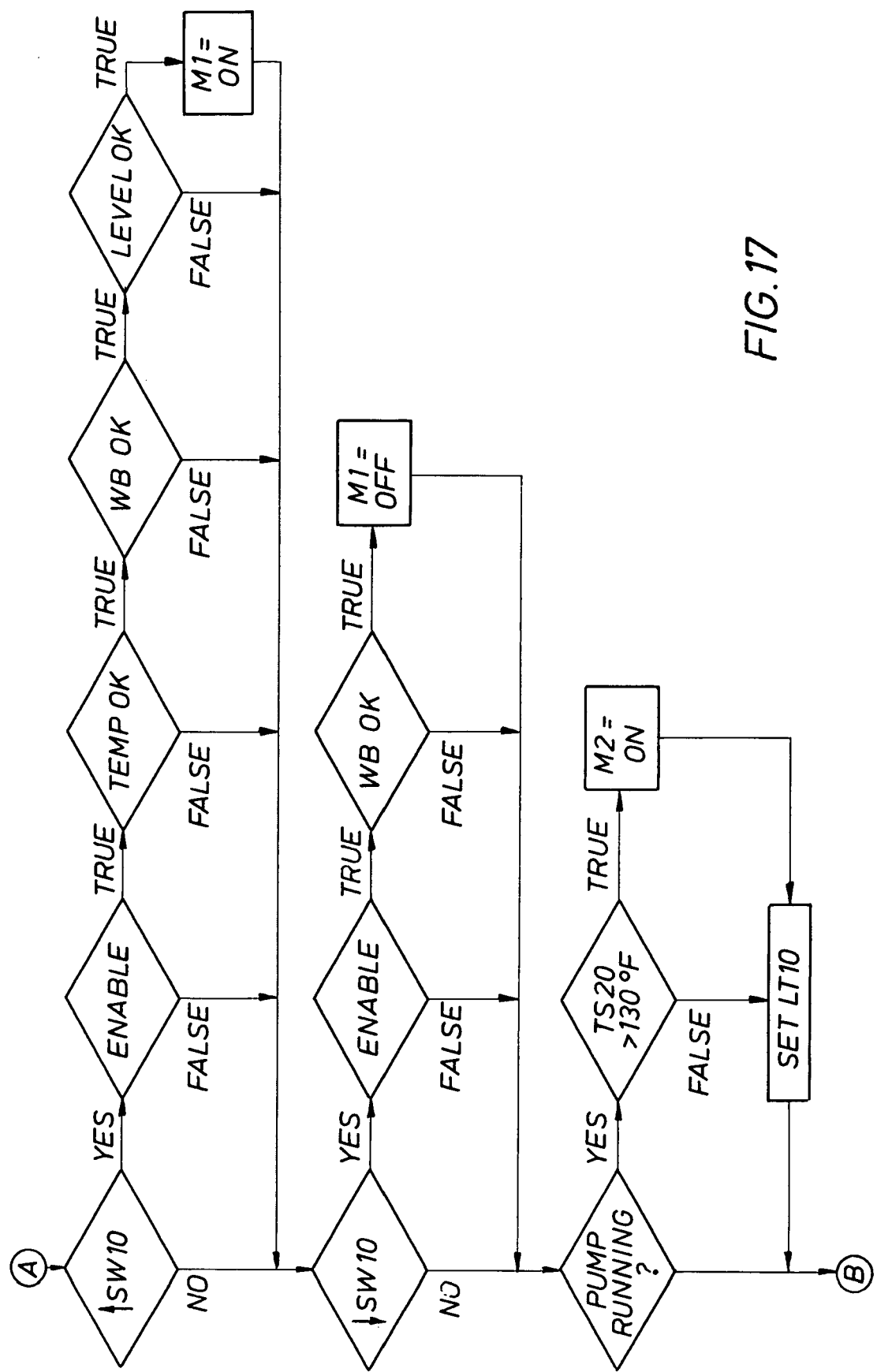
FIG. 17 is a continuation of the flowchart of FIG. 16.

Assuming that the power unit is within the above parameters, valves V80 and V90 are placed in their open positions, as shown in FIG. 15B. These valve openings unload gear pumps P2 and P3, respectively, so that when motor M1 starts, the oil is bypassed to tank 634. Valve V150 is also placed in its open position, as shown in FIG. 15A, so that any other fluid in the system can circulate back to tank 634. Returning to FIG. 15B, pump P1, which is powered by motor M1, will compensate to a predetermined value. The pressure recommended by the pump manufacturer for internal pump lubrication is approximately 300 psi. The compensation of the pump P1 is controlled by valve V10 (FIG. 15B).

Continuing review of the flowchart of FIG. 16, fluid level readings outside of the allowed values will activate alarms 50, 60 or 70 (see also below Table 2 for alarms) and their respective lights LT100, LT50 and LT60. Text messages corresponding to these alarms are displayed on display monitor DM.

When the PLC program has checked all of the above parameters the power unit will be allowed to start. Referring to the control console CC in FIG. 25, the light LT10 is then turned on to indicate the PUMP ON status of the power unit. Pressure gauge PG20 on console CC continues to read the pump pressure provided by pressure transducer PT10, shown in FIG. 15B.

When shutdown of the unit desired, the PLC program checks to see if conditions are acceptable to turn the power unit off. For example, the wellbore pressure P2 should be below 50 psi. Both the enable button PB10 must be pressed and the power switch SW10 must be turned to the OFF position within 3 seconds to turn the power unit off.

Latching Operation System Circuit

Closing the Latching System

Focusing now on FIGS. 9, 15A, 18A, 18B, 23 and 24, the retainer member LP of the latching system of housing H is closed or latched, as shown in FIG. 9, by valve V60 (FIG. 15A) changing to a flow position, so that the ports P-A, B-T are connected. The fluid pilot valve V110 (FIG. 15A) opens so that the fluid on that side of the primary piston P can go back to tank 634 via line FM40L through the B-T port. Valve V100 prevents reverse flow in case of a loss of pressure. Accumulator A (which allows room for heat expansion of the fluid in the latch assembly) is set at 900 psi, slightly above the latch pressure 800 psi, so that it will not charge. Fluid pilot valve V140 (FIG. 15A) opens so that fluid underneath the secondary piston SP goes back to tank 634 via line FM50L and valve V130 is forced closed by the resulting fluid pressure. Valve V70 is shown in FIG. 15A in its center position where all ports (APBT blocked) are blocked to block flow in any line. The pump P1, shown in FIG. 15B, compensates to a predetermined pressure of approximately 800 psi.

The retainer member LP, primary piston P and secondary piston SP of the latching system are mechanically illustrated in FIG. 9 (latching system is in its closed or latched position), schematically shown in FIG. 15A, and their operations are described in the flowcharts in FIGS. 18A, 18B, 23 and 24. Alternative latching systems are disclosed in FIGS. 1 and 8 and in U.S. patent application Ser. No. 10/995,980, filed Nov. 23, 2004.

With the above described startup operation achieved, the hydraulics switch SW20 on the control console CC is turned to the ON position. This allows the pump P1 to compensate to the required pressure later in the PLC program. The bearing latch switch SW40 on console CC is then turned to the CLOSED position. The program then follows the process outlined in the CLOSED leg of SW40 described in the flowcharts of FIGS. 18A and 18B. The pump P1 adjusts to provide 800 psi and the valve positions are then set as detailed above. As discussed below, the PLC program then compares the amount of fluid that flows through flow meters FM30, FM40 and FM50 to ensure that the required amount of fluid to close or latch the latching system goes through the flow meters. Lights LT20, LT30, LT60 and LT70 on console CC show the proper state of the latch. Pressure gauge PG20, as shown on the control console CC, continues to read the pressure from pressure transducer PT10 (FIG. 15B).

Primary Latching System Opening

Figure 18A:
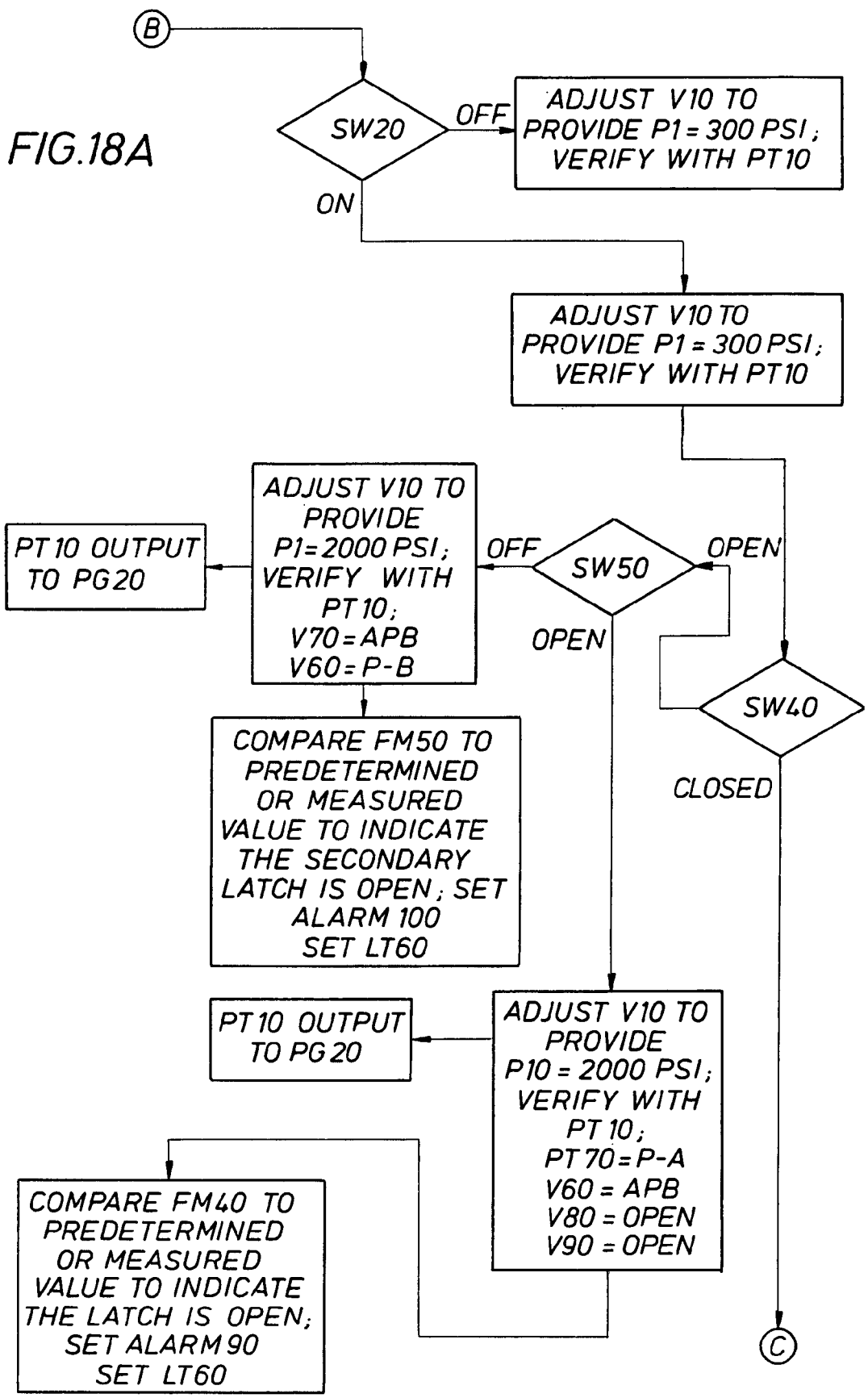
FIG. 18A is a continuation of the flowchart of FIG. 17.

Similar to the above latch closing process, the PLC program follows the OPEN leg of SW40 as discussed in the flowchart of FIG. 18A and then the OFF leg of SW50 of FIG. 18A to open or unlatch the latching system. Turning to FIG. 15A, prior to opening or unlatching the retainer member LP of the latching system, pressure transducer PT70 checks the wellbore pressure P2. If the PT70 reading is above a predetermined pressure (approximately 50 psi), the power unit will not allow the retainer member LP to open or unlatch. Three-way valve V70 (FIG. 15A) is again in the APBT blocked position. Valve V60 shifts to flow position P-B and A-T. The fluid flows through valve V110 into the chamber to urge the primary piston P to move to allow retainer member LP to unlatch. The pump P1, shown in FIG. 15B, compensates to a predetermined value (approximately 2000 psi). Fluid pilots open valve V100 to allow fluid of the primary piston P to flow through line FM30L and the A-T ports back to tank 634.

Secondary Latching System Opening

The PLC program following the OPEN leg of SW40 and the OPEN leg of SW50, described in the flowchart of FIG. 18A, moves the secondary piston SP. The secondary piston SP is used to open or unlatch the primary piston P and, therefore, the retainer member LP of the latching system. Prior to unlatching the latching system, pressure transducer PT70 again checks the wellbore pressure P2. If PT70 is reading above a predetermined pressure (approximately 50 psi), the power unit will not allow the latching system to open or unlatch. Valve V60 is in the APBT blocked position, as shown in FIG. 15A. Valve V70 then shifts to flow position P-A and B-T. Fluid flows to the chamber of the secondary latch piston SP via line FM50L. With valve V140 forced closed by the resulting pressure and valve V130 piloted open, fluid from both sides of the primary piston P is allowed to go back to tank 634 though the B-T ports of valve V70.

Bearing Assembly Circuit

Continuing to review FIGS. 9, 15A, 15B, 18A and 18B and the below Tables 1 and 2, now review FIGS. 19 to 22 describing the bearing assembly circuit.

Valve positions on valve V80 and valve V90, shown in FIG. 15B, and valve V160, shown in FIG. 15A, are moved to provide a pressure in the rotating control head that is above the wellbore pressure P2. In particular, the wellbore pressure P2 is measured by pressure transducer PT70, shown in FIG. 15A. Depending on the wellbore pressure P2, valve V90 and valve V80 (FIG. 15B) are either open or closed. By opening either valve, pressure in the rotating control head can be reduced by allowing fluid to go back to tank 634. Also, depending on pressure in the rotating control head, valve V160 will move to a position that selects a different size orifice. The orifice size, e.g. 3/32" or 1/8" (FIG. 15A), will determine how much back pressure is in the rotating control head. By using this combination of valves V80, V90 and V160, four different pressures can be achieved.

During the operation of the bearing assembly circuit, the temperature switches TS10 and TS20, described in the above startup operation, continue to read the oil temperature in the tank 634, and operate the heater HT10 or cooler motor M2, as required. For example, if the oil temperature exceeds a predetermined value, the cooler motor M2 is turned on and the cooler will transfer heat from the oil returning from the bearing section or assembly B.

Flow meter FM10 measures the volume or flow rate of fluid or oil to the chamber in the bearing section or assembly B via line FM10L. Flow meter FM20 measures the volume or flow rate of fluid or oil from the chamber in the bearing section or assembly B via line FM20L. As discussed further below in the bearing leak detection system section, if the flow meter FM20 reading is greater than the flow meter FM10 reading, this could indicate that wellbore fluid is entering the bearing assembly chamber. Valve V150 is then moved from the open position, as shown in FIG. 15A, to its closed position to keep the wellbore fluid from going back to tank 634.

Regulating Pressure in the Radial Seals

Reviewing FIGS. 13, 14, 15B, 22 and 23 along with the below Tables 1 and 2, pressure transducer PT80 (FIG. 15B) reads the amount of fluid "seal bleed" pressure between the top radial seals 975A and 975B via port 984. As discussed above, proportional relief valve V200 adjusts to maintain a predetermined pressure between the two radial seals 975A and 975B. Based on the well pressure P2 indicated by the pressure transducer PT70, the valve V200 adjusts to achieve the desired "seal bleed" pressure as shown in the below Table 1.

TABLE 1

| WELL PRESSURE | SEAL BLEED PRESSURE |
|---|---|
| 0-500 | 100 |
| 500-1200 | 300 |
| 1200-UP | 700 |

Figure 18B:
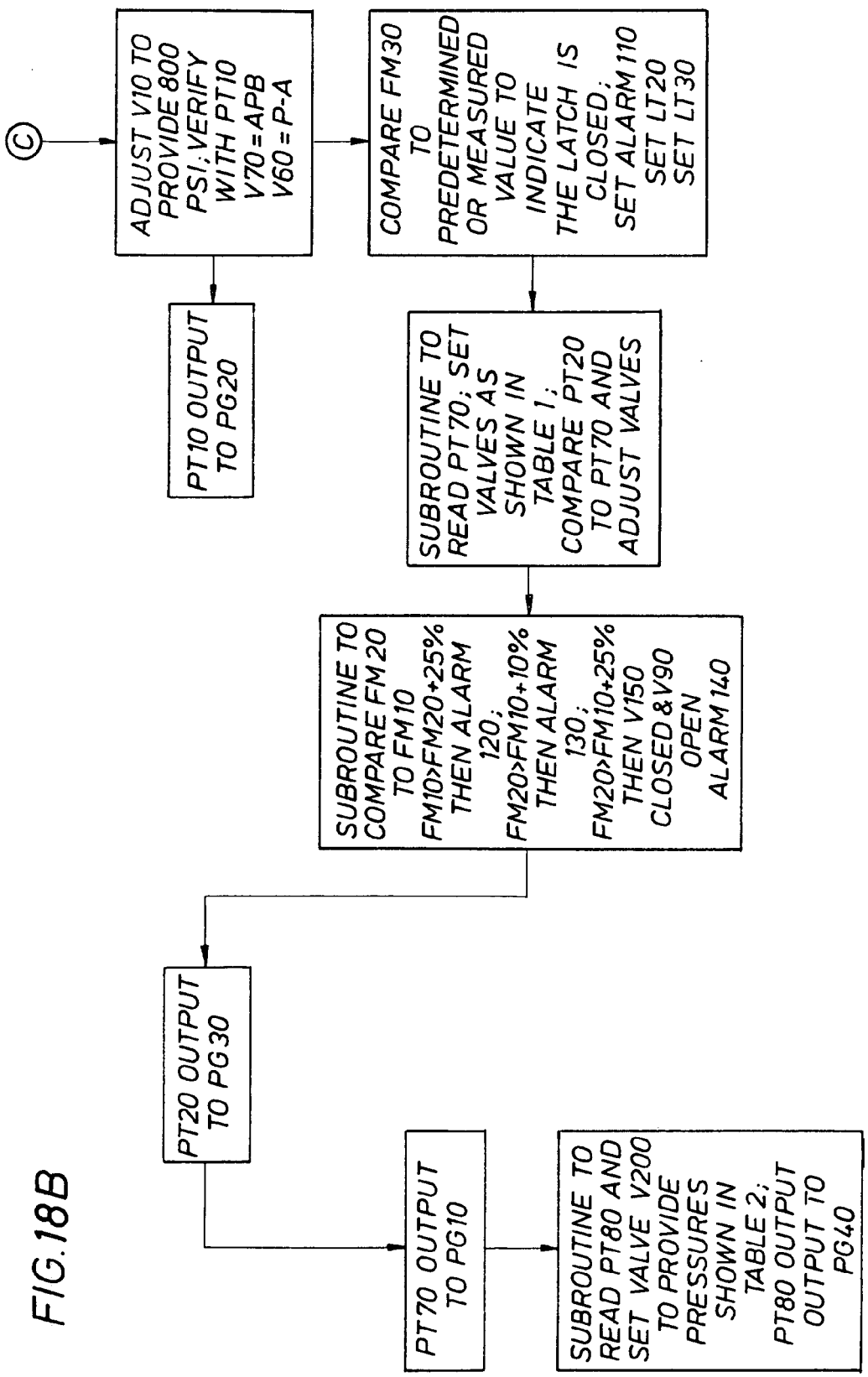
FIG. 18B is a continuation of the flowchart of FIG. 18A.
Figure 19:
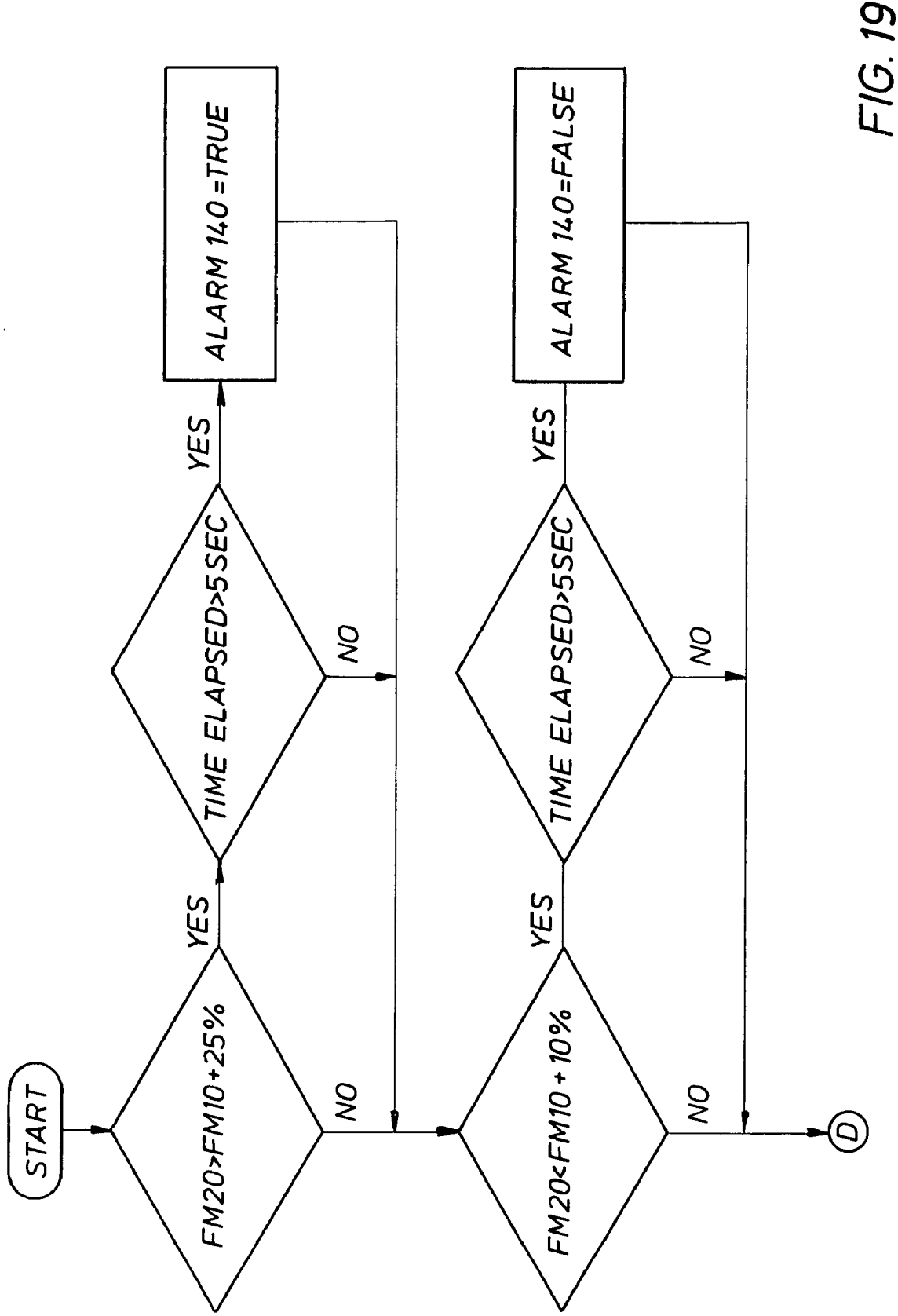
FIG. 19 is a flowchart of a subroutine for controlling the pressure in the bearing section of the rotating control head of the present invention.
Figure 20:
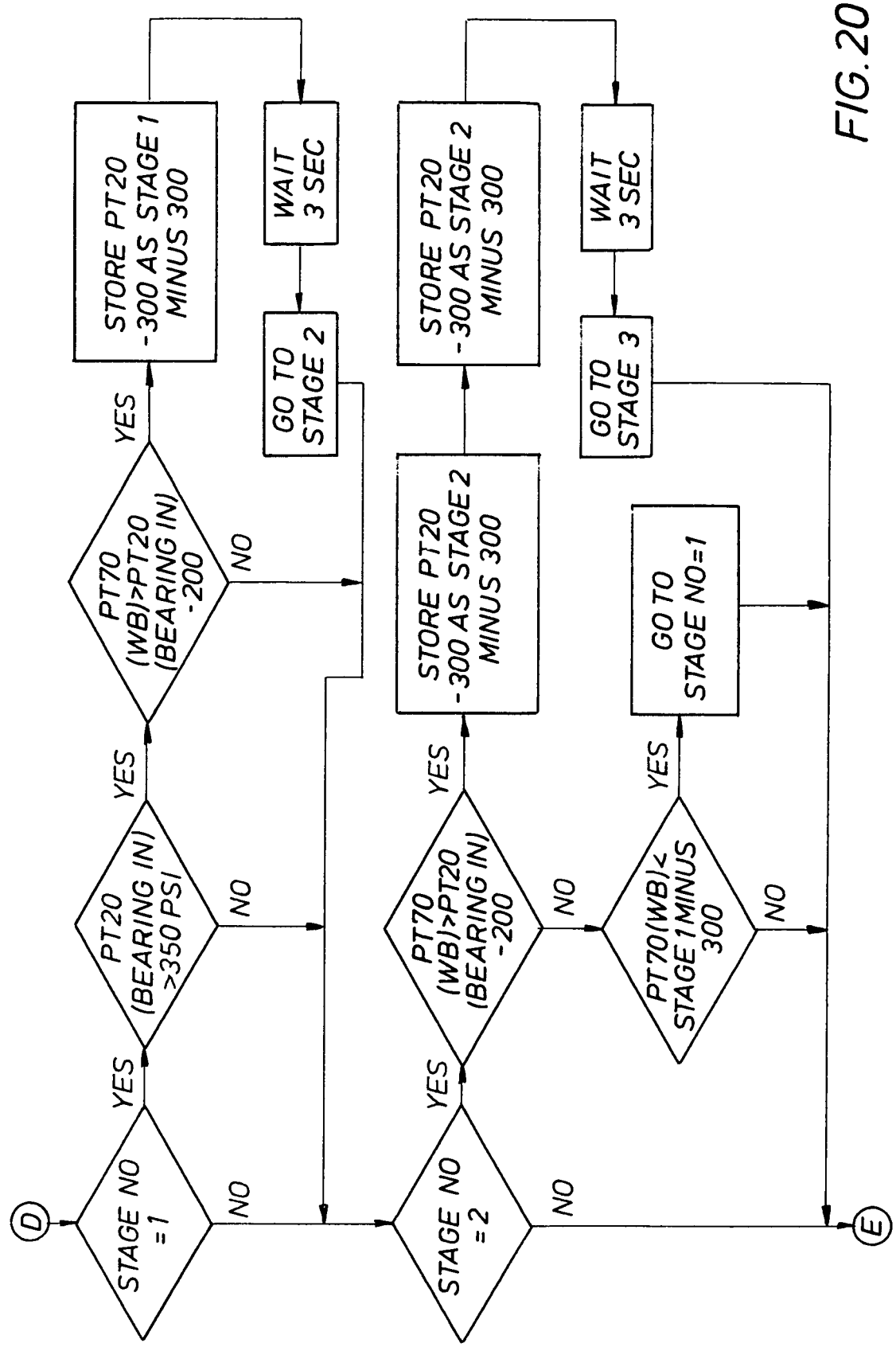
FIG. 20 is a continuation of the flowchart of FIG. 19.
Figure 21:
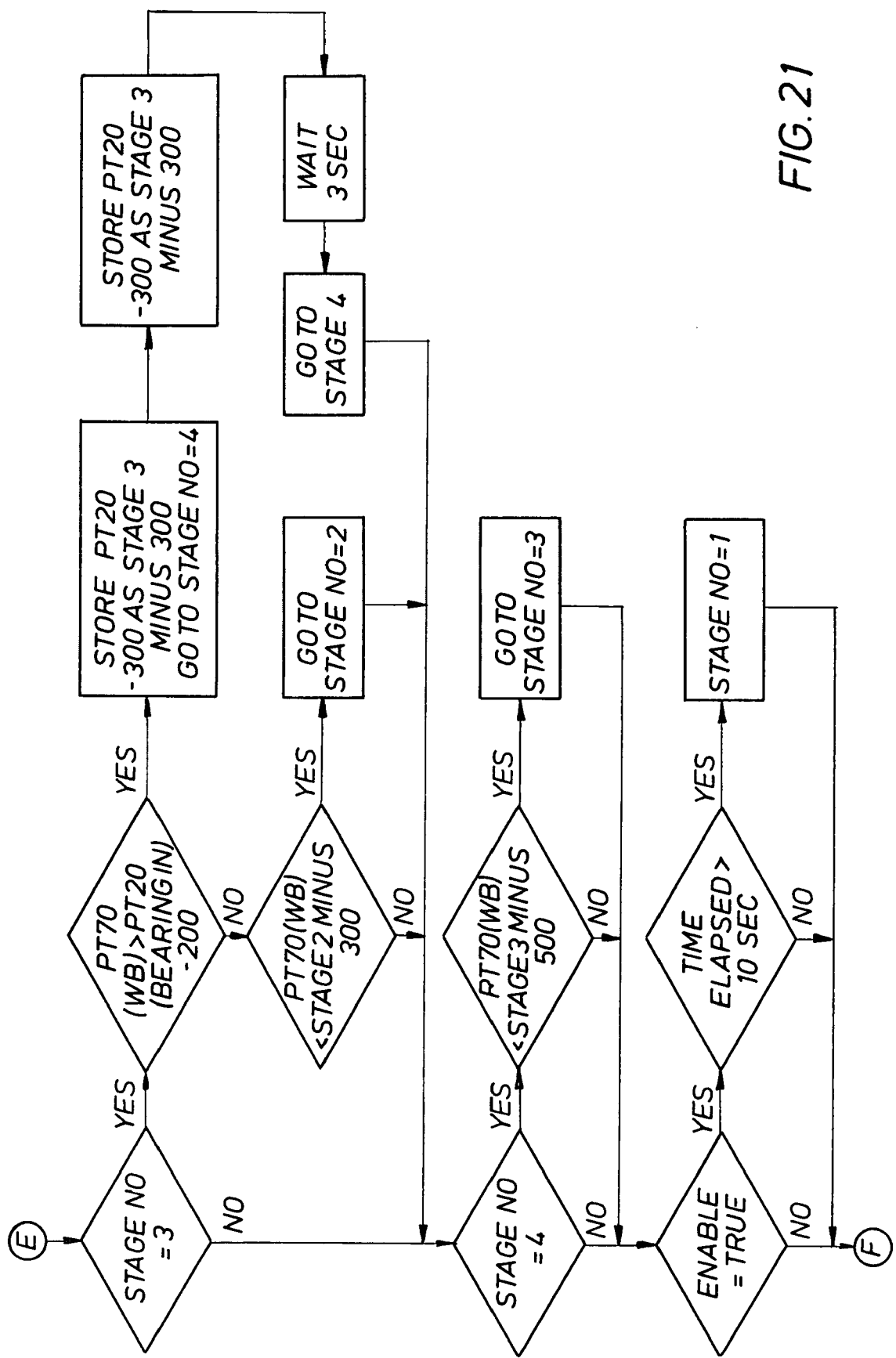
FIG. 21 is a continuation of the flowchart of FIG. 20.
Figure 22:
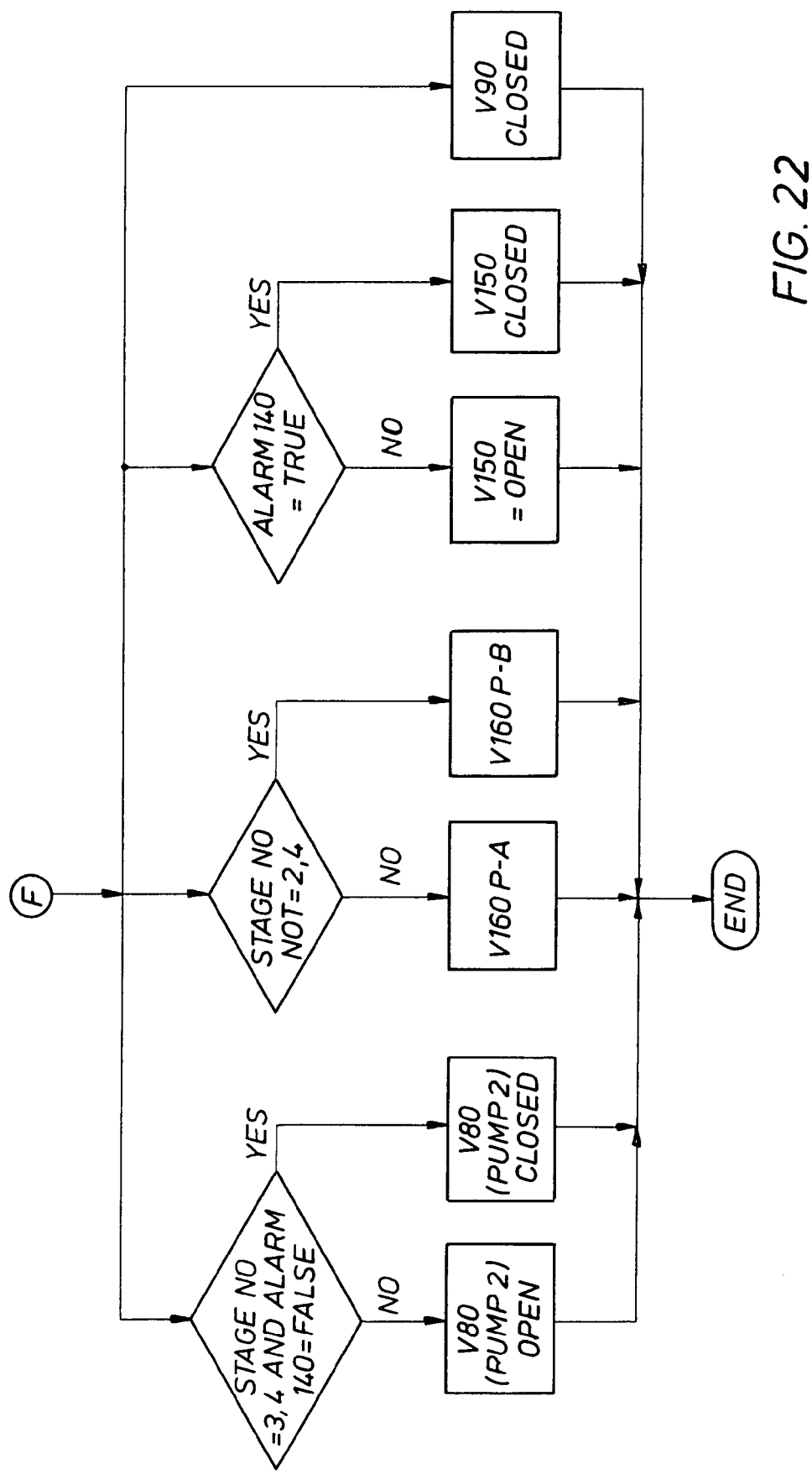
FIG. 22 is a continuation of the flowchart of FIG. 21.
Figure 23:
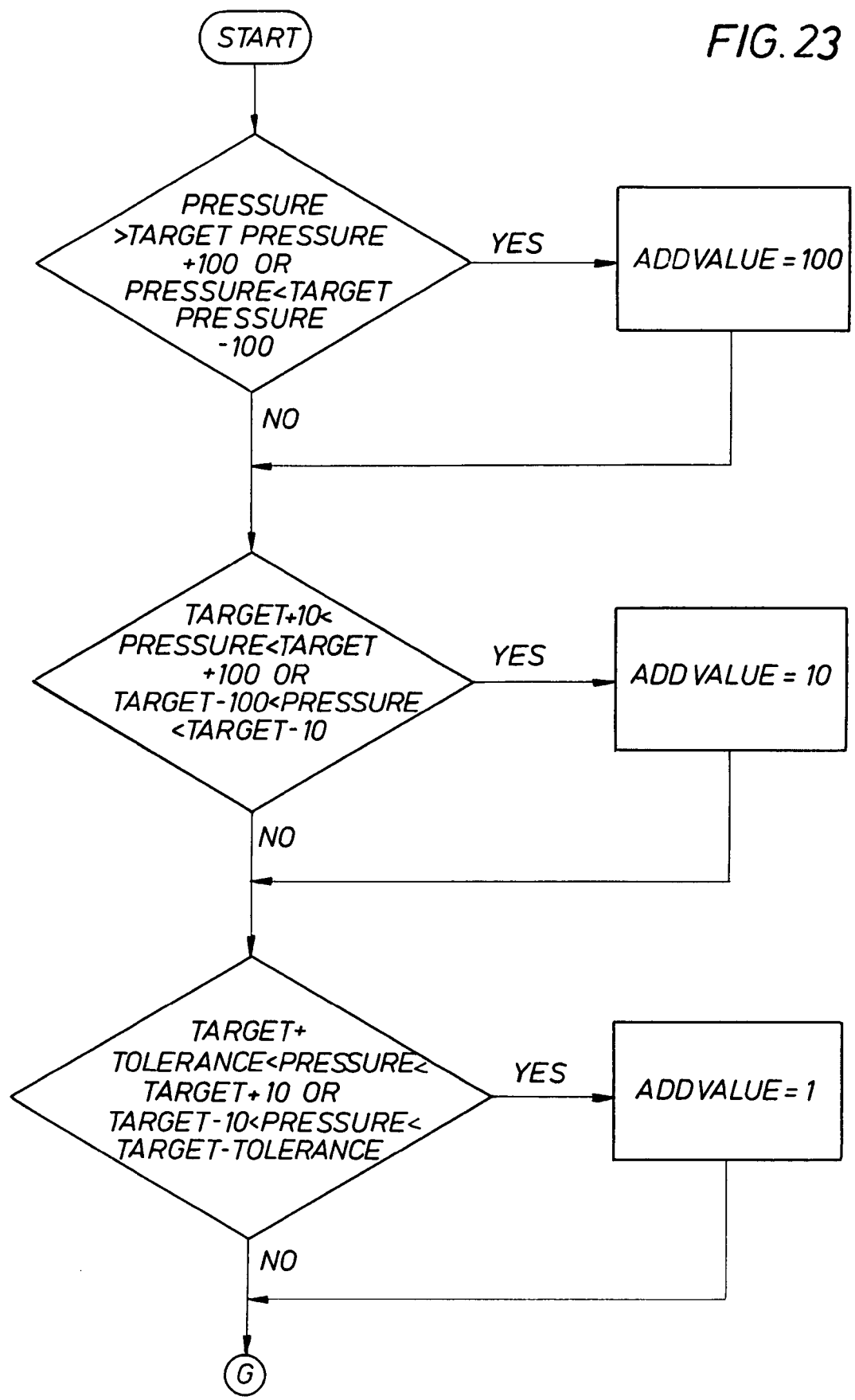
FIG. 23 is a flowchart of a subroutine for controlling either the pressure of the latching system in the housing, such as shown in FIGS. 1 and 9, or the pressure on the radial seals, as shown in FIG. 13, of the present invention.
Figure 24:
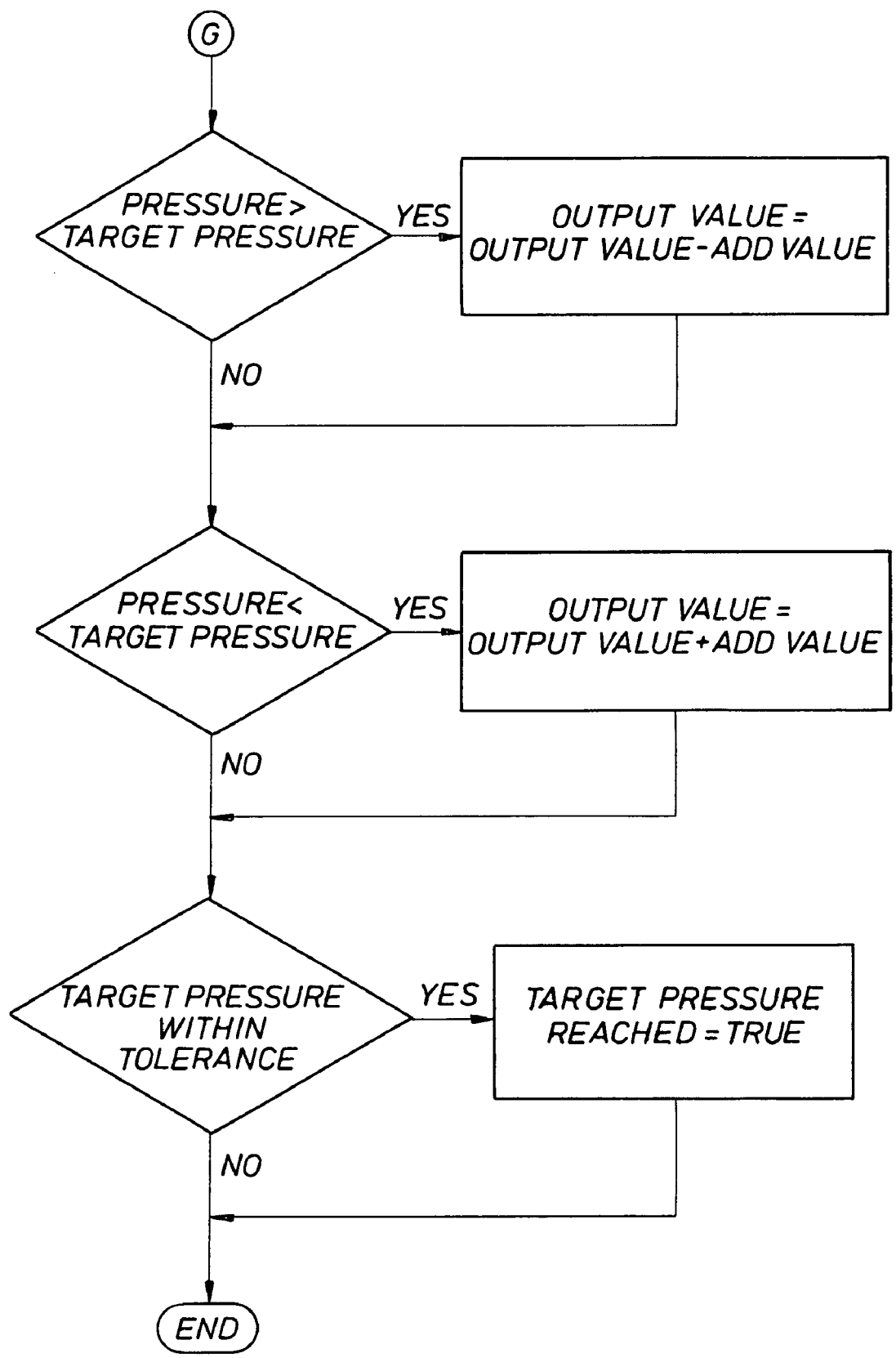
FIG. 24 is a continuation of the flowchart of FIG. 23.

The flowcharts of FIGS. 18A and 18B on the CLOSED leg of SW40 and after the subroutine to compare flow meters FM30, FM40 and FM50, describes how the valves adjust to match the pressures in above Table 1. FIGS. 19 to 22 describes a subroutine for the program to adjust pressures in relation to the wellbore pressure P2.

Alarms

During the running of the PLC program, certain sensors such as flow meters and pressure transducers are checked. If the values are out of tolerance, alarms are activated. The flowcharts of FIGS. 16, 17, 18A and 18B. describe when the alarms are activated. Below Table 2 shows the lights, horn and causes associated with the activated alarms. The lights listed in Table 2 correspond to the lights shown on the control console CC of FIG. 25. As discussed below, a text message corresponding to the cause is sent to the display monitor DM on the control console CC.

Latch Leak Detection System

FM30/FM40 Comparison

Usually the PLC program will run a comparison where the secondary piston SP is "bottomed out" or in its latched position, such as shown in FIG. 9, or when only a primary piston P is used, such as shown in FIG. 1, the piston P is bottomed out. In this comparison, the flow meter FM30 coupled to the line FM30L measures either the flow volume value or flow rate value of fluid to the piston chamber to move the piston P to the latched position, as shown in FIG. 9, from the unlatched position, as shown in FIG. 1. Also, the flow meter FM40 coupled to the line FM40L measures the desired flow volume value or flow rate value from the piston chamber. Since the secondary piston SP is bottomed out, there should be no flow in line FM50L, as shown in FIG. 9. Since no secondary piston is shown in FIG. 1, there is no line FM50L or flow meter FM50.

In this comparison, if there are no significant leaks, the flow volume value or flow rate value measured by flow meter FM30 should be equal to the flow volume value or flow rate value, respectively, measured by flow meter FM40 within a predetermined tolerance. If a leak is detected because the comparison is outside the predetermined tolerance, the results of this FM30/FM40 comparison would be displayed on display monitor DM on control console CC, as shown in FIG. 25, preferably in a text message, such as "Alarm 90—Fluid Leak". Furthermore, if the values from flow meter FM30 and flow meter FM40 are not within the predetermined tolerance, i.e. a leak is detected, the corresponding light LT100 would be displayed on the control console CC.

FM30/FM50 Comparison

In a less common comparison, the secondary piston SP would be in its "full up" position. That is, the secondary piston SP has urged the primary piston P, when viewing FIG. 9, as far up as it can move to its full unlatched position. In this comparison, the flow volume value or flow rate value, measured by flow meter FM30 coupled to line FM30L, to move piston P to its latched position, as shown in FIG. 9, is measured. If the secondary piston SP is sized so that it would block line FM40L, no fluid would be measured by flow meter FM40. But fluid beneath the secondary piston SP would be evacuated via line FM50L from the piston chamber of the latch assembly. Flow meter 50 would then measure the flow volume value or flow rate value. The measured flow volume value or flow rate value from flow meter FM30 is then compared to the measured flow volume value or flow rate value from flow meter FM50.

If the compared FM30/FM50 values are within a predetermined tolerance, then no significant leaks are considered detected. If a leak is detected, the results of this FM30/FM50 comparison would be displayed on display monitor DM on control console CC, preferably in a text message, such as "Alarm 100—Fluid Leak". Furthermore, if the values from flow meter FM30 and flow meter FM50 are not within a predetermined tolerance, the corresponding light LT100 would be displayed on the control console CC.

FM30/FM40+FM50 Comparison

Sometimes the primary piston P is in its full unlatched position and the secondary piston SP is somewhere between its bottomed out position and in contact with the fully unlatched piston P. In this comparison, the flow volume value or flow rate value measured by the flow meter FM30 to move piston P to its latched position is measured. If the secondary piston SP is sized so that it does not block line FM40L, fluid between secondary piston SP and piston P is evacuated by line FM40L. The flow meter FM40 then measures the flow volume value or flow rate value via line FM40L. This measured value from flow meter FM40 is compared to the measured value from flow meter FM30. Also, the flow value beneath secondary piston SP is evacuated via line FM50L and measured by flow meter FM50.

If the flow value from flow meter FM30 is not within a predetermined tolerance of the compared sum of the flow values from flow meter FM40 and flow meter FM50, then the corresponding light LT100 would be displayed on the control console CC. This detected leak is displayed on display monitor DM in a text message.

Measured Value/Predetermined Value

An alternative to the above leak detection methods of comparing measured values is to use a predetermined or previously calculated value. The PLC program then compares the measured flow value in and/or from the latching system to the predetermined flow value plus a predetermined tolerance.

It is noted that in addition to indicating the latch position, the flow meters FM30, FM40 and FM50 are also monitored so that if fluid flow continues after the piston P has moved to the closed or latched position for a predetermined time period, a possible hose or seal leak is flagged.

For example, alarms 90, 100 and 110, as shown in below Table 2, could be activated as follows:

Alarm 90—primary piston P is in the open or unlatched position. The flow meter FM40 measured flow value is compared to a predetermined value plus a tolerance to indicate the position of piston P. When the flow meter FM40 reaches the tolerance range of this predetermined value, the piston P is indicated in the open or unlatched position. If the flow meter FM40 either exceeds this tolerance range of the predetermined value or continues to read a flow value after a predetermined time period, such as an hour, the PLC program indicates the alarm 90 and its corresponding light and text message as discussed herein.

Alarm 100—secondary piston SP is in the open or unlatched position. The flow meter FM50 measured flow value is compared to a predetermined value plus a tolerance to indicate the position of secondary piston SP. When the flow meter FM50 reaches the tolerance range of this predetermined value, the secondary piston SP is indicated in the open or unlatched position. If the flow meter FM50 either exceeds this tolerance range of the predetermined value or continues to read a flow value after a predetermined time period, such as an hour, the PLC program indicates the alarm 100 and its corresponding light and text message as discussed herein.

Alarm 110—primary piston P is in the closed or latched position. The flow meter FM30 measured flow value is compared to a predetermined value plus a tolerance to indicate the position of primary piston P. When the flow meter FM30 reaches the tolerance range of this predetermined value, the primary piston P is indicated in the closed or latched position. If the flow meter FM30 either exceeds this tolerance range of the predetermined value or continues to read a flow value after a predetermined time period, such as an hour, the PLC program indicates the alarm 110 and its corresponding light and text message as discussed herein.

Bearing Leak Detection System

FM10/FM20 Comparison

A leak detection system can also be used to determine if the bearing section or assembly B is losing fluid, such as oil, or, as discussed above, gaining fluid, such as wellbore fluids. As shown in FIG. 15A, line FM10L and line FM20L move fluid to and from the bearing assembly B of a rotating control head and are coupled to respective flow meters FM10 and FM20.

If the measured fluid value, such as fluid volume value or fluid rate value, from flow meter FM10 is not within a predetermined tolerance of the measured fluid value from flow meter FM20, then alarms 120, 130 or 140, as described below in Table 2, are activated. For example, if the measured flow value to the bearing assembly B is greater than the measured flow value from the bearing assembly plus a predetermined percentage tolerance, then alarm 120 is activated and light LT90 on control console CC is turned on. Also, a text message is displayed on display monitor DM on the control console CC, such as "Alarm 120—Losing Oil." For example, this loss could be from the top radial seals leaking oil to the atmosphere, or the bottom radial seals leaking oil down the wellbore.

If the measured flow value from the bearing assembly read by flow meter FM20 is greater than the measured flow value to the bearing assembly read by flow meter FM10 plus a predetermined percentage tolerance, then alarm 130 is activated, light LT90 is turned on and a text message such as "Alarm 130—Gaining Oil" is displayed on display monitor DM.

If the measured flow meter FM20 flow value/measured flow meter FM10 flow value is higher than the alarm 130 predetermined percentage tolerance, then alarm 140 is activated, light LT90 is turned on and a horn sounds in addition to a text message on display monitor DM, such as "Alarm 140—Gaining Oil."

An alternative to the above leak detection methods of comparing measured values is to use a predetermined or previously calculated value. The PLC program then compares the measured flow value in and/or from the bearing assembly B to the predetermined flow value plus a predetermined tolerance.

TABLE 2

| ALARM # | LIGHT | HORN | CAUSE |
|---|---|---|---|
| 10 | LT100 | WB > 100 | WELLBORE > 50, PT10 = 0; NO LATCH PUMP PRESSURE |
| 20 | LT100 | WB > 100 | WELLBORE > 50, PT20 = 0; NO BEARING LUBE PRESSURE |
| 30 | LT100 | Y | WELLBORE > 50, LT20 = OFF; LATCH NOT CLOSED |
| 40 | LT100 | Y | WELLBORE > 50, LT30 = OFF; SECONDARY LATCH NOT CLOSED |
| 50 | LT100 | | LS30 = ON; TANK OVERFULL |
| 60 | LT50 | | LS20 = OFF; TANK LOW |
| 70 | LT50 | Y | LS10 = OFF; TANK EMPTY |
| 80 | LT100 | Y | WELLBORE > 100, PT10 = 0; NO LATCH PRESSURE |
| 90 | LT100 | | FM40; FLUID LEAK; 10% TOLERANCE + FLUID MEASURE |
| 100 | LT100 | | FM50; FLUID LEAK; 10% TOLERANCE + FLUID MEASURE |
| 110 | LT100 | | FM30; FLUID LEAK; 10% TOLERANCE + FLUID MEASURE |
| 120 | LT90 | | FM10 > FM20 + 25%; BEARING LEAK (LOSING OIL) |
| 130 | LT90 | | FM20 > FM10 + 15%; BEARING LEAK (GAINING OIL) |
| 140 | LT90 | Y | FM20 > FM10 + 30%; BEARING LEAK (GAINING OIL) |

Piston Position Indicators

Additional methods are contemplated to indicate position of the primary piston P and/or secondary piston SP in the latching system. One example would be to use an electrical sensor, such as a linear displacement transducer, to measure the distance the selected piston has moved.

Another method could be drilling the housing of the latch assembly for a valve that would be opened or closed by either the primary piston P, as shown in the embodiment of FIG. 1, or the secondary piston SP, as shown in the embodiment of FIGS. 9, 26 and 27. In this method, a port PO would be drilled or formed in the bottom of the piston chamber of the latch assembly. Port PO is in fluid communication with an inlet port IN (FIG. 26) and an outlet port OU (FIG. 27) extending perpendicular (radially outward) from the piston chamber of the latch assembly. These perpendicular ports would communicate with respective passages INP and OUP that extend upward in the radially outward portion of the latch assembly housing. Housing passage OUP is connected by a hose to a pressure transducer and/or flow meter. A machined valve seat VS in the port to the piston chamber receives a corresponding valve seat, such as a needle valve seat. The needle valve seat would be fixedly connected to a rod R receiving a coil spring CS about its lower portion to urge the needle valve seat to the open or unlatched position if neither primary piston P (FIG. 1 embodiment) nor secondary piston SP (FIGS. 9, 26 and 27 embodiments) moves the needle valve seat to the closed or latched position. An alignment retainer member AR is sealed as the member is threadably connected to the housing H. The upper portion of rod R is slidably sealed with retainer member AR.

If a flow value and/or pressure is detected in the respective flow meter and/or pressure transducer communicating with passage OUP, then the valve is indicated open. This open valve indicates the piston is in the open or unlatched position. If no flow value and/or pressure is detected in the respective flow meter and/or pressure transducer communicating with passage OUP, then the valve is indicated closed. This closed valve indicates the piston is in the closed or latched position. The above piston position would be shown on the console CC, as shown in FIG. 25, by lights LT20 or LT60 and LT30 or LT70 along with a corresponding text message on display monitor DM.

While the foregoing is directed to embodiments of the present invention, other and further embodiments of the invention may be devised without departing from the basic scope thereof, and the scope thereof is determined by the claims that follow.

We claim:

1. A thermal transfer system adapted for use with a rotating control head, comprising:
   a first member movable relative to a second member;
   one of the members having a thermal transfer surface;
   a first seal positioned with one of the members for sealing the first member with the second member while the first member moves relative to the second member;
   a thermal transfer fluid circulated with at least one of the members;
   said second member defining a passageway formed to extend around the thermal transfer surface more than once; and
   the thermal transfer surface transferring thermal units through the thermal transfer fluid in said passageway circulated around the thermal transfer surface.

2. The system of claim 1 further comprising:
   a seal carrier;
   the thermal transfer surface comprises a surface of the seal carrier;
   the seal carrier being a component of one of the members; and
   the first seal positioned with the seal carrier for sealing the first member with the second member while the first member moves relative to the second member.

3. The system of claim 2, wherein said passageway comprises:
   a spiral slot.

4. The system of claim 3 wherein the spiral slot circulates a unidirectional flow of the thermal transfer fluid.

5. The system of claim 2 further comprising a port formed in the seal carrier to communicate with the first seal and to regulate the pressure of the fluid on the first seal.

6. The system of claim 2 further comprising a second seal positioned with the seal carrier and for sealing the first member and the second member.

7. The system of claim 6 further comprising a port formed in the seal carrier to communicate with the first seal and the second seal and to regulate the pressure of the fluid between the first seal and the second seal.

8. The system of claim 6 further comprising the first seal allowing a first flow of the thermal transfer fluid to pass by the first seal, and the second seal allowing a second flow of the thermal transfer fluid to pass by the second seal, wherein the second flow is greater than the first flow.

9. The system of claim 6 wherein one of the seals allows flow of fluid at a first pressure and the other seal allows flow of fluid at a second pressure, wherein the first pressure is higher than the second pressure.

10. The system of claim 1, wherein said passageway comprises:
    a spiral slot.

11. The system of claim 10 wherein the spiral slot circulates a unidirectional flow of the thermal transfer fluid.

12. The system of claim 1 further comprising:
    at least one bearing in fluid communication with the first member and the second member.

13. The system of claim 12 wherein the thermal transfer fluid communicates with the at least one bearing.

14. The system of claim 12 further comprising a tubular wherein one of the members having a bore sized to receive the tubular.

15. The system of claim 12 wherein the at least one bearing comprising:
    a radial bearing, and
    a thrust bearing.

16. The system of claim 1 wherein the thermal transfer fluid is an unctuous combustible substance that is at least liquefiable on warming.

17. The system of claim 1 further comprising a port formed in one of the members to communicate with the first seal and to regulate the pressure of the fluid on the first seal.

18. The system of claim 1 further comprising a second seal positioned with one of the members and for sealing the first member and the second member.

19. The system of claim 18 further comprising a port formed in one of the members to communicate with the first seal and the second seal and to regulate the pressure of the fluid between the first seal and the second seal.

20. The system of claim 18 further comprising the first seal allowing a first flow of the thermal transfer fluid to pass by the first seal, and the second seal allowing a second flow of the thermal transfer fluid to pass by the second seal, wherein the second flow is greater than the first flow.

21. The system of claim 18 wherein one of the seals allows flow of fluid at a first pressure and the other seal allows flow of fluid at a second pressure, wherein the first pressure is higher than the second pressure.

22. A system adapted for use with a rotating control head, comprising:
    a first member movable relative to a second member;
    a passageway formed in one of said members;

a unidirectional flow of a fluid in said passageway for circulating the fluid into, with and out of the rotating control head;

a first seal positioned with one of the members for providing a predetermined flow value of the fluid between the first member and the second member; and a port formed in one of the members, the port communicating with the first seal to regulate the fluid flowing by the first seal.

23. The system of claim 22 further comprising a second seal positioned with the first member and the second member, wherein one of the seals allows flow of fluid at a first pressure and the other seal allows flow of fluid at a second pressure.

24. The system of claim 22 further comprising a second seal positioned with the first member and the second member, wherein the first seal allowing a first flow of the fluid to pass by the first seal, and the second seal allowing a second flow of the fluid to pass by the second seal, wherein the second flow is different than the first flow.

25. A thermal transfer system adapted for use with a rotating control head, comprising:

a first member movable relative to a second member;

one of the members having a thermal transfer surface;

a first seal positioned with one of the members for sealing the first member with the second member while the first member moves relative to the second member;

a second seal positioned with one of the members for sealing the first member with the second member, wherein the first seal allows flow of fluid at a first pressure and the second seal allows flow of fluid at a second pressure different than the first pressure;

a thermal transfer fluid circulated with at least one of the members;

said second member defining a passageway formed to extend about the thermal transfer surface; and the thermal transfer surface transferring thermal units through a unidirectional flow of the thermal transfer fluid in said passageway traversing about the thermal transfer surface.

26. The system of claim 25, wherein said passageway comprises a spiral slot formed on one of the members adjacent the thermal transfer surface.

27. A thermal transfer system adapted for use with a rotating control head, comprising:

a first member movable relative to a second member;

a seal carrier having a thermal transfer surface;

the seal carrier being a component of one of the members;

a first seal positioned with the seal carrier for sealing the first member and the second member;

a thermal transfer fluid circulated with at least one of the members;

said second member defining a passageway formed to extend around the thermal transfer surface more than once; and the thermal transfer surface transferring thermal units through the thermal transfer fluid in said passageway adjacent the first seal.

28. The system of claim 27, wherein the first seal positioned with the seal carrier for sealing the first member with the second member while the first member moves relative to the second member.

29. The system of claim 27, wherein said passageway comprises:

a tortuous path formed on one of the members adjacent the first seal.

30. The system of claim 29, wherein the tortuous path comprise:

a spiral slot adjacent the first seal.

31. The system of claim 30 wherein said passageway comprises a spiral slot that circulates a unidirectional flow of the thermal transfer fluid.

32. The system of claim 29 wherein the tortuous path circulates a unidirectional flow of the thermal transfer fluid.

33. The system of claim 27 further comprising:

at least one bearing in fluid communication with the first member and the second member.

34. The system of claim 33 wherein the thermal transfer fluid communicates with the at least one bearing.

35. The system of claim 27 wherein the thermal transfer fluid is a liquid.

36. The system of claim 35 wherein the liquid is an unctuous combustible substance.

37. The system of claim 27 wherein the thermal transfer fluid is a gas.

38. The system of claim 27 further comprising a port formed in one of the members to communicate with the first seal and to regulate the pressure of the fluid on the first seal.

39. The system of claim 27 further comprising a second seal positioned with one of the members and for sealing the first member and the second member.

40. The system of claim 39 further comprising a port formed in one of the members to communicate with the first seal and the second seal and to regulate the pressure of the fluid between the first seal and the second seal.

41. The system of claim 39 further comprising the first seal allowing a first flow of the thermal transfer fluid to pass by the first seal, and the second seal allowing a second flow of the thermal transfer fluid to pass by the second seal, wherein the second flow is greater than the first flow.

42. The system of claim 39 wherein one of the seals allows flow of fluid at a first pressure and the other seal allows flow of fluid at a second pressure, wherein the first pressure is higher than the second pressure.

43. The system of claim 27 further comprising a port formed in the seal carrier to communicate with the first seal and to regulate the pressure of the fluid on the first seal.

44. The system of claim 27 further comprising a second seal positioned with the seal carrier and for sealing the first member and the second member.

45. The system of claim 44 further comprising a port formed in the seal carrier to communicate with the first seal and the second seal and to regulate the pressure of the fluid between the first seal and the second seal.

46. The system of claim 44 further comprising the first seal allowing a first flow of the thermal transfer fluid to pass by the first seal, and the second seal allowing a second flow of the thermal transfer fluid to pass by the second seal, wherein the second flow is greater than the first flow.

47. The system of claim 44 wherein one of the seals allows flow of fluid at a first pressure and the other seal allows flow of fluid at a second pressure, wherein the first pressure is higher than the second pressure.

48. A system adapted for use with a rotating control head, comprising:

a first member movable relative to a second member;

a passageway formed in one of said members;

a unidirectional flow of a fluid in said passageway for circulating the fluid with the rotating control head;

one of the members having a seal carrier;

a first seal positioned with the seal carrier for sealing the first member with the second member while providing a predetermined flow value of the fluid between the first member and the second member; and a port formed in the seal carrier, the port communicating with the first seal to regulate the fluid flowing by the first seal.

49. The system of claim 48 further comprising a second seal positioned with the first member and the second member, wherein one of the seals allows flow of fluid at a first pressure and the other seal allows flow of fluid at a second pressure.

50. The system of claim 48 further comprising a second seal positioned with the first member and the second member, wherein the first seal allowing a first flow of the fluid to pass by the first seal, and the second seal allowing a second flow of the fluid to pass by the second seal, wherein the second flow is different than the first flow.

51. A thermal transfer system adapted for use with a rotating control head, comprising:
a first member movable relative to a second member;
one of the members having a thermal transfer surface;
a first seal positioned with one of the members for sealing the first member with the second member;
a second seal positioned with one of the members for sealing the first member with the second member, wherein the first seal allows flow of fluid at a first pressure and the second seal allows flow of fluid at a second pressure different than the first pressure;
a thermal transfer fluid circulated with at least one of the members;
said second member defining a passageway formed to extend around the thermal transfer surface more than once; and
the thermal transfer surface transferring thermal units through the thermal transfer fluid in said passageway adjacent the first seal and the second seal.

52. The system of claim 51, wherein said passageway comprises a spiral slot formed on one of the members that extends around the thermal transfer surface adjacent the first seal and the second seal more than once.

53. A thermal transfer system adapted for use with a first member rotatable relative to a second member, comprising:
the second member having a seal carrier;
the seal carrier having a surface adjacent to a portion of the second member;
the second member having at least one passageway adjacent to the seal carrier surface; and
the at least one passageway extending more than once around the seal carrier surface.

54. The system of claim 53 wherein the seal carrier having a seal.

55. The system of claim 53 wherein the passageway is a spiral slot formed with one of the members.

56. A thermal transfer system adapted for use with a first member rotatable relative to a second member, comprising:
the second member having a seal carrier;
the seal carrier having a surface adjacent to a portion of the second member;
the second member having at least one passageway defined by the seal carrier surface; and
the at least one passageway extending a distance equal to more than once around the seal carrier along a tortuous path on the seal carrier surface.

57. A thermal transfer system adapted for use with a first member rotatable relative to a second member, comprising:
the second member having a seal carrier;
the seal carrier being adjacent to the first member;
at least one passageway in the second member defined by the seal carrier; and
the at least one passageway making at least one revolution around the seal carrier
wherein the passageway comprises a spiral slot formed with one of the members.

58. A thermal transfer system adapted for use with a rotating control head, comprising:
a first member movable relative to a second member;
the second member having a seal carrier;
the seal carrier being adjacent to the first member;
at least one passageway in the second member defined by the seal carrier; and
the at least one passageway making at least more than one revolution around the seal carrier.

59. A thermal transfer system adapted for use with a rotating control head, comprising:
a first member movable relative to a second member;
a first seal positioned with one of the members for sealing the first member with the second member; and
a second seal positioned with one of the members for sealing the first member with the second member, wherein the first seal allows flow of fluid at a first predetermined pressure and the second seal allows flow of fluid at a second predetermined pressure different than the first predetermined pressure.

* * * * *